United States Patent
Pazos

(10) Patent No.: US 9,485,108 B2
(45) Date of Patent: Nov. 1, 2016

(54) SYSTEM AND APPARATUS FOR USING MULTICHANNEL FILE DELIVERY OVER UNIDIRECTIONAL TRANSPORT ("FLUTE") PROTOCOL FOR DELIVERING DIFFERENT CLASSES OF FILES IN A BROADCAST NETWORK

(75) Inventor: Carlos M. D. Pazos, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 791 days.

(21) Appl. No.: 13/397,679

(22) Filed: Feb. 16, 2012

(65) Prior Publication Data

US 2012/0239785 A1 Sep. 20, 2012

Related U.S. Application Data

(60) Provisional application No. 61/452,393, filed on Mar. 14, 2011.

(51) Int. Cl.
*H04L 12/18* (2006.01)
*H04L 29/06* (2006.01)
*H04L 29/08* (2006.01)

(52) U.S. Cl.
CPC ....... *H04L 12/1881* (2013.01); *H04L 65/4076* (2013.01); *H04L 67/06* (2013.01); *H04L 67/325* (2013.01); *Y02B 60/46* (2013.01)

(58) Field of Classification Search
CPC ............. H04L 12/18; H04L 12/1881; H04L 65/4076; H04L 67/325; H04L 2012/5679; H04W 72/00; H04W 72/005; H04W 72/04; H04N 21/6405
See application file for complete search history.

(56) References Cited

U.S. PATENT DOCUMENTS 5,432,542 A 7/1995 Thibadeau et al.
5,636,245 A 6/1997 Ernst et al.
(Continued)

FOREIGN PATENT DOCUMENTS

CN 102025714 A 4/2011
CN 102195994 A 9/2011
(Continued)

OTHER PUBLICATIONS

Paila et al. "Request for Comments: 3926." Internet Engineering Task Force. Oct. 1, 2004. Web. Jun. 22, 2015. <https://tools.ietf.org/pdf/rfc3926.pdf>.*

(Continued)

*Primary Examiner* — Brian J Gillis
*Assistant Examiner* — Austin Moreau
(74) *Attorney, Agent, or Firm* — The Marbury Law Group, PLLC

(57) ABSTRACT

Embodiments provide bandwidth efficient mechanisms for delivering data to a receiver device via a wireless broadcast network such that data may be assembled in the receiver device for use by a local application. In the various embodiments, data files may be broadcast as content elements via the broadcast network using the FLUTE protocol during a FLUTE session. In an embodiment, the content elements may be broadcast according to a broadcast schedule that may identify a time at which the content elements will be broadcast and the broadcast schedule may be communicated in a file delivery table (FDT) transmitted during a FLUTE session.

24 Claims, 29 Drawing Sheets

(56) References Cited

U.S. PATENT DOCUMENTS

| | | | |
|---|---|---|---|
| 5,740,369 A | 4/1998 | Yokozawa et al. | |
| 5,948,043 A | 9/1999 | Mathis | |
| 6,032,053 A | 2/2000 | Schroeder et al. | |
| 6,216,385 B1 | 4/2001 | Abe | |
| 6,522,250 B1 | 2/2003 | Ernst et al. | |
| 6,539,232 B2 | 3/2003 | Hendrey et al. | |
| 6,587,835 B1 | 7/2003 | Treyz et al. | |
| 6,801,779 B1 | 10/2004 | Liebenow | |
| 6,867,688 B2 | 3/2005 | Lamb | |
| 6,975,346 B2 | 12/2005 | Kumhyr | |
| 7,085,818 B2 | 8/2006 | Brown et al. | |
| 7,271,765 B2 | 9/2007 | Stilp et al. | |
| 7,565,153 B2 | 7/2009 | Alcock et al. | |
| 7,672,678 B2 | 3/2010 | Gaw | |
| 7,706,740 B2 | 4/2010 | Collins et al. | |
| 7,895,121 B2 | 2/2011 | Lukose et al. | |
| 8,311,048 B2 * | 11/2012 | Mataga et al. | 370/411 |
| 2001/0022558 A1 | 9/2001 | Karr, Jr. et al. | |
| 2001/0045886 A1 | 11/2001 | Minowa | |
| 2002/0087401 A1 | 7/2002 | Leapman et al. | |
| 2003/0002536 A1 | 1/2003 | Wong et al. | |
| 2003/0005451 A1 | 1/2003 | Connelly | |
| 2003/0040272 A1 | 2/2003 | Lelievre et al. | |
| 2003/0098929 A1 | 5/2003 | Nono | |
| 2003/0129994 A1 | 7/2003 | Nagatsuma et al. | |
| 2003/0169185 A1 | 9/2003 | Taylor | |
| 2005/0096065 A1 | 5/2005 | Fleischman | |
| 2005/0120050 A1 | 6/2005 | Myka et al. | |
| 2005/0177846 A1 | 8/2005 | Maruyama et al. | |
| 2005/0281029 A1 | 12/2005 | Inamoto | |
| 2006/0059267 A1 * | 3/2006 | Cugi et al. | 709/230 |
| 2006/0080029 A1 | 4/2006 | Kodani et al. | |
| 2006/0121912 A1 | 6/2006 | Borjesson | |
| 2006/0133338 A1 | 6/2006 | Reznik et al. | |
| 2006/0156209 A1 | 7/2006 | Matsuura et al. | |
| 2006/0218586 A1 | 9/2006 | Pohjolainen et al. | |
| 2006/0229058 A1 | 10/2006 | Rosenberg | |
| 2006/0248090 A1 * | 11/2006 | Bennett et al. | 707/10 |
| 2006/0253453 A1 | 11/2006 | Chmaytelli et al. | |
| 2007/0026871 A1 | 2/2007 | Wager | |
| 2007/0054634 A1 | 3/2007 | Seppala | |
| 2007/0087756 A1 | 4/2007 | Hoffberg | |
| 2007/0101391 A1 | 5/2007 | Hwang | |
| 2007/0124395 A1 | 5/2007 | Edge et al. | |
| 2007/0168655 A1 * | 7/2007 | Thomasson et al. | 713/151 |
| 2007/0202886 A1 | 8/2007 | Dhebri et al. | |
| 2007/0204004 A1 | 8/2007 | Coyer et al. | |
| 2007/0259624 A1 | 11/2007 | Alizadeh-Shabdiz et al. | |
| 2007/0283268 A1 | 12/2007 | Berger et al. | |
| 2008/0060000 A1 | 3/2008 | Drouet et al. | |
| 2008/0134264 A1 | 6/2008 | Narendra et al. | |
| 2008/0201746 A1 | 8/2008 | Xu et al. | |
| 2008/0248813 A1 | 10/2008 | Chatterjee | |
| 2008/0256139 A1 | 10/2008 | Jessee | |
| 2009/0005067 A1 | 1/2009 | Ernst et al. | |
| 2009/0019509 A1 | 1/2009 | Horn et al. | |
| 2009/0089535 A1 | 4/2009 | Lohmar et al. | |
| 2009/0093259 A1 | 4/2009 | Edge et al. | |
| 2009/0177942 A1 | 7/2009 | Hannuksela et al. | |
| 2009/0178081 A1 | 7/2009 | Goldenberg et al. | |
| 2009/0207839 A1 | 8/2009 | Cedervall et al. | |
| 2009/0210510 A1 | 8/2009 | Bouazizi | |
| 2009/0252070 A1 | 10/2009 | Connors et al. | |
| 2009/0288116 A1 | 11/2009 | Zalewski | |
| 2009/0307564 A1 * | 12/2009 | Vedantham et al. | 714/776 |
| 2009/0320087 A1 * | 12/2009 | Song et al. | 725/131 |
| 2010/0011088 A1 * | 1/2010 | Gautier et al. | 709/217 |
| 2010/0050032 A1 | 2/2010 | Bichot et al. | |
| 2010/0080290 A1 * | 4/2010 | Mehrotra | H04N 19/147 375/240.07 |
| 2010/0146077 A1 | 6/2010 | Davies et al. | |
| 2010/0151882 A1 | 6/2010 | Gillies et al. | |
| 2010/0162334 A1 | 6/2010 | Suh et al. | |
| 2010/0162339 A1 | 6/2010 | Suh et al. | |
| 2010/0180007 A1 | 7/2010 | Suh et al. | |
| 2010/0299702 A1 | 11/2010 | Lo et al. | |
| 2011/0064082 A1 * | 3/2011 | Zalewski | 370/392 |
| 2011/0075612 A1 | 3/2011 | Guo et al. | |
| 2011/0258049 A1 | 10/2011 | Ramer et al. | |
| 2011/0289542 A1 | 11/2011 | Kitazato et al. | |
| 2012/0303745 A1 | 11/2012 | Lo et al. | |
| 2013/0097641 A1 * | 4/2013 | Suh et al. | 725/54 |
| 2013/0281007 A1 | 10/2013 | Edge | |

FOREIGN PATENT DOCUMENTS

| | | |
|---|---|---|
| CN | 102195994 A * | 9/2011 |
| EP | 1085685 A2 | 3/2001 |
| EP | 1209886 A2 | 5/2002 |
| EP | 1903757 A1 | 3/2008 |
| GB | 2363289 | 12/2001 |
| GB | 2404115 | 1/2005 |
| GB | 2406468 | 3/2005 |
| JP | S63310234 A | 12/1988 |
| JP | 1198549 A | 8/1989 |
| JP | 3131131 A | 6/1991 |
| JP | H0621905 A | 1/1994 |
| JP | 7220196 A | 8/1995 |
| JP | H088859 A | 1/1996 |
| JP | H08181702 A | 7/1996 |
| JP | H09212484 A | 8/1997 |
| JP | 10504392 T | 4/1998 |
| JP | 11041639 A | 2/1999 |
| JP | 2000252930 | 9/2000 |
| JP | 2000261462 A | 9/2000 |
| JP | 2001197021 A | 7/2001 |
| JP | 2002026836 A | 1/2002 |
| JP | 2002044012 | 2/2002 |
| JP | 2002135826 A | 5/2002 |
| JP | 2002186033 A | 6/2002 |
| JP | 2002232933 A | 8/2002 |
| JP | 2002237760 A | 8/2002 |
| JP | 2002531997 A | 9/2002 |
| JP | 2002290564 A | 10/2002 |
| JP | 2002325069 A | 11/2002 |
| JP | 2002334029 A | 11/2002 |
| JP | 2003018108 A | 1/2003 |
| JP | 2003030194 A | 1/2003 |
| JP | 2003143642 A | 5/2003 |
| JP | 2003153334 A | 5/2003 |
| JP | 2004112135 A | 4/2004 |
| JP | 2004128543 A | 4/2004 |
| JP | 2004236125 A | 8/2004 |
| JP | 2004297394 A | 10/2004 |
| JP | 2004533779 A | 11/2004 |
| JP | 2005051781 A | 2/2005 |
| JP | 2005165454 A | 6/2005 |
| JP | 2005308410 A | 11/2005 |
| JP | 2006033008 A | 2/2006 |
| JP | 2006080843 A | 3/2006 |
| JP | 2007129731 A | 5/2007 |
| JP | 2007135105 A | 5/2007 |
| JP | 2007295610 A | 11/2007 |
| JP | 2007300168 A | 11/2007 |
| JP | 2008538250 A | 10/2008 |
| JP | 2009519624 A | 5/2009 |
| JP | 2009539304 A | 11/2009 |
| JP | 2010502143 A | 1/2010 |
| KR | 20050049418 A | 5/2005 |
| RU | 2004121994 A | 1/2006 |
| RU | 2273956 C2 | 4/2006 |
| WO | WO9605678 A1 | 2/1996 |
| WO | WO0022860 A1 | 4/2000 |
| WO | 0033493 A | 6/2000 |
| WO | WO0174034 A2 | 10/2001 |
| WO | WO0186505 A2 | 11/2001 |
| WO | WO0186508 A2 | 11/2001 |
| WO | WO0219741 A2 | 3/2002 |
| WO | 02099983 A1 | 12/2002 |
| WO | WO03043210 A1 | 5/2003 |
| WO | WO03055142 | 7/2003 |
| WO | WO2004077291 A1 | 9/2004 |
| WO | WO2005086521 A1 | 9/2005 |
| WO | WO2005125238 A1 | 12/2005 |

(56) References Cited

FOREIGN PATENT DOCUMENTS

| WO | WO2006100571 A1 | 9/2006 |
|---|---|---|
| WO | 2006105434 A2 | 10/2006 |
| WO | WO2007038355 | 4/2007 |
| WO | 2007049840 A1 | 5/2007 |
| WO | 2007078252 A2 | 7/2007 |
| WO | 2007130150 | 11/2007 |
| WO | 2008025578 A1 | 3/2008 |
| WO | 2009046362 A1 | 4/2009 |
| WO | 2009139993 A2 | 11/2009 |

OTHER PUBLICATIONS

Luby et al. "Request for Comments: 3450." Internet Engineering Task Force. Dec. 2002. Web. Dec. 29, 2015. <https://tools.ietf.org/pdf/rfc3450.pdf>.*

Nobena Y., "Rise of the idea <Opt-in Schedule>," Mobile greatly changes business style! [With graphics], All about "m-commerce," PHP Inc. Oct. 16, 2000, 1st edition, pp. 154-157.

Open Mobile Alliance, Service Guide for Mobile Broadcast Services, OMA-TS-BCAST Service Guide, Approved Version 1.1—Oct. 29, 2013, pp. 1-299.

Joshi et al., "Simplified transforms for extended block sizes", ITU-T SG16 Q6 (VCEG), Document VCEG-AL30, 38th VCEG Meeting, Jul. 6-10, 2009, Geneva, CH, Jul. 3, 2009, XP030003711, Retrieved from the Internet: URL: http://wftp3.itu.int/av-arch/video-site/0906_LG/VCEG-AL30.zip.

Advanced Television Systems Committee, "ATSC Candidate Standard: Non-Real-Time Content Delivery," Doc. TSG-876r1, Dec. 2, 2010, pp. 1-118.

Faria G et al., "DVB-H: Digital Broadcast Services to Handheld Devices", Proceedings of the IEEE, vol. 94, No. 1, Jan. 2006.

Frojdh P et al., "Study on 14496-12:2005/PDAM2 ALU/ FLUTE Server File Format", 78.MPEG Meeting; Oct. 23, 2006-Oct. 27, 2006; Hangzhou: (Motion Picturexpert Group or ISO/ IEC JTC1/SC29/WG11),, No. M13855, Oct. 13, 2006, XP030042523, ISSN: 0000-0233.

International Search Report and Written Opinion—PCT/US2012/028115—ISA/EPO—Oct. 26, 2012.

Hui, et al., "A General Architecture in Support of Personalized, Interactive Multimedia Services in the Mobile Broadcast Convergent Environment," Testbeds and Research Infrastructure for the Development of Networks and Communities, 2007. TridentCom 2007, pp. 1-6.

T. Paila et al., "FLUTE—File Delivery Over Unidirectional Transport," Network Working Group Request for Comments: 3926, Oct. 2004.

G. Camarillo et al., "The Session Description Protocol (SDP) Grouping Framework," Internet Engineering Task Force (IETF) Request for Comments: 5888, Jun. 2010.

Taiwan Search Report—TW101108361—TIPO—Jan. 19, 2014.
Taiwan Search Report—TW101108361—TIPO—Nov. 13, 2014.

* cited by examiner

SYSTEM AND APPARATUS FOR USING MULTICHANNEL FILE DELIVERY OVER UNIDIRECTIONAL TRANSPORT ("FLUTE") PROTOCOL FOR DELIVERING DIFFERENT CLASSES OF FILES IN A BROADCAST NETWORK

RELATED APPLICATION

This application claims the benefit of priority to U.S. Provisional Patent Application No. 61/452,393 entitled "System And Apparatus For Using Multichannel File Delivery Over Unidirectional Transport ("Flute") Protocol For Delivering Different Classes Of Files And For Scheduling Freshness In A Network" filed Mar. 14, 2011, the entire contents of which are hereby incorporated by reference.

BACKGROUND

Internet and wireless communication technologies have seen explosive growth over the past few years. This growth has been fueled by a large increase in the number of applications and types of information now available to users. One of the growing uses of such communication technologies is to deliver broadcast and multicast content to users on a variety of computing devices. A recent addition to wireless communication services has been the ability to broadcast content to computing devices. This trend towards greater availability of broadcast and multicast services is expected to continue.

SUMMARY

The various embodiments may provide bandwidth and battery efficient mechanisms for delivering data to a receiver device via a wireless broadcast network such that data may be assembled in the receiver device for use by a local application. In the various embodiments, data files may be broadcast as file content elements via the broadcast network using the FLUTE protocol during a FLUTE session. In an embodiment, the file content elements may be broadcast according to a broadcast schedule that may identify a time at which the file content elements will be broadcast and the broadcast schedule may be communicated in a file delivery table (FDT) transmitted during a FLUTE session.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
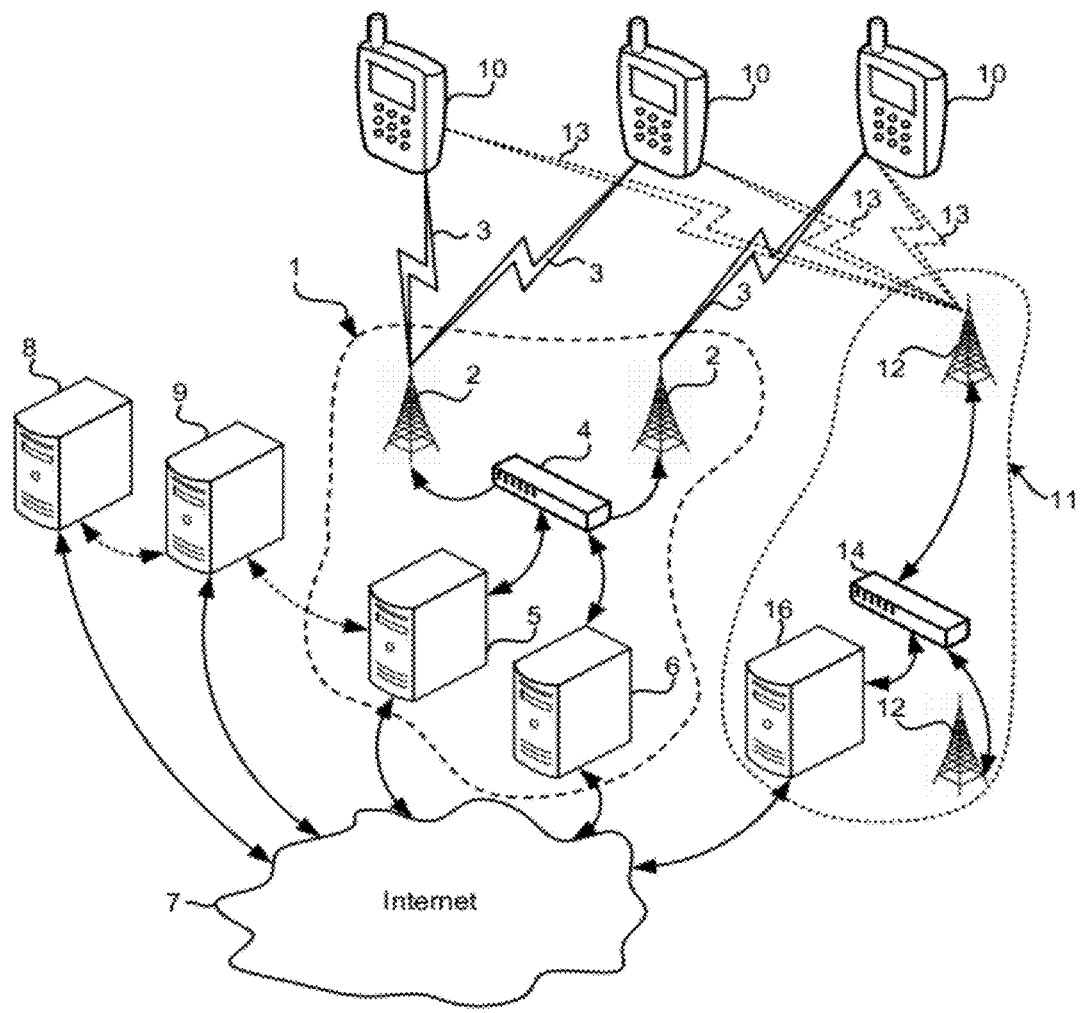
FIG. 1 is a communication system block diagram illustrating a broadcast communication system suitable for use in an embodiment.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "computing device," "receiver device," and "wireless device" are used interchangeably herein to refer to any one or all of a variety of personal computing devices, including but not limited to personal computers, laptop computers, personal mobile television receivers (e.g., multicast, broadcast, unicast related devices), cellular telephones, automobile mobile television receivers, personal data assistants (PDA's), palm-top computers, wireless electronic mail receivers, multimedia Internet enabled cellular telephones, and similar personal electronic devices which include a programmable processor and memory and telecommunications receiver circuitry for receiving and processing broadcast transmissions.

The word "broadcast" is used herein to mean the transmission of data (information packets) so that it can be received by a large number of receiving devices simultaneously. Examples of a broadcast message are wireless broadcast signals, mobile television service broadcast signals, including content broadcasts (content flow) and overhead information broadcasts (overhead flow) such as metadata messages. Broadcast also encompasses multicast which is a type of broadcast delivery format.

The word "unicast" is used herein to refer to a wireless data transmission that is directed to a single receiver device. In contrast to a broadcast network, a "unicast network" refers to a wireless communication network that sends and receives transmissions to and from individual wireless communication devices. Examples of unicast networks that may be used with the various embodiments include the Internet, cellular communication networks (e.g., third generation (3G) cellular data networks), WiFi networks, and WiMax networks.

The word "web server" is used herein to mean an application or group of applications capable of receiving a Hypertext Transfer Protocol (HTTP) request and returning an appropriate HTTP response, such as providing a Hypertext Markup Language (HTML) file. A web server may include middleware or an application portion, such as a J2EE® server, an ASP® server, a PHP module, a PERL interpreter, or similar functionality. A web server may also include a data storage portion, such as a database management system (DBMS) or local file store. A web server may be implemented within a conventional server, but in the various embodiments a web server is also implemented within a receiver device.

The various embodiments provide bandwidth and battery efficient mechanisms for delivering data to receiver devices via a wireless multimedia broadcast network so that the data can be assembled in the receiver device for use by a local application. The various embodiments may be particularly useful for delivering Internet webpages to computing devices since a wireless broadcast network provides an efficient delivery mechanism that can be leveraged for delivering popular Internet websites. However, the embodiments are not limited to delivery of web pages. Data files may be broadcast as disassembled content elements via the broadcast network using the FLUTE protocol. To enable reception, the disassembled content elements are broadcast according to a broadcast schedule that is communicated in an overhead content description flow, such as an electronic catalog, or in the case of FLUTE, the file delivery table (FDT). Receiver devices receive the overhead content description flow and use the metadata information to selectively receive the disassembled webpage content and store the content elements in memory.

The various embodiments have a wide variety of potential applications for delivering rich media content to mobile receiver devices via a broadcast network. The bandwidth of broadcast networks may be leveraged to transmit large media content files to receiver devices. The various embodiments may make efficient use of broadcast network bandwidth to transmit media content files to receiver devices. By accomplishing the assembly of rich media content into a form that is presented to a user of utilized by a local application within receiver device, the delivery of rich media content in the form of broadcast content elements may more efficiently utilize bandwidth and may enable receiver devices to conserve battery power.

For example, using a broadcast start time and a broadcast end time contained within a file delivery table broadcast to the computing devices, the computing devices may only receive during select instructed time periods to conserve power and mobile resources. Additionally, in the various embodiments different file delivery tables can be broadcast using different channels and the file delivery tables may include different refresh time periods. In this manner, the computing device may select between two or more different file delivery tables having a first or second refresh time depending on the content received by the broadcast computing device. Once received and stored in memory, the media content elements may be used by a local application to use or present the content to the user in the required or preferred format, such as webpages, native application content, e-books, etc.

The embodiments enable efficient utilization of wired or wireless bandwidth to enable webpage delivery via a broadcast network or a multicast network instead of via a unicast network. For example, in another embodiment, the files may be broadcast over different channels depending on a class of file for more efficient use of resources. In another embodiment, FDT files may be broadcast over two different channels depending on a specific update period. In another embodiment, the files may be broadcast and the FDT files may be interleaved within the broadcast files using a common transport delivery service.

For ease of reference, the various embodiments are described below using the example application of Internet web content delivery. This application illustrates functioning of the various embodiments using common terminology. However, the following descriptions are not intended to limit the embodiments to Internet web content delivery. One having ordinary skill in the art would appreciate that the various embodiments may also be used for delivering a variety of rich media content. Accordingly, the scope of the claims should not be limited to Internet web content delivery and reception unless specifically recited.

A number of different broadcast services and broadcast standards are available or may be contemplated in the future, all of which may implement and benefit from the various embodiments. Such services and standards may include FLUTE transport for unidirectional delivery of files over the internet, which is particularly suited to multicast networks. FLUTE may be applicable to the delivery of large and small files to many hosts, using delivery sessions of several seconds or more. FLUTE may be used for updates to many hosts simultaneously. FLUTE is a file distribution utility that allows multicast file transfer over ALC (Asynchronous Layered Coding). FLUTE implements the file transport mechanism defined in Internet Engineering Task Force proposed standard Request for Comments ("RFC") 3926 entitled "FLUTE—File Delivery over Unidirectional Transport," published October 2004, available at http://tools.ietf.org/html/rfc3926. FLUTE file distribution may include feedback free protocol for transmission, suitable for unidirectional links, in-band signaling of the properties of delivered files, and is Asynchronous Layered Coding compliant. FLUTE may be scalable and relies on multiple rates of transmissions in multiple multicast groups. FLUTE may be switchable 'on-demand' and can be utilized in 'push' delivery modes and may be configurable in a number of layers. FLUTE also may have recursive directory transmission features.

The various embodiments utilize FLUTE in way previous broadcast systems have not. Previous broadcast systems may have utilized FLUTE to transport data in redundant file packets over multiple channels. In this manner the previous broadcast systems enabled a device receiving all of the multiple FLUTE channels to receive file packets simultaneously on all of the multiple FLUTE channels and reassemble data faster than a device receiving file packets on only one of the multiple FLUTE channels. The various embodiments use FLUTE channels differently than previous broadcast systems. In the various embodiments different files may be sent on each FLUTE channel. In the various embodiments the different files sent on each FLUTE channel may have different file characteristics, such as different file sizes. The various embodiments assume the receiver device receives all of the FLUTE channels in a FLUTE session. The various embodiments may realize bandwidth gains and efficiency by transmitting files of different characteristics separately rather than bundling them together into one transport. In an embodiment, the FLUTE FDT may describe when the files will be transmitted.

In the various embodiments, the receiver device may automatically monitor the broadcast network for scheduled broadcasts of webpage content elements, and selectively receive and store webpage content elements for websites that the user may be interested in receiving. In a typical embodiment, this process may be done in the background. When a user of the receiver device enters a command to view a particular webpage (e.g., by entering the websites name or selecting the corresponding URL), the web server application within the receiver device may assemble the requested webpage from elements stored in memory, and present it to a standard web browser or other application (e.g., a widget) for viewing.

The various embodiments do not use the scalable congestion control and layered encoding in a traditional FLUTE protocol based broadcast concept, as these features are not applicable to broadcast systems. In a traditional FLUTE protocol, multiple channels may be used to transmit different data portions of the same data over each channel at the same time. The redundant transmission of different data portions over each of the multiple channels in a traditional FLUTE protocol may enable a device receiving each of the channels to assemble the complete data set in less time than it may take to transmit the complete data set over a single channel. In a traditional FLUTE protocol, the FDT may describe each file being transmitted, but in a traditional FLUTE protocol the FDT does not include an indication as to when a file may be transmitted. Traditional FLUTE may only send the same data copies in different channels and may be limited in that the broadcast cannot be interrupted. In a traditional FLUTE protocol, a separate scheduling transmission must occur for a recipient device to know when to monitor FLUTE channels. The use of a separate scheduling transmission may increase the necessary bandwidth overhead for any data transmission because a scheduling message may always need to be sent. Additionally, continuous monitoring of transmission channels may be required, because schedule updates may need to be received separate from any FLUTE transmissions.

The various embodiments may avoid the drawbacks of the traditional FLUTE protocol by embedding scheduling information in the FDT. Further, the various embodiments may use FLUTE channels to carry different classes of files or different pieces of FDT (file delivery table) files that describe files that are transmitted in a FLUTE session. One advantage of using FLUTE channels for different classes of files may be that a FLUTE protocol allows for addressing different requirements of the file classes. As an example, a channel may be used to carry relatively large files while relatively smaller files may be sent in a second different transport, or second FLUTE channel. A first FLUTE channel may be used as a resource that may only describes a first class of files, while a second FLUTE channel may be used as a second resource that may only describe a second class of files.

In an embodiment, FLUTE channels may be used to separate different classes of files according to different FLUTE channels in a FLUTE session. Also, in another embodiment, multiple FLUTE channels may be used to separate different classes of FDT files according to different FLUTE channels in a FLUTE session. For example, a first class of FDT files may be broadcast using a first FLUTE channel and a different class of FDT files may be broadcast using a second FLUTE channel. In another embodiment, different types of FDT files may be sent via the same FLUTE session that describes files over two different periods. For example, FDT files that describe files over a first fifteen minute period may be sent via a first FLUTE channel while other second FDT files that describe files over a thirty second period may be sent via a second FLUTE channel.

Additionally, multiple different FDTs in multiple FLUTE channels may describe file information for specific features, for example, only files for an interactivity application, files for a targeted advertisement application, and files for a magazine distribution application.

In an embodiment, the FLUTE channels may include a File Delivery Table (FDT) that describes a broadcast start time and a broadcast end time for each file. The FDT may list parameters of files including an expiration time for the FDT describing the end of the time period when the included files may be broadcast in the FLUTE session. The FDT may describe attributes of the files. A computing device may receive the expiration time of the FDT and may make a determination to conserve mobile resources if no files of interest are described on the FDT. As an example, a computing device may receive the expiration time of the FDT and may make a determination to conserve mobile resources by not monitoring the FLUTE session again until the expiration time of the FDT if no files of interest are described on the FDT. Also, the computing device may receive files in a predetermined period enabling it to de-energize receiver circuits at other times to conserve power in the computing device. In another embodiment, the FDT lists parameters of files including a file transmission time of files broadcast in the FLUTE session. The computing device may receive the transmission time of a first set of files and may make a determination to conserve mobile resources and wait to receive other second files at the conclusion of the transmission time of the first files to conserve power at the computing device while still receiving the desired files.

In another embodiment, the FDT files may be carried in a first separate channel while a first set of files may be carried in a second FLUTE channel and the session description (e.g., Session Description Protocol ("SDP")) for the FLUTE session may include information to identify the channels and to semantically identify which channel carries file packets and which channel carries FDT packets. The various embodiments may include different channels, for example, FLUTE channel one may be a descriptor channel carrying FDT packets and a second FLUTE channel may be a channel carrying file packets. In an embodiment the FDT may list which channels should be listed for which packets. The various embodiments may include a mechanism to identify FLUTE channels for different classes of files.

In another embodiment, the FDT may describe files that may be available for each FLUTE channel and the FLUTE session description may include information to identify separate channels to transport classes of files. In another embodiment, the computing device may reference FDT latency by using channel attributes in the session description that may be descriptive for the channels to receive FDT files at a specific latency for schedule freshness. In yet another embodiment, the FDT files may be application specific and the FDT channel may be dedicated for a specific use or application. For example, the FDT may only include data for a specific application and may be broadcast over a specific channel. The session description may also include an attribute to constrain the channel used for FDT transport for a specific application.

In one embodiment, a broadcaster may use the session description protocol ("SDP") for a session description and for the FLUTE session to describe and identify the channels. In another embodiment, groups of channels may be used for file transport and channels used for FDT transport. In another embodiment, several SDP enhancements for multi-channel support may be used. For example, the SDP enhancement may include inheriting a "group" and "mid" attributes from a grouping framework as discussed in the Internet Engineering Task Force proposed standard Request for Comments ("RFC") 5888 entitled "The Session Description Protocol (SDP) Grouping Framework," published June 2010, available at http://tools.ietf.org/html/rfc5888, those portions of which discuss the SDP enhancement and grouping frameworks being herein incorporated by reference in their entirety. For example, "DC" (Descriptor Channels) may be used as a token semantics extension. For example, media streams in SDP (corresponding to FLUTE channels for FLUTE transport) may be identified by a "mid value." Associating these values with the DC token may identify the channels used for FDT transport. The data may further include a semantic extension, for example "FC," for a file channel. In addition, a temporary mobile group identity data may also be added as a media (and/or channel for FLUTE) description protocol information which may identify the broadcast bearer (i.e., the broadcast network transport channel) used to carry a FLUTE channel, which may enable reception of a given bearer to be selectively based on a desired FLUTE channel.

The various embodiments may be implemented within a variety of broadcast systems, an example of one of which is illustrated in FIG. 1. A wireless broadcast network 1, such as an LTE wireless network that provides Multimedia Broadcast and Multicast Services (MBMS) with FLUTE-based transport of files, may include a plurality of broadcast transmitters 2 controlled by a broadcast network control center which is referred to herein as a broadcast operation center 4 (or "BOC" in the figures). The broadcast network 1 may broadcast content from the broadcast transmitters 2 as broadcast transmissions 3 for reception by receiver devices 10, such as mobile television receivers, smart phones, cellular phones, personal digital assistants (PDA), pad computers, interactive game devices, notebooks, smartbooks, netbooks, data processing apparatus, or other such electronic devices.

The broadcast network 1 may include a broadcast network server 6 which may include an interface to the broadcast network and be configured to manage the scheduling of content broadcasts, scheduling of FLUTE sessions and content files included within FLUTE sessions, generation of electronic service guides and catalog messages regarding the content broadcasts via the channels of the multimedia broadcast network 1. The broadcast network server 6 may also include connections to an external network, such as the Internet 7, through which the broadcast network server 6 may receive content feeds from the content provider server 8. The broadcast network server 6 may be configured to receive content from content provider server 8, determine information about the received content, and broadcast the content in content batches in a uniform manner to receiver devices 10.

As part of this content delivery system, the broadcast network 1 may also include a web content server 5 for managing content elements for broadcast via the broadcast network 1 according to the various embodiments. The web content server 5 may receive content elements, such as text files, images, graphics, CSS files, JavaScript® files, JPEG media files, Flash® media files, and templates, from a website hosting server 9, either via a direct network connection or an indirect network connection, such as the Internet 7. In an embodiment, the web content server 5 may periodically access a website hosting server 9 to download the latest webpage content. In an embodiment, the website hosting server 9 may periodically push updated content elements to the web content server 5. In an embodiment, the web content server 5 may receive updated webpage content elements both by accessing websites and by receiving content pushed to it by website hosting server 9. The generation of web content in the website hosting server 9 may be accomplished in the ordinary manner that website content is generated and hosted.

In addition to the broadcast network 1, receiver devices 10 may also be configured for duplex communication via a unicast network 11, such as a 3G cellular telephone network or a WiFi wireless network (e.g., a WiFi "hotspot"). A typical cellular telephone network may include a plurality of cellular base stations 12 coupled to a network operations center 14, which operates to connect voice and data calls between receiver devices 10 and other network destinations, such as via telephone land lines (e.g., a POTS network, not shown) and the Internet 7. Communications between receiver devices 10 and the unicast network 11 may be accomplished via two-way wireless communication links 13, such as 3G, CDMA, TDMA, and other cellular telephone communication technologies, as well as wireless wide area network such as WiFi, WiMax, etc. To facilitate Internet data communications, the unicast network 11 alone may include one or more servers 16 coupled to or within the network operations center 14 that provide a connection to the Internet 7. Receiver devices 10 may communicate with the broadcast network 1 via the unicast network 11, such as via an IP data call to a broadcast network server 6 by way of the Internet 7, such as for purposes of subscribing to broadcast services (e.g., subscribing to broadcast web services) and reporting user viewing patterns. Additionally, receiver device 10 users may access the Internet 7 via the unicast network 11, such as to download webpages that may not be broadcast per one of the various embodiments. The unicast network 11 may also be used to subscribe to broadcast web services enabled by the various embodiments, including downloading of templates, stock graphics and other content elements that may be used by applications on the receiver devices 10.

Figure 2:
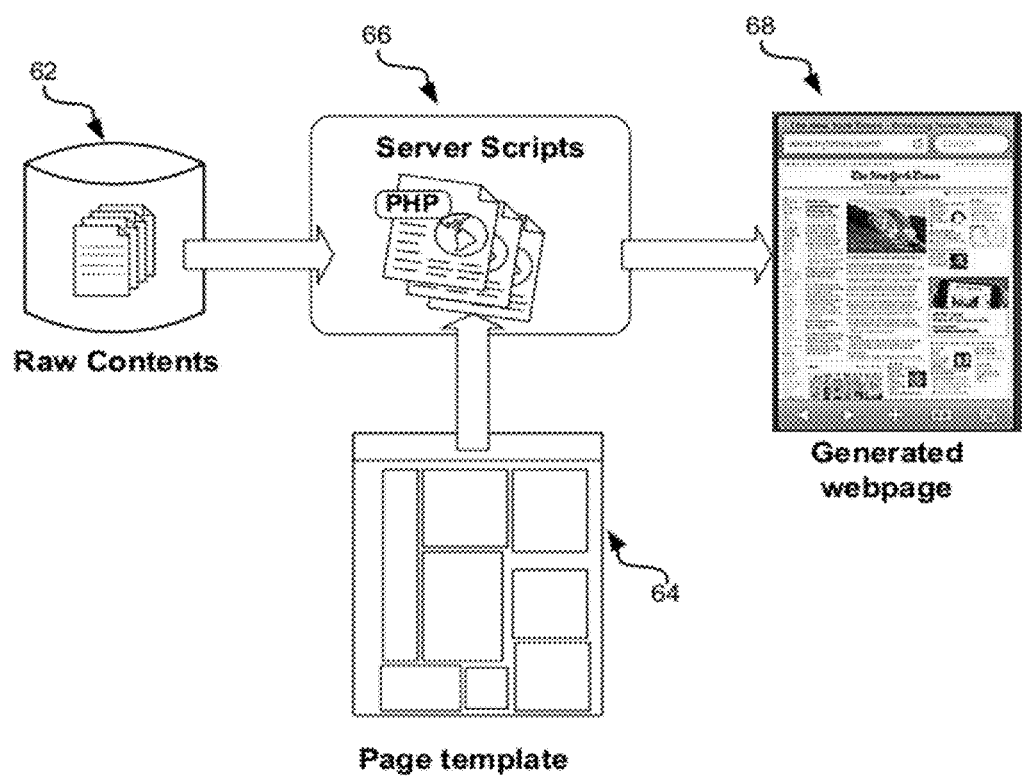
FIG. 2 is an illustration of a webpage illustrating how content elements are combined to generate a webpage.

FIG. 2 illustrates an example of how a web server may process web content to create a web page. It should be appreciated that web content traffic forms no limitation and the content may include other data and the illustration herein forms no limitations to the present disclosure. It should be appreciated that the various embodiments are operable with interactive applications and are applicable to many different examples. A generated webpage 68 may be any document capable of being viewed or executed by a web browser. A webpage 68 may be a single HTML formatted file, may be a single file of another format such as XML, JavaScript®, JPEG, MPEG, Flash® or PDF®, or may be a file, such as an HTML file, that relies on additional files. For example, a webpage 68 may comprise an HTML file, one or more CSS and JavaScript® files, one or more JPEG media files, and/or one or more Flash® media files. A webpage 68 may be static or dynamically generated. A static webpage 68 is generally a web page that is stored on the website hosting server in the same format as it is delivered to the end user. However, the majority of popular web content may be dynamically generated. FIG. 2 illustrates components that a web server may utilize to dynamically generate a webpage 68. The server, upon receiving a user's request for a webpage, may run server side scripts 66 to generate webpage 68 based on the raw content 62 stored in a memory of the server, such as a raw content 62 database, the page templates 64 stored in a memory of the server, and any parameters specified in the user's request. The server may return the generated webpage 68 to the user via a network connection.

The server side scripts 66 may comprise the middleware or application level of a web site and for a typical ecommerce website or similarly complex web application, the server side scripts 66 may contain a large portion of the code required to process transactions. In an example content-based website, the server side scripts 66 may perform a more limited role such as selecting the appropriate content based on user preferences (e.g., selecting which news stories to display on the main page based on past browsing history). In a further example, the server side scripts 66 may merely query a database for the most up to date information, but not customize the webpage 68 based on the user's request. The server side scripts 66 may be script files containing code in languages such as PHP, ASP®, PERL, PYTHON, may be compiled code originally written in a language such as JSP®, ASP.NET®, Java® or C++, or a combination of scripted and compiled code.

The page templates 64 may be utilized for properly formatting the web page 68. A typical website may have many page templates 64, including some that may only be executed when generating a webpage 68 intended for display on a computing device. While the page templates 64 may include static HTML code segments, the page templates 64 often include server-side code such as PHP. The distinction between the page template 64, the raw content 62, and the server side scripts 66 may primarily be functional in that the page template 64, the raw content 62, and the server side scripts may include executable computer code rather than pure data, or may include a combination of executable computer code and pure data. As used herein, a page template 64 refers to the data and code primarily used to generate a web page while raw content 62 refers to the data and code which is frequently and/or periodically updated and may be suitable for use in various circumstances beyond web sites.

Figure 3:
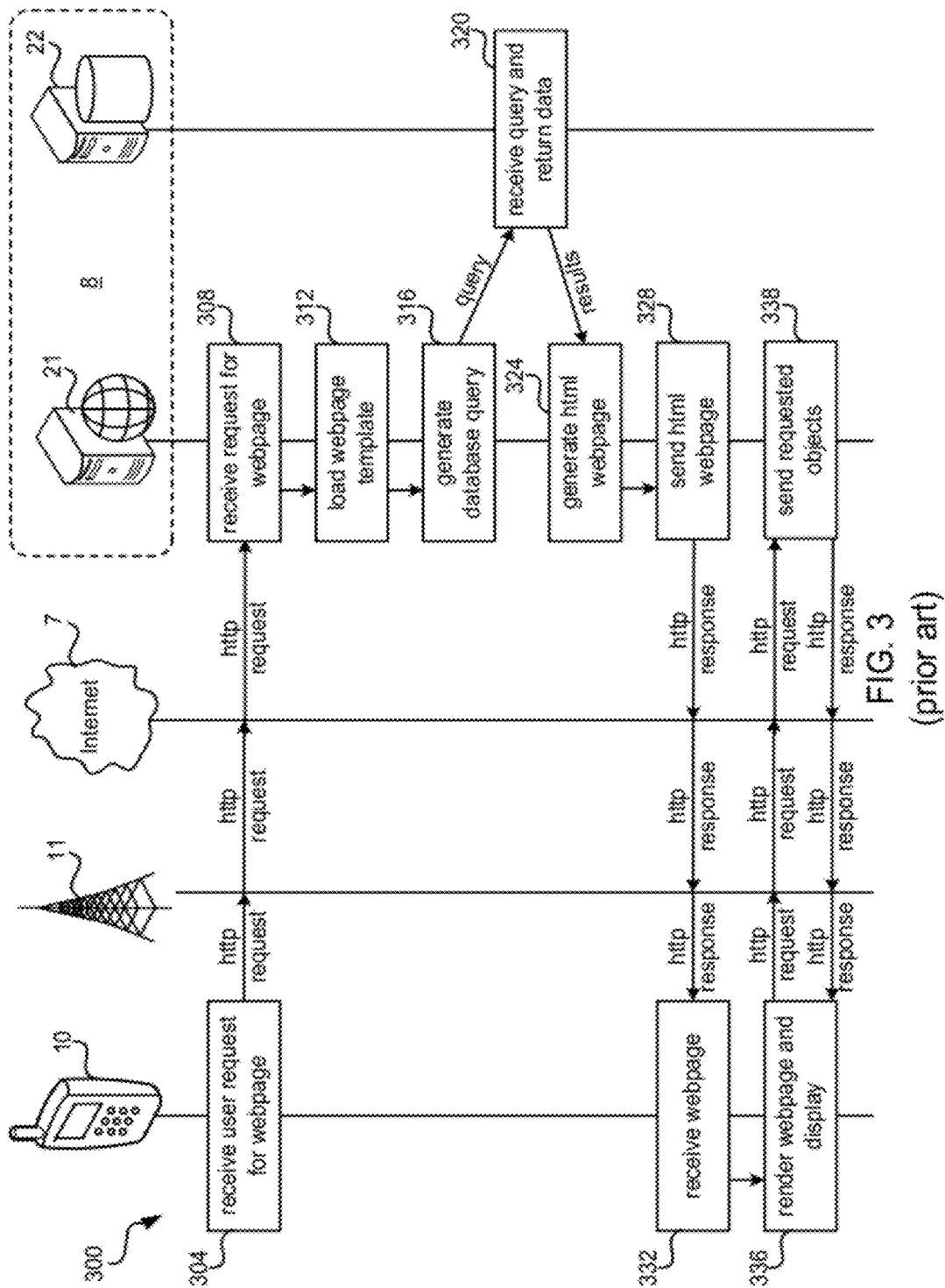
FIG. 3 is a communication flow diagram illustrating prior art communications and processes involved in delivering a webpage to a wireless device.

FIG. 3 illustrates an example of a conventional process by which a web content provider may dynamically generate a web page based on a user request. FIG. 3 illustrates the process steps and message exchanges among various components within a unicast wireless communication system. A conventional unicast communication system providing users access to websites via a wireless network may include a receiver device 10 connected to a unicast network 11 for access to the Internet 7, and a content provider server 8, which may include a web server 21 and a database server 22. In method 300, the receiver device 10 may receive a user request for a webpage in block 304. The receiver device 10 may generate a message in the form of an HTTP request, which is sent to the content provider server 8 via the unicast network 11 and the Internet 7. The content provider server 8 may receive the incoming HTTP request in a web server 21 in block 308. The web server 21 may load the appropriate webpage template in block 312, and begin executing the server side scripts. The template scripts may require data, such as the latest news headlines, and a database query (e.g., a SQL query) may be generated in block 316. The query may be sent to the database server 22 via a database query protocol, such as JDBC. The database server 22 may receive the query, process the query, prepare and format the results and return the data in block 322, such as via a database response protocol (e.g., JDBC). The web server 21 may receive the results and generate an HTML webpage based on the data in block 324, and send the HTML webpage to the receiver device 10 in the form of an HTTP response in block 328. The receiver device 10 may receive the webpage in block 332, and render the webpage for display in block 336. It should be noted that for a typical webpage, receiving the HTML webpage is merely the first block in the process of displaying the content, as a typical HTML webpage often includes imbedded media files, such as photographs, or relies on external CSS and JavaScript files. The receiver device 10 will process the received HTML to determine which additional objects should be fetched and automatically request the documents via HTTP from the web server 21, which returns the requested objects in block 338. Many of these additional objects will be static files that require little, if any, server-side processing, but others, such as multimedia files, may be dynamically generated.

As FIG. 3 illustrates, in a conventional webpage delivery process, all of the contents of the webpage may be transmitted to the requesting receiver device 10 in form for rendering each time the webpage is accessed by any user.

Figure 4A:
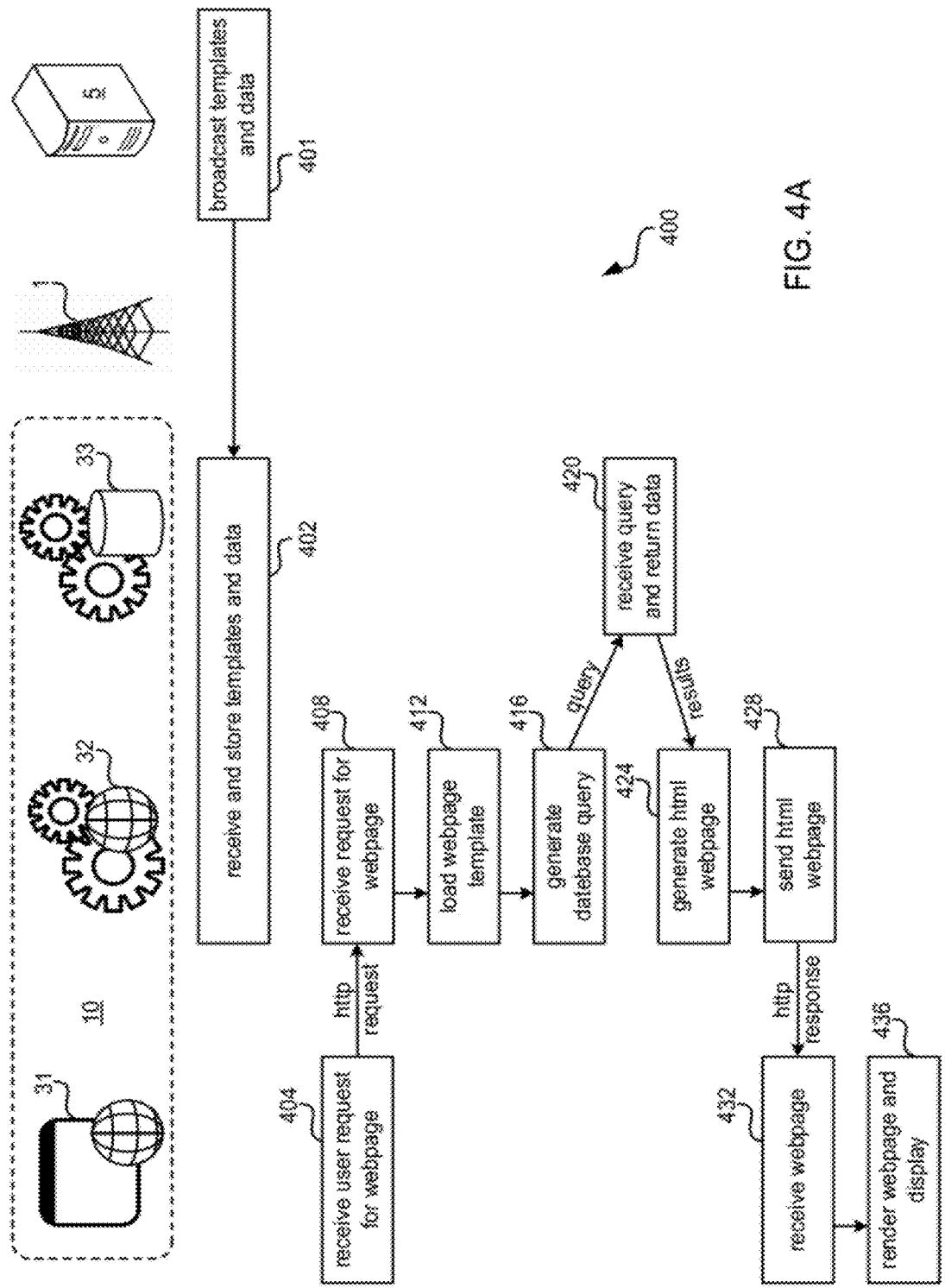
FIG. 4A is a communication flow diagram illustrating communications and processes for enabling access to webpages according to an embodiment.

Another mechanism for delivering website content to computing devices may assemble webpages within a web server application 32 hosted within the receiver device 10 as illustrated in FIG. 4A. This method may use a local web server 32 and a local data store 33 on the receiver device 10 to provide the user with broadcast web service. The web content server 5 may broadcast, via the broadcast network 1, webpage content elements comprising the templates and data required to generate a webpage in block 401, which may be selectively received and stored by the receiver device 10 in block 402. In this method, a processor within the receiver device 10 may be configured with application software including a web browser 31 and a local web server, and may be coupled to a local data store 33. After receiving webpage content elements, block 402, the web browser 31 operating within the receiver device 10 may receive a user request for a web page in block 404, such as from the user entering a website name (e.g., "CNN"), selecting a website from a list or menu, or activating a hyperlink within a displayed document. In response, the web browser 31 may generate an HTTP request, which the computing device processor may send to the local web server 32 via an internal data bus or software relay. In some implementations, the web site hosted by the "local" web server will have a "local" URL (e.g., http://localhost:8008/cnn/tech). In such implementations, a program for the local site on the local Web server may inform the receiver device of the appropriate remote site that should be contacted. In some implementations, the URL for the remote server that should be contacted to receive content via the unicast network may be included within the program for the website. The URL may also be included in the information regarding webpage content that is transmitted as part of the overhead information. The local web server 32 may receive the request for a webpage in block 408, and load the appropriate webpage template or program in block 412. The local web server 32 may process the template or program and, if required to generate the requested webpage, generate a database query, such as a SQL query, in block 416. The database query in the form of a database query protocol (e.g., JDBC) may be sent over a data bus or a software relay to the local data store 33 within the computing device, which receives the query and returns the appropriate data in block 420. The local web server 32 may receive the results and generate the HTML webpage based on the template using the local data in block 424, and send the generated HTML webpage to the web browser 31 in block 428. The web browser 31 may receive the webpage via HTTP response in block 432, and render the webpage for display in block 436. If the rendering of the webpage requires accessing objects stored in the local data store 33, the web browser 31 may send requests for the required objects to the database and receive the requested objects.

A broadcast method of delivering content to computing devices may benefit from efficient mechanisms for delivering content over communication links. To broadcast content elements to computing devices, the various embodiments may utilize the FLUTE (File Deliver over Unidirectional Transport) protocol (Internet Engineering Task Force proposed standard Request for Comments ("RFC") 3926 entitled "FLUTE—File Delivery over Unidirectional Transport," published October 2004, available at http://tools.ietf.org/html/rfc3926) that may be enhanced in order to function in an enhanced manner for broadcast and multicast services.

Figure 4B:
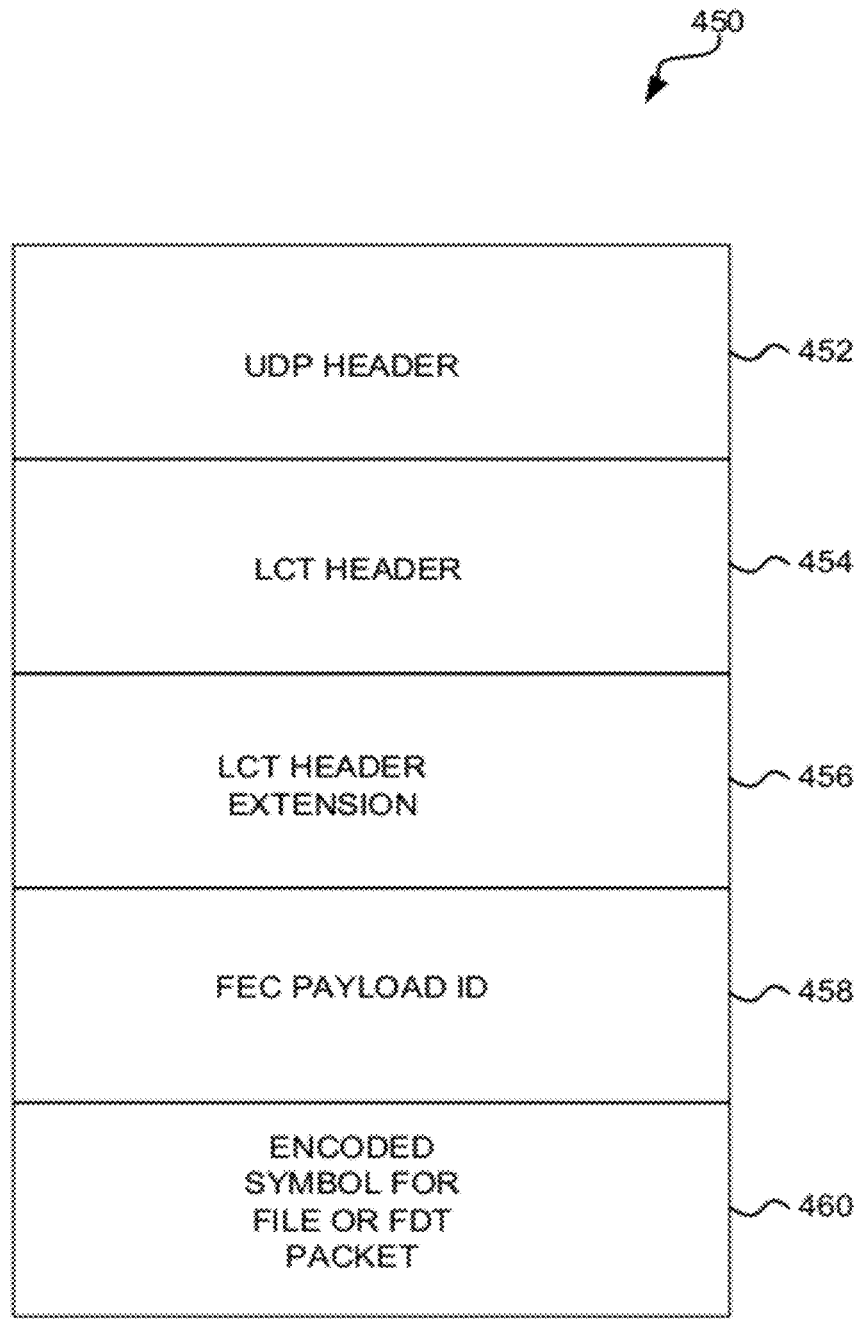
FIG. 4B shows a packet configured for transport using a File Delivery Over Unidirectional Transport ("FLUTE") protocol.

FLUTE is a protocol that was originally developed for the unidirectional delivery of files over the Internet, which may be particularly suited to use in multicast networks. The FLUTE specification builds on Asynchronous Layered Coding (ALC), the base protocol designed for scalable multicast distribution. In FLUTE, files may be delivered as transport objects with optional content encoding and may be delivered to a large number of receivers with little feedback. FLUTE also may be utilized both with multicast and unicast user datagram protocol delivery. FLUTE may support any source multicast and source specific multicast models and may have reliability via forward error correction. A sample FLUTE FDT packet 450 is illustrated in FIG. 4B having a User Datagram Protocol "UDP" header 452, a default Layered Coding Transport "LCT" header 454, an LCT header extension 456, a Forward Error Correction "FEC" payload ID 458, and an encoded symbol for file or FDT packet 460. A FLUTE packet may be built by obtaining a file and rendering the file as a transport object. The transport object may be rendered into a number of source blocks. Each source block may be formed into a number of source symbols. A parity symbol and encoding may be added to render the FLUTE packet with a header.

Figure 5:
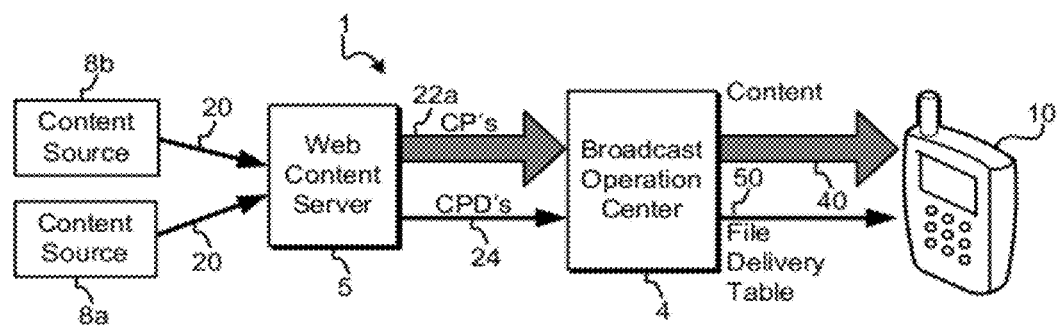
FIG. 5 is a communication system block diagram of a broadcast system illustrating content delivery to computing devices.

To broadcast webpage content elements to computing devices, the various embodiments may utilize methods similar to how other content is broadcast to computing devices in a broadcast network. FIG. 5 illustrates an overview of information broadcast within a broadcast network 1. The broadcast data may be used for delivering webpage content elements to receiver device 10 as broadcast transmissions. As mentioned above, a broadcast network 1 may receive content elements (e.g., web templates or programs, graphics, images, dynamic data and executable scripts) from a number of content hosting servers 8a, 8b. Such content may be provided to a web content server 5 within a broadcast network 1 via data networks 20 (e.g., the Internet 7).

The web content server 5 may store such content in a database and schedule the content for broadcast. In scheduling content for broadcast, the broadcast network server 6 determines what will be broadcast when and on which network address. As part of scheduling, the web content server 5 may format the webpage content elements into content packages (CPs) suitable for broadcast. The web content server 5 may also extract information about the webpage content elements, such as the corresponding webpage name, local or remote URL, object identifier or file name, version number, media type (e.g., text, PDF, JPEG, FLASH, JavaScript, etc.), element age or date/time of creation, and other information about the webpage content elements that may be useful for enabling receiver devices to determine whether to receive the content packages from a broadcast stream. The web content server 5 may coordinate with the broadcast operation center 4 to determine scheduled broadcast times for webpage content elements packages, as well as other broadcast information required for reception. The web content server 5 may generate content packet descriptions (CPDs) for transmission. Such content packet descriptions may be in the form of a catalogue listing of web content elements, which may be transmitted like other content catalogs carried by the broadcast network. The web content server 5 may provide the assembled webpage content element packages to the broadcast operation center 4 via an internal network dataflow 22a, along with the content packet descriptions via an internal network dataflow 24. The data packages may be stored until the appropriate broadcast time, at which point the broadcast operation center 4 may encode the appropriate packages which may be broadcast via the broadcast transmitters 2 as broadcast transmissions of webpage content files 40, and content description which may include the content file descriptions for the webpage content elements and with the file delivery table 50.

Figure 6:
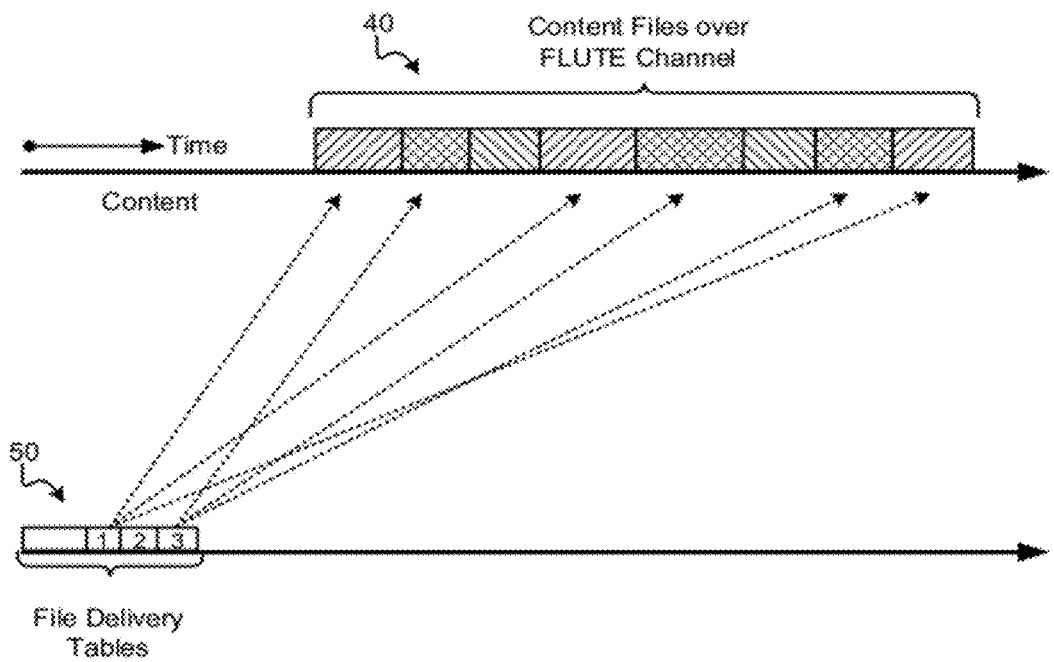
FIG. 6 is an illustration of an example relationship between broadcast content distributed over a FLUTE channel and a File Delivery Table (FDT) being broadcast according to an embodiment.

FIG. 6 is an illustration of content files 40 and file delivery tables 50. The file delivery table ("FDT") 50 may provide a mechanism for describing various attributes associated with content files 40 that may be delivered within the file delivery session. The following lists are examples of such attributes, and are not intended to be mutually exclusive nor exhaustive. Attributes related to the delivery of the content files 40 may include a TOI value that represents the content files 40, an FEC Object Transmission Information (including the FEC Encoding ID and, the FEC Instance ID), size of the transport object carrying the file, an aggregate rate of sending packets to all channels, attributes related to the file itself including but not limited to name, identification and location of file (specified by the URI), MIME media type of file, a size of the file, an encoding of file, and a message digest of file and other attributes as discussed herein. The FDT 50 may be a set of file description entries for content files 40 to be delivered in the session. Each file description entry may include the TOI for the file that it describes and the URI identifying the file. The TOI may be included in each ALC/LCT data packet during the delivery of the file, and thus the TOI carried in the file description entry may be how the receiver determines which ALC/LCT data packets contain information about which file. Each file description entry may also contain one or more descriptors that map the above-mentioned attributes to the file.

Each file delivery session may have an FDT 50 that may be local to the given session. The FDT 50 may provide a file description entry mapped to a TOI for each content file 40 appearing within the session. An object that may be delivered within the ALC session, but not described in the FDT 50, may not be considered a 'file' belonging to the file delivery session.

Within the file delivery session the FDT 50 may be delivered as FDT instances. An FDT Instance 1, 2, 3 shown in FIG. 6 may contain one or more file description entries of the FDT 50. Any FDT instance may be equal to, a subset of, a superset of, or complement any other FDT Instance. A certain FDT instance may be repeated several times during a session, even after subsequent FDT instances (with higher FDT instance ID numbers) have been transmitted. Each FDT instance may have at least a single file description entry and may have at most the complete FDT of the file delivery session.

A receiver device 10 of the file delivery session may keep an FDT database stored in memory for received file description entries. The receiver device 10 may maintain the database, for example, upon reception of FDT Instances. Thus, at any given time, the contents of the FDT database may represent the receiver device's 10 current view of the FDT 50 and the current view of the file delivery session.

Figure 7:
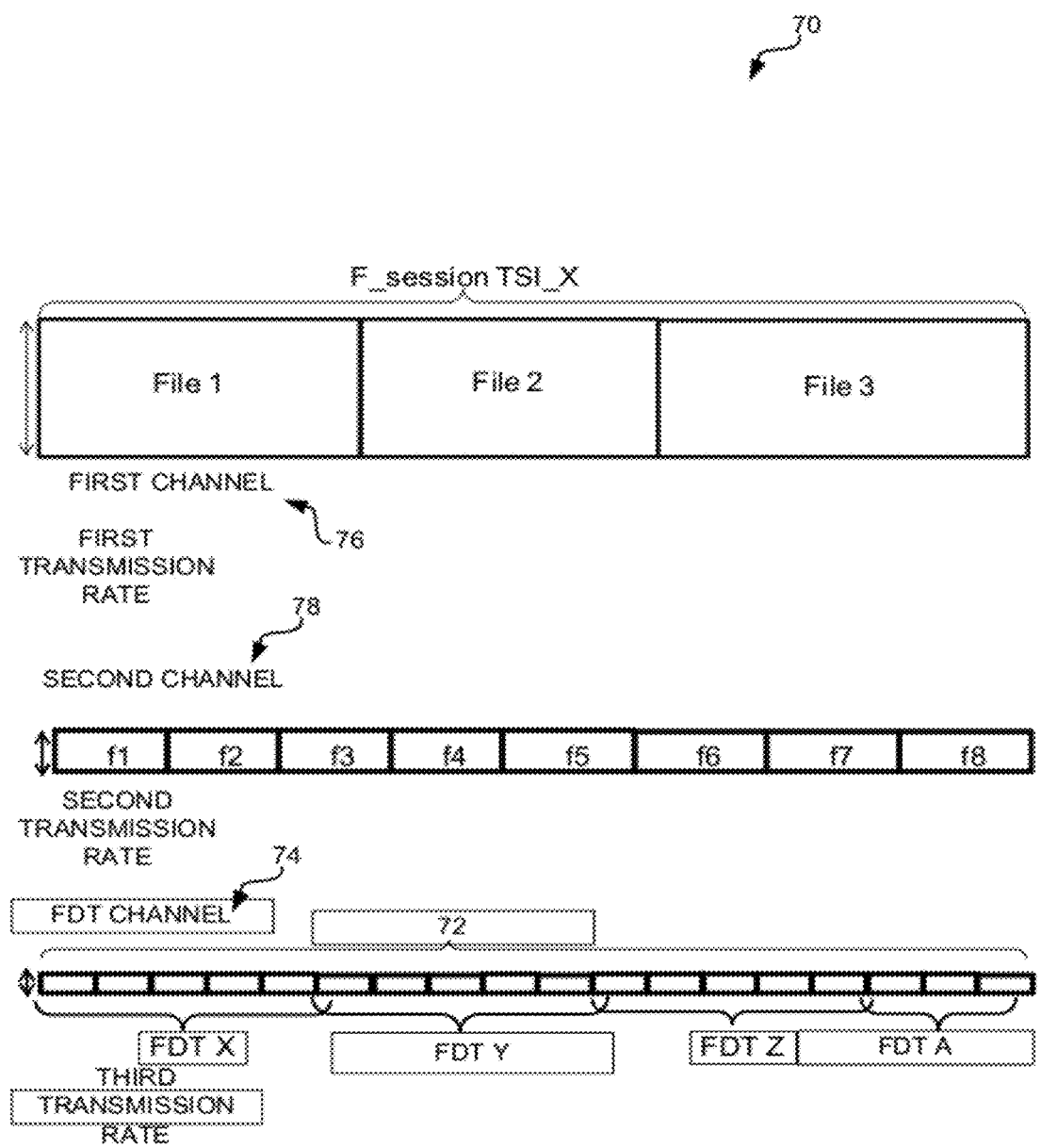
FIG. 7 is an illustration of an example relationship of a first FLUTE channel, a second FLUTE channel and a third FLUTE channel for broadcasting different data to a computing device.

FIG. 7 illustrates an embodiment of the broadcast of data using a FLUTE session 70. The FLUTE session 70 may define a file delivery table (FDT) 72, which may be broadcast over an FDT channel 74. The file delivery table 72 may be a data set that may be for signaling and mapping the properties of files to concepts of the Asynchronous Layered Coding. In an embodiment, the file delivery table 72 may be a set of file description entries for files to be delivered in the FLUTE session 70. Each FLUTE session 70 may have an file device table 72 that may be local to the FLUTE session 70 and that may assist with mapping the properties of files. Asynchronous Layered Coding may be a protocol instantiation of Layered Coding Transport (LCT) building blocks 454 and 456 described above with reference to FIG. 4B and Asynchronous Layered Coding may make use of the Forward Error Correction (FEC) building block 458 discussed above with reference to FIG. 4B. LCT may provide transport level support for reliable content delivery and stream delivery protocols. LCT may be compatible with layered congestion control protocols that may provide multiple rate delivery to receivers and may also compatible with layer coding techniques providing reliable content delivery.

An ALC/LCT session may include a set of logically grouped ALC/LCT channels associated with a single sender sending packets with ALC/LCT headers for one or more objects. A first channel 72 may be broadcast at a first data rate, for example 256 kbps or any other data rate known in the art. A second channel 78 may broadcast at a second different data rate, for example, 64 kbps. For example, data files File 1, File 2, and File 3, which may be relatively larger in size may be transmitted over the first channel 76 at the first data rate and data files f1, f2, f3, f4, f5, f6, f7, and f8, which may be relatively small files may be transmitted over the second channel 78 at the second data rate, which may be less than the first data rate.

A multiple rate or a single rate congestion control protocol may be used with LCT. A multiple rate congestion control protocol may be preferred where a session may have more than one channel and the sender may send packets to the channels in the session at rates that do not depend on the receivers. Each receiver may adjust its reception rate during its participation in the session by joining and leaving channels dynamically depending on the available bandwidth to the sender independent of all other receivers.

Layered coding refers to the ability to produce a coded stream of packets that may be partitioned into an ordered set of layers. The concept of layered coding may be extended to reliable content delivery protocols when Forward Error Correction (FEC) techniques may be used for coding the data stream. By using FEC, the data stream may be transformed in such a way that reconstruction of a data object may not depend on the reception of specific data packets, but only on the number of different packets received. As a result, by increasing the number of layers from which a receiver may be receiving, the receiver may reduce the transfer time accordingly.

Through FLUTE (via ALC/LCT), the broadcast operation center 4 described above with reference to FIG. 5 may support layered channels that may take advantage of scalable congestion control protocols and multiple FEC packet streams. The various embodiments may use ALC/LCT channels to support the transport of different classes of files. The various embodiments may also provide schedule information for the broadcast files. The schedule information may provide different ALC/LCT channels to address different targets of schedule freshness and to conserve battery resources of the receiver device 10.

The amount of web content that may be broadcast by a broadcast network implementing the various embodiments may be too great to be stored in memory of a receiver device 10. Thus, in an embodiment, a receiver device 10 may select a subset of the broadcast web content for reception and downloaded. Broadcast web content may be divided into one or more FLUTE channels 74, 76, 78 which may refer to broadcasts of webpage content element packages related to a given website or series of websites. Content from each web content provider may be organized to specific FLUTE channel 74, 76, 78 or another FLUTE channel.

For example, FILE 1, FILE 2, and FILE 3 may be News Central web data packets (i.e., the web packets corresponding to content provided by the hypothetical website News Central) may comprise the broadcasts of webpage content element packages including a main page template or program which may display the latest headlines corresponding to news stories stored in the local data store, an article template or program for formatting and displaying a raw news story, standard graphics or banners for the website, and the various data updates that include the raw news stories and images. Data packets may comprise video, audio, web television files, etc.

In some embodiments, users may select or subscribe to data they wish to access. The process of users selecting such data may inform the user's receiver device 10 about the webpage content element packages to receive and store, namely the webpage content element packages associated with the selected FLUTE channels. In this manner, the receiver device 10 may obtain the files in an asynchronous manner. In a further embodiment, the receiver device 10 may be configured to automatically select certain FLUTE channels based on any number of determined mobile parameters, such as customer demographics, user's browsing history, and/or marketing initiatives of the broadcast network service provider. In some embodiments, a user may be able to receive certain packets and a portion of the FLUTE channel and switch off to converse resources. Returning to the News Central example, a user might wish to subscribe to only top news stories, top sports stories, stories containing the word "Qualcomm," and/or editorials from a certain writer. So configured, a receiver device 10 may only receive content element packages from the first FLUTE channel 76, the second FLUTE channel 78 and the like corresponding to the packets desired.

Figure 8:
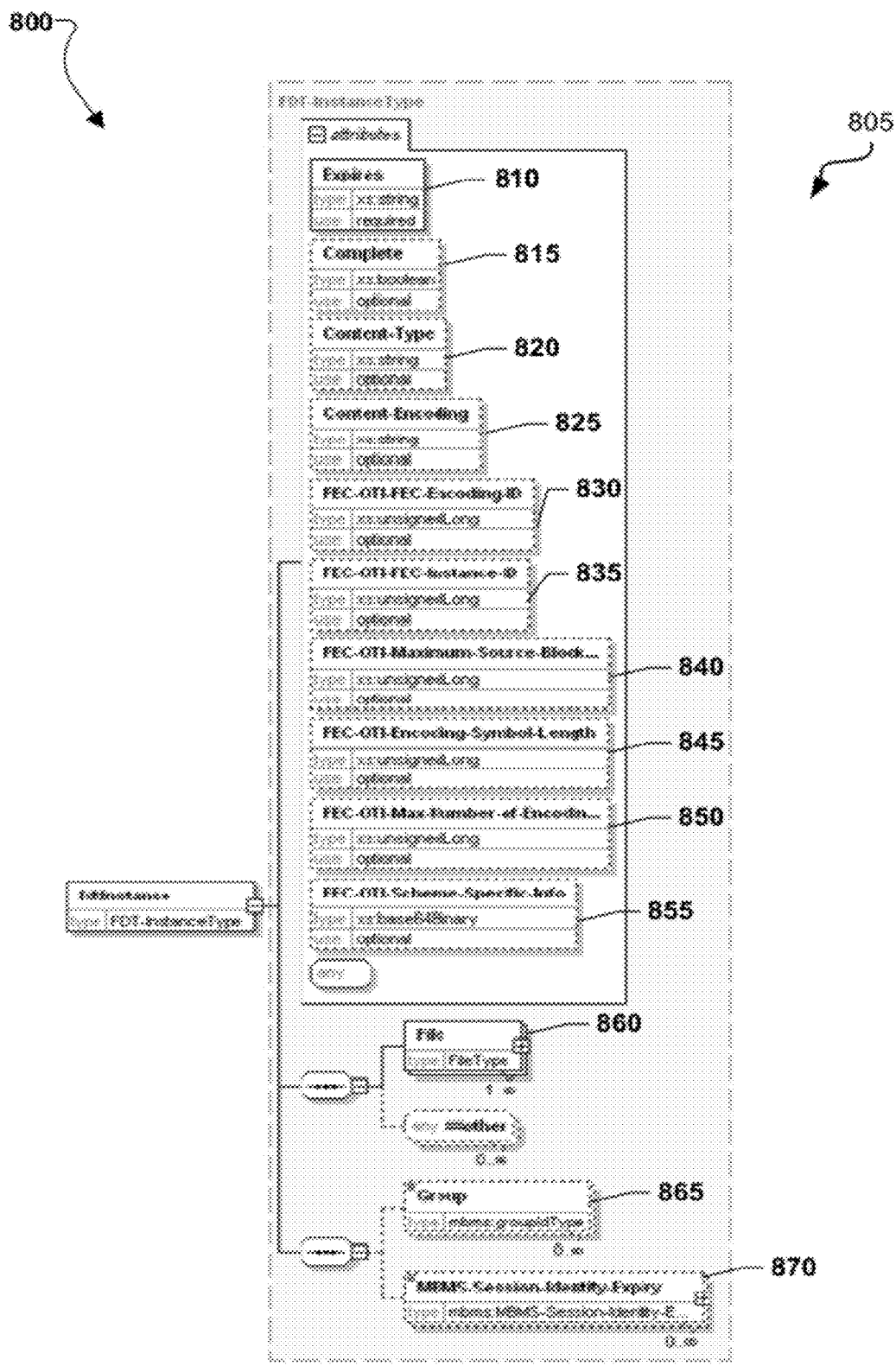
FIG. 8 is an illustration of an example relationship of a file delivery table having a number of attributes according to an embodiment.

FIG. 8 illustrates an embodiment representation of a FLUTE based FDT instance 800. The FDT instance 800 may include a number of attributes. The attributes may include an expiration attribute 810, a completion attribute 815, a content type attribute 820, a content encoding attribute 825, a forward error correction encoding identification attribute 830, a forward error correction instance identification attribute 835, an FEC maximum source block attribute 840, an FEC signal length attribute 845, an FEC maximum attribute 850, and a FEC scheme specific information attribute 855. The FDT instance 800 may also include a file instance 860, a group instance 865, and a Multimedia Broadcast and Multicast Service session identification expiration instance 870. Other FDT instances 800 attributes and instance may also be included and are within the scope of the present disclosure and/or file attributes and instances may be substituted for different attributes and instances.

Figure 9A:
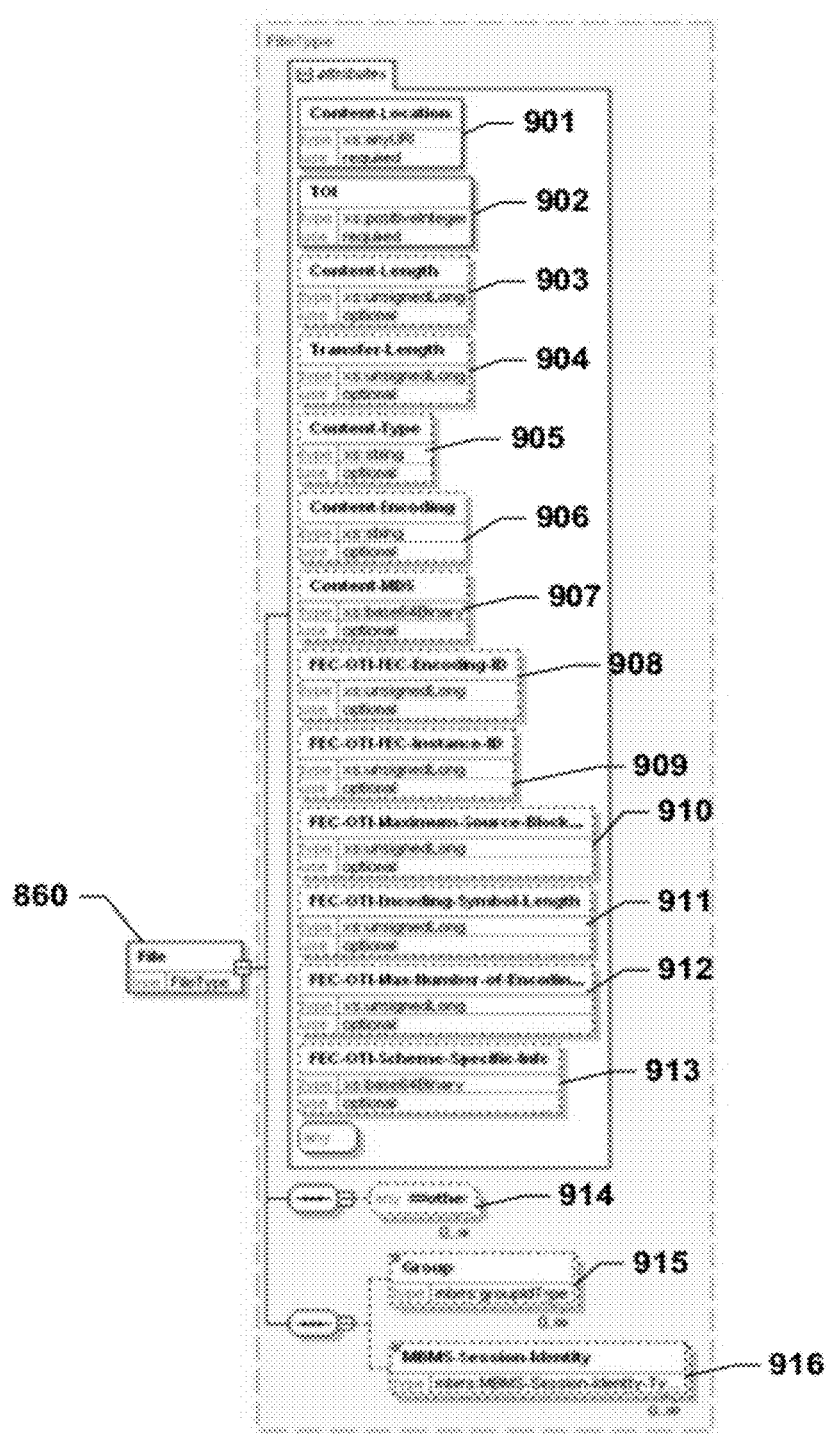
FIGS. 9A and 9B show two illustrations of example relationships of a file having a number of attributes described in a file delivery table according to an embodiment
Figure 9B:
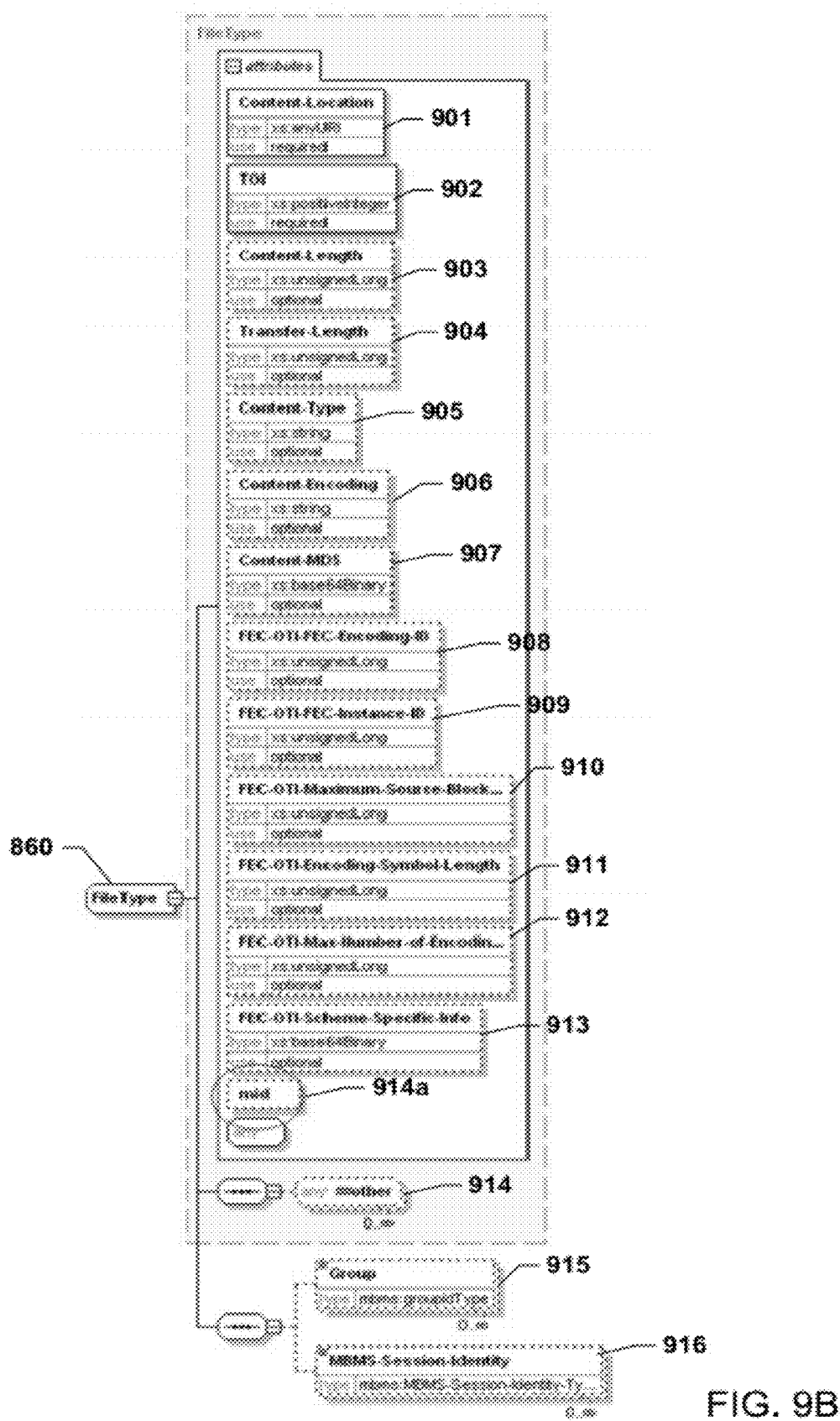

FIGS. 9A and 9B illustrate a number of file descriptors that may be includes in a file instance 860 described above with reference to FIG. 8. The file descriptors may include a content location descriptor 901, a Transport Object Identifier "TOI" descriptor 902, a content length descriptor 903, a content transfer length descriptor 904, a content type descriptor 905, a content encoding descriptor 906, a content MD5 descriptor 907 and a number of FEC descriptors. The FEC descriptors include an FEC encoding identification file descriptor 908, a FEC instance identification 909, a FEC OTI maximum source block 910, a FEC OTI encoding symbol length 911, an FEC maximum number of encoding descriptor 912, and an FEC OTI scheme specific attribute 913. The file instance 860 may also have a group file descriptor 914 and a Multimedia Broadcast and Multicast Service session identification file descriptor 915. Other file descriptors may be possible within the scope of the present disclosure, or some file descriptors may be substituted for others. In an alternative embodiment illustrated in FIG. 9B, the file instance 860 may also include a mid value 914a.

To start receiving a file delivery session, the receiver device 10 may need to determine the transport parameters associated with the session. The transport parameters of an ALC/LCT session that the receiver device 10 may need to determine may include a source IP address, a number of channels in the session, a destination IP address and a port number for each channel in the session, a Transport Session Identifier (TSI) of the session, an indication that the session is a FLUTE session, and whether de-multiplexing object may be needed.

In yet another embodiment, the receiver device 10 may use additional optional transport parameters associated with the session. These optional transport parameters may comprise a start time and end time of the session, an FEC encoding identification, such as FEC encoding identification 908 described above with reference to FIG. 9A, and an FEC instance identification, such as FEC instance identification 909 described above with reference to FIG. 9A when the default encoding may not be used for FDT, and the content encoding format may be utilized for the FDT. These parameters may be described according to some session description syntax such as SDP and in one non-limiting embodiment, SDP descriptors may be used to describe FLUTE sessions. Various configurations may be possible and within the scope of the present disclosure.

Figure 10:
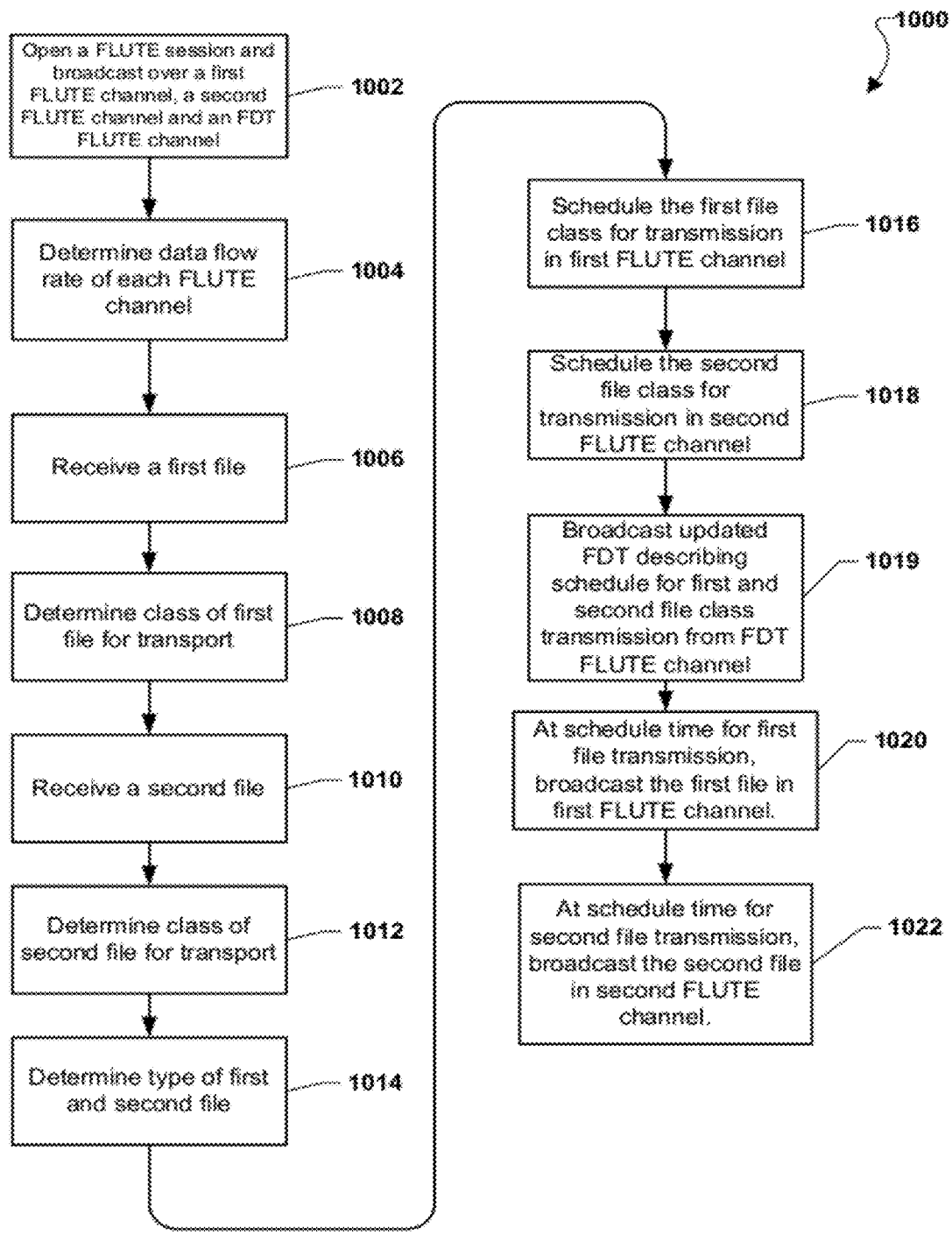
FIG. 10 is a high level process flow diagram of an embodiment method for sending content via a broadcast network using different FLUTE channels depending on a class of file and broadcasting FDT files via another FLUTE channel.

FIG. 10 illustrates an embodiment method 1000 for broadcasting certain files according to a file type on certain FLUTE channels. Traditionally, the FLUTE protocol has been used to send the same files through FLUTE channels possibly at different data rates, whereas the embodiment method 1000 may be used to broadcast different files through FLUTE channels. A forward error correction may be applied to the data. A receiver device 10 may receive date from FLUTE channels and obtain packets to increase a data rate of transmission.

Embodiment method 1000 may be implemented by a web content server 5 delivering data to a receiver device 10, described above with reference to FIG. 5. At block 1002, the web content server 5 may broadcast over a first FLUTE channel, a second FLUTE channel and a File Delivery Table dedicated FLUTE channel (i.e., FDT FLUTE channel).

At block 1004, the web content server 5 may determine broadcast parameters of each FLUTE channel. In one embodiment, a first FLUTE channel may be relatively larger and transmit in a unidirectional manner at a first data rate, for example, 256 k bits/second. In another embodiment, a second FLUTE channel may be relatively smaller than the first FLUTE channel and may transmit in a unidirectional manner at a second data rate, for example, 64 k bits/second. Still further in another embodiment, a third FDT channel may be even smaller than the second FLUTE channel and may transmit at a third data rate, for example, 10 k bits/second. Other broadcast parameters may be employed, for example, the FDT dedicated channel may receive updates very frequently and thus a receiver device 10 may not have to wait to receive critical FDT files.

At block 1006 the web content server 5 may receive a first file for transport to the receiver device 10. At block 1008 the file may be examined by the web content server 5 to determine a class of the file. Files may be transmitted in specific dedicated FLUTE channels depending on a class of file. A file's class may be a category descriptive of an attribute of the file, such as a delay tolerance associated with the file or a file size. In an embodiment, the method 1000 may be repeated for every file of a group of files received by the web content server 5. At block 1010 a second file may be received by the web content server 5 for transport to a receiver device 10 using the FLUTE protocol. At block 1012 a determination may again be made by the web content server 5 to determine a class of the second file for transport using the FLUTE protocol. At block 1014 the web content server 5 may determine the type of the first and second files. At block 1016 a first file class may be scheduled for broadcast over the first FLUTE channel, and at block 1018 the second file class may be scheduled for broadcast over the second FLUTE channel. At block 1019, an updated FDT file describing schedules for the first and the second file class transmissions via FDT FLUTE channel may be broadcast over the FDT FLUTE channel. At block 1020, at the scheduled time for the first file transmission, the web content server 5 may broadcast the first file via the first FLUTE channel. At block 1022, at the scheduled time for the second file transmission, the web content server 5 may broadcast the second file via the second FLUTE channel.

Figure 11:
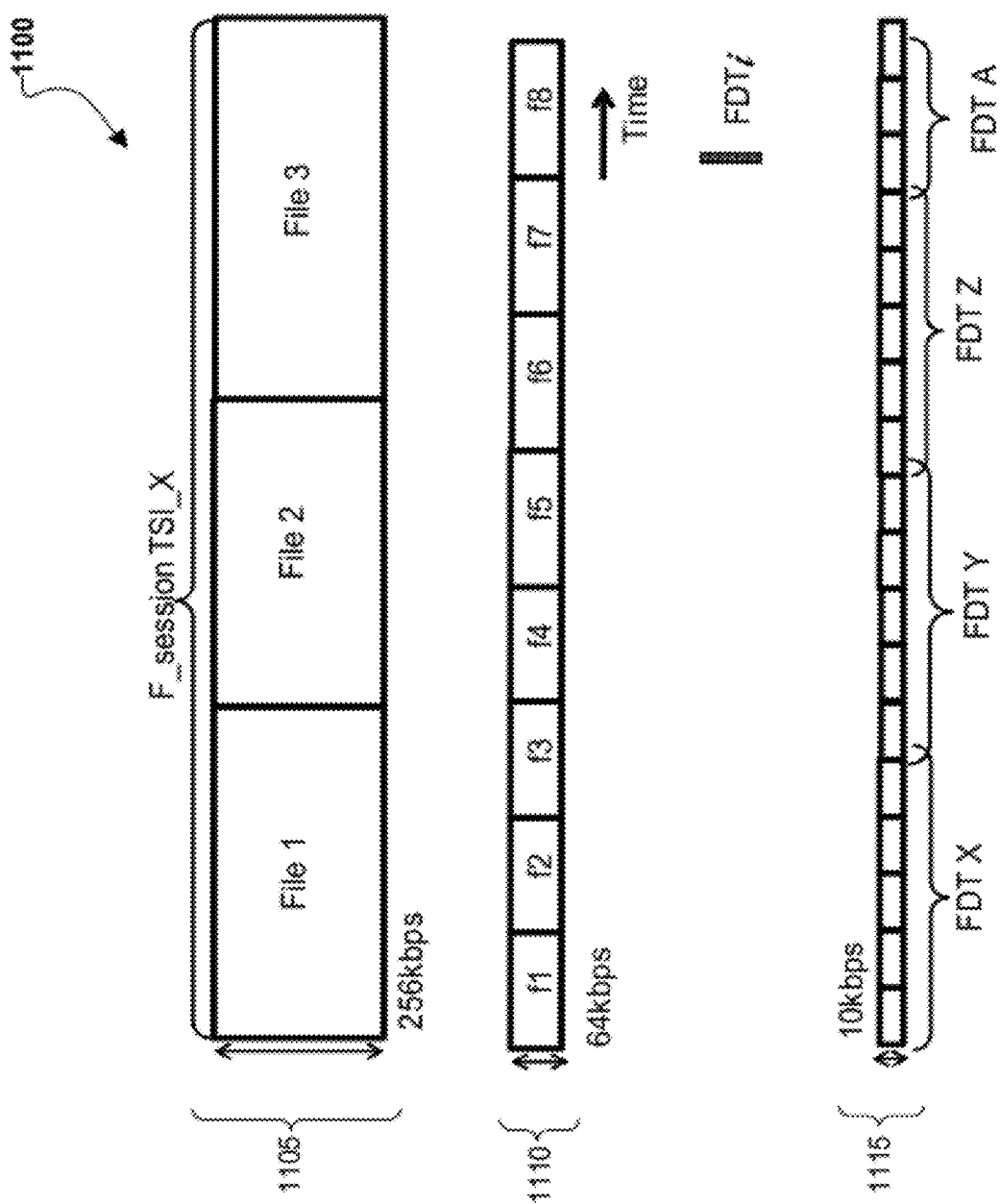
FIG. 11 is an illustration of the embodiment of FIG. 10 showing a first class of files being sent via a first FLUTE channel, a second class of files being broadcast via a second FLUTE channel and FDT files being broadcast via a third FLUTE channel.

In an embodiment, the web content may be broadcast periodically. Example message transmissions that may be implemented for broadcasting webpage content elements are illustrated in FIG. 11. FIG. 11 illustrates a FLUTE session 1100 in which files and packets may be broadcast over a number of FLUTE channels 1105, 1110, 1115. A web content provider server may generate mobile web page data and generate web content elements that are assembled into webpage content element files. The web content provider may send these files in packets to the broadcast network at any time (e.g., periodically in the form of updates). The broadcast network may periodically broadcast descriptions of the webpage content element packages that are broadcast. The receiver devices 10 may receive the packets using a specific FLUTE channel 1105, 1110 and 1115. In response, receiver device 10 may monitor the specific FLUTE channel 1105, 1110 and 1115 and receive packets corresponding to a request. However, the receiver device 10 may have to wait to receive the appropriate packets, before it can present the data to the user. Once the receiver device 10 has received all desired packets, the receiver device 10 may display an indication to the user that the selected website may be available for browsing.

To illustrate an example implementation of the method 1000, FIG. 11 will be described with reference to the illustrated FLUTE channels generally shown as reference numerals 1105 and 1110 that may be operable with a receiver device 10 and web content server 5. A first FLUTE channel 1105 may have a first data flow rate in a first FLUTE session 1100. For example, the first data flow rate may be 256 kbps. A second FLUTE channel 1110 may have a second data flow rate in the same FLUTE session 1100. As an example, the second FLUTE channel may transmit data at 64 kbps. An FDT channel 1115 may also transmit FDT data at a third data flow rate, for example 10 kbps. Various data flow rates may be possible and the illustrated data flow rates form no limitations to the present disclosure. The web content server 5 may be aware of the resources available per FLUTE channel. In an embodiment, the web content server 5 may assign a traffic based separation to the channels 1105 and 1110 based on the classes of files for transport. For example, a first class of file may tolerate a delay better than a second class of file and a selection of one FLUTE channel 1110 over another FLUTE channel 1105 may be appropriate. In this manner, the class of files with the higher tolerance for delay may be sent via the first FLUTE channel 1105 while the other class of file may be sent via the second FLUTE channel 1110. In another embodiment, a second class of file may be smaller or may be generated in a dynamic manner and have a certain latency requirement. In another embodiment, a class of file may be broadcast in a FLUTE channel that is originated by a third party or that may be application specific.

For example, the web content server 5 may monitor an amount of resources available on the first and the second FLUTE channel and review a threshold to dictate which FLUTE channel 1105, 1110, or 1115 may be appropriate to broadcast a certain predetermined class of file. The web content server 5 may also monitor latency between the first and the second FLUTE channels 1105 and 1110 and review a threshold to dictate which FLUTE channel 1105 or 1110 may be appropriate to broadcast a certain file type based on a first latency or a second latency. The web content server 5 may monitor a source of the files to determine an origin of the files and may direct the file based on the source to a desired FLUTE channel 1105, 1110, and 1115 that is appropriate to broadcast the file.

The receiver device 10 shown in FIG. 6 may also monitor the FLUTE channels 1105, 1110 and may monitor the FDT channel 1115 and receive the FDT files or files of interest within FLUTE channels 1105, 1110, and 1115. As an example, the receiver device 10 may receive FDT instances that indicate that a predetermined file (e.g., "f6") may be received on the second FLUTE channel 1110 at a predetermined time period. The receiver device 10 may stop receiving data for a period of time in order to converse resources and only receive data at a time corresponding to the transmission of the predetermined file (e.g., "f6") to capture and receive the predetermined file (e.g., "f6") using the second FLUTE channel 1110.

Figure 12:
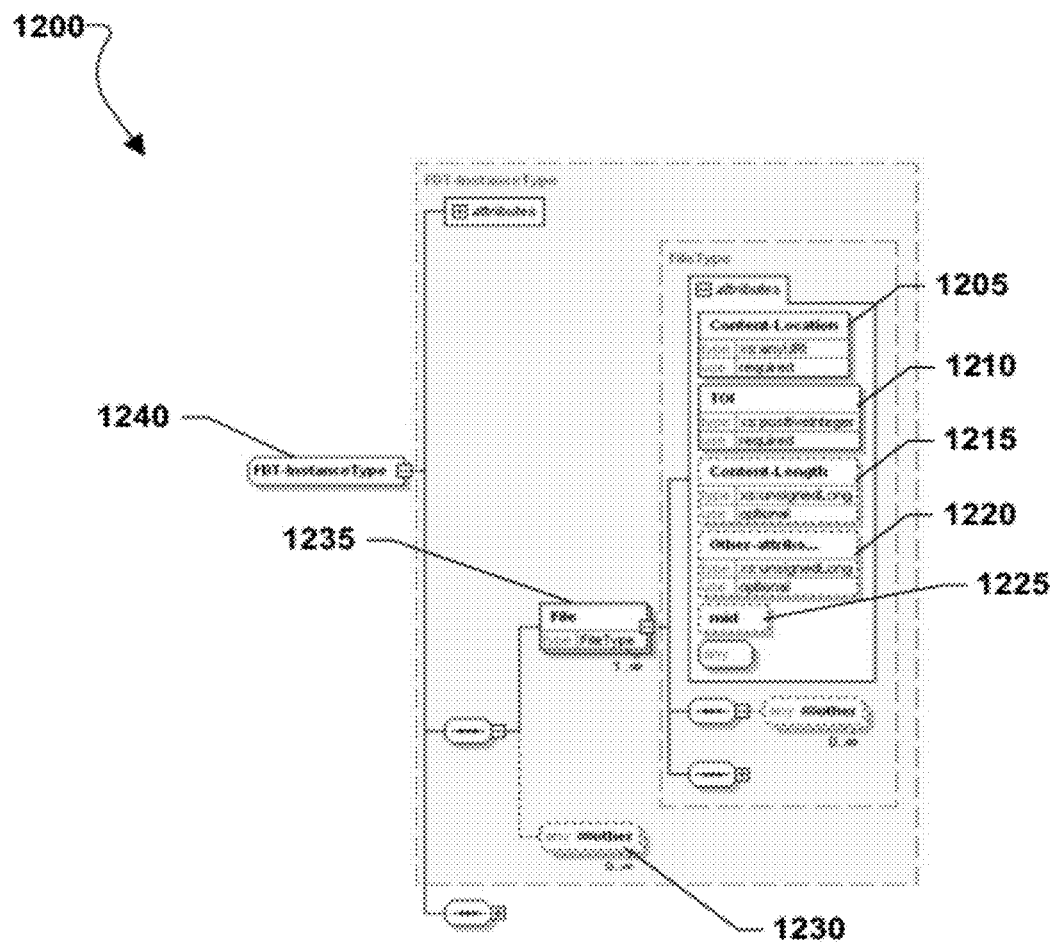
FIG. 12 is an illustration of an example relationship of a file delivery table and attributes contained therein.

FIG. 12 illustrates an FDT instance type 1200 having a number of instance type descriptors. The FLUTE based FDT instance type attribute 1240 may includes a number of attributes. The file attributes 1235 may include a content location attribute 1205, a transfer of information attribute 1210, a content length attribute 1215, attributes 1220, and media identification group attribute 1225.

The traffic separation of the classes of files between the first and the second FLUTE channels 1105 and 1110 may enable an allocation of resources to each class of files. The media identification attribute in a session description such as SDP may provide mapping for the FLUTE/ALC/LCT channels for the attribute 1225. This attribute 1225 may provide channel identification information. In another embodiment, the channel identification may be made to an FDT XML structure to separate the file streams in different FLUTE channels. It should be appreciated that a semantic identification with the FDT instance 1240 may be provided as textual information within the FDT instance attribute 1225.

Figure 13:
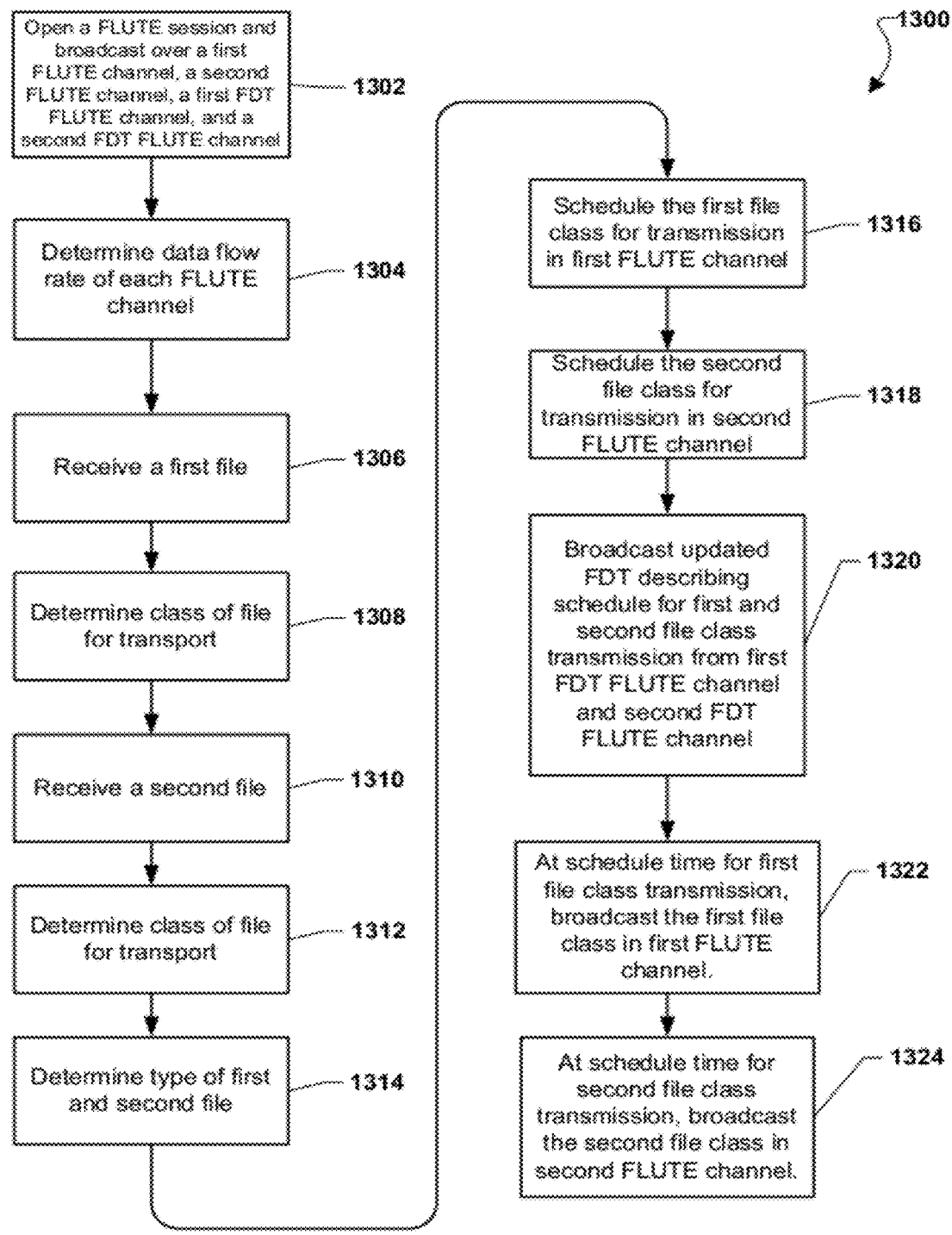
FIG. 13 is a high level process flow diagram of an embodiment method for sending content via a broadcast network using at least two different FLUTE channels depending on a class of file and broadcasting FDT files via two different FLUTE channels.

FIG. 13 illustrates an embodiment method 1300 operable within web content server 5. In an embodiment, traffic received by a receiver device 10 may have a number of predetermine latency requirements. For example, a file, which may be received by the receiver device 10, may have a mix of latency requirements. Some resources may be available hours in advance of a need. While some other resources are interrelated with activities that may be local may be needed sooner. For example, some applications may require a long update period while other applications may require an increased amount of updates or more frequent updates. Furthermore, accessing the FDT instances continuously may drain battery resources of the receiver device 10.

FIG. 13 illustrates an embodiment method 1300 for use in a web content server 5 operable with a broadcast of packets using a FLUTE protocol for the unidirectional delivery of packets. At block 1302, a web content server 5 may access a FLUTE session and broadcasting over a first FLUTE channel, a second FLUTE channel, a first FDT FLUTE channel, and a second FDT FLUTE channel. For example, the first FDT channel may broadcast at a first data rate, for example, 10 kbps and that refreshes at a first time period. Additionally, the second FDT channel may broadcast at the first data rate and refresh at a second time period. For example, the first time period may be 30 seconds while the second time period may be 15 minutes. For example, certain FDT files may be needed quicker than other files by the receiver device 10. For example, an immediate process may require files immediately (within seconds) and may receive one FDT instance from the FDT FLUTE channel that has a faster refresh period to quickly obtain the files. For example, another second different process may require files in several hours from and may receive from another FDT channel that has a longer refresh period to obtain the desired files.

The web content server 5 may determine broadcast parameters of each FLUTE channel at block 1304. In one embodiment, a first FLUTE channel may be relatively larger and transmit in a unidirectional manner at a first data rate, for example, 256 k bits/second for a high latency. In another embodiment, a second FLUTE channel may be relatively adapted different than the first FLUTE channel and may transmit in a unidirectional manner at a second data rate, for example, 64 k bits/second for low latency.

At block 1306 the web content server 5 may receive a first class of file for transport to a receiver device 10. The file may be examined and a determination may be made at block 1308 to determine a class of the file. At block 1310 the web content server 5 may receive a second class of file for transport to a receiver device 10 using the FLUTE protocol.

At block 1312 the web content server 5 may determine a class of the second file for transport using the FLUTE protocol. At block 1314 the web content server 5 may determine a type of file of the first and second file. At block 1316 a first file class type may be scheduled for transmission and broadcast from the first FLUTE channel. At block 1318 the web content server 5 may schedule a second file class type for broadcast from the second FLUTE channel and broadcast the second file type. In an embodiment, the broadcast may occur at the scheduled time for transmission, which may be determined by the web content server 5. At block 1320, an updated FDT describing the schedule may be broadcast from the first and the second FDT FLUTE channels. At block 1320, the first FDT file data may be broadcast from the first FDT FLUTE channel and the second FDT file data may be broadcast from the second FDT FLUTE channel. In an embodiment, the first FDT FLUTE channel may refresh more frequently than the second FDT FLUTE channel. In this manner, the web content server 5 may have improved schedule information transmitted more frequently to the receiver device 10 over another FDT channel. In this manner, improved schedule freshness may be achieved. At block 1322, at the scheduled time for the first file class transmission, the web content server 5 may broadcast the first file class via the first FLUTE channel. At block 1324, at the scheduled time for the second file class transmission, the web content server 5 may broadcast the second file class via the second FLUTE channel.

Figure 14:
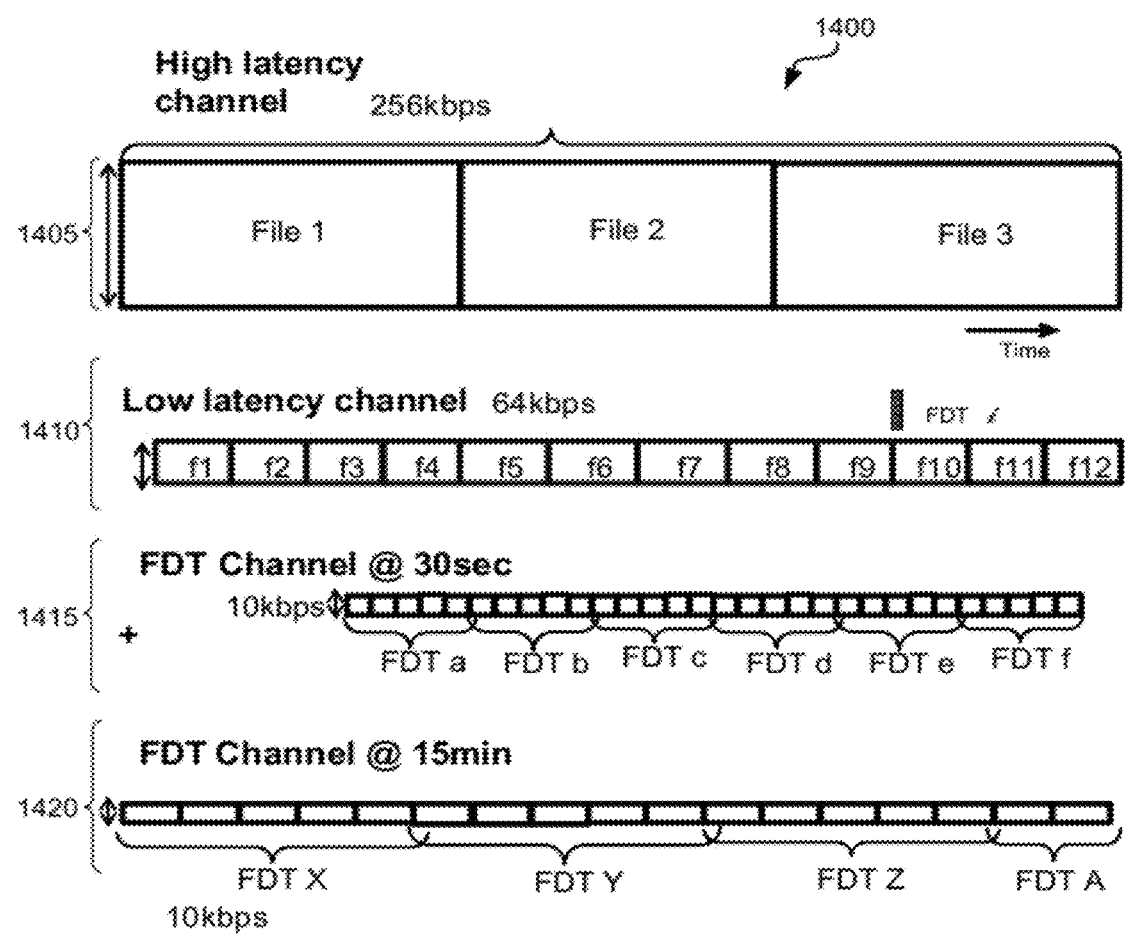
FIG. 14 is an illustration of the embodiment of FIG. 13 showing a first class of files being sent via a first FLUTE channel, a second class of files being broadcast via a second FLUTE channel and FDT files being broadcast via two different FLUTE channels to illustrate broadcasting FDT files with different update periods.

FIG. 14 is a high level schematic illustrating a first FLUTE channel 1405, a second FLUTE channel 1410, a first FDT FLUTE channel 1415, and a second FDT FLUTE channel 1420. The files streams indicate progression of time from left to right. The FDT instances may be separated into two different FDT FLUTE channels, 1415 and 1420, respectively, having two different update periods, for increased schedule freshness. In this manner, a receiver device 10 may in some instances require very current information to process immediately and may access a first FDT FLUTE channel 1415 (with a schedule freshness and target latency of every thirty seconds) and in other instances may require files much later and may access the second FDT FLUTE channel 1420, which may be updated at a different target period. Thus, if data is required immediately from an application or the like the receiver device 10 may not need to wait to access the data. The receiver device 10 instead may switch to a different FDT channel and locate the information immediately. In an embodiment, a device may receive from both FDT channels. For example, the device may receive from the slow changing one and the device may get files distributed well in advance of their need on the device, while from the fast changing one, the device may get information on freshly received files not known at the time the slow changing FDT was first broadcast. In another embodiment, a device may receive from only one channel, more than two channels, more than three channels, etc.

A first FLUTE channel 1405 may have a first data flow rate in the FLUTE session 1400 and the first FLUTE channel 1405 may broadcast file 1, file 2, and file 3. For example, the first data flow rate may be 256 kbps. A second FLUTE channel 1410 may have a second data flow rate in the same FLUTE session 1400 and may broadcast files f1, f2, f3, f4, f5, f6, f7, f8, f9, f10, f11, and f12 in the second FLUTE channel 1410. As an example, the second FLUTE channel may broadcast data at 64 kbps. A first FDT FLUTE channel 1415 may broadcast FDT instances at a third data flow rate, for example 10 kbps. The first FDT FLUTE channel 1415 may broadcast FDT instances FDT a, FDT b, FDT c, FDT d, FDT e, and FDT f. In an embodiment, a second FDT FLUTE channel 1420 may also be broadcasting data and may be cycling the files at a longer interval than the first FDT FLUTE channel 1415. For example, more recent FDT files may be delivered more frequently in the first FDT FLUTE channel 1415 relative to the second FDT FLUTE channel 1420. In another embodiment, there also may be two or more FDT FLUTE channels with each of the FDT FLUTE channels broadcasting at two or more different target latency periods.

Various data flow rates are possible and the illustrated amounts form no limitations to the present disclosure. As can be seen, a broadcast transmitting device or web content server 5 or broadcast operation center 4 may determine the resources available per FLUTE channel 1405, 1410, 1415, and 1420, for instance from a session description using SDP. Therefore, the web content server 5 may deliver fresher FDT instances using two different FDT channels 1415 and 1420 for transport of FDT instances. For example, the web content server 5 may monitor an amount of resources available on the first and the second FDT channels 1415, 1420 and review a threshold to dictate which FLUTE channel is appropriate to broadcast a number of certain FDT instances FDT a through FDT f on the first FDT channel 1415 or FDT x, FDT y, FDT z, and FDT A on the second FDT FLUTE channel 1420. The web content server 5 may also monitor latency and review a threshold to dictate which FLUTE FDT channel 1415 or 1420 may be appropriate to broadcast based on a first latency or a second latency. The web content server 5 may monitor the type of the receiver device 10 and/or a source of the files to determine an origin of the files, and may direct the file based on the source to a desired channel that is appropriate to broadcast the file.

The web content server 5 may include a threshold for a target latency. This target may be for each of the first and the second FDT FLUTE channels 1415 and 1420. The first FDT FLUTE channel 1415 may have a first update period, for example, an update period of every fifteen minutes or the like. The second FDT channel 1420 may have a second different update period, for example, an update period of every thirty seconds or the like. The receiver device 10 may also have a predetermined delivery period for content. For example, the delivery period may include delivery in 60 minutes from FLUTE channel 1410. In this instance, the receiver device 10 may schedule with a relative larger update period. However, in the event that the delivery period is small, for example, in the next ten seconds, receiver device 10 may schedule with a relative smaller update period. In yet another embodiment, the receiver device 10 may schedule according to an application specific criteria.

The web content server 5 may include an application specific threshold. The application specific threshold may be configured to have a latency requirement or some target latency. This target may be for interactivity with other applications or for other services. For example, the application may have a first latency for a predefined resource and request capture of the FDT upon service activation but at a later time may have delivery time latency for an update or the like. For each of the above application specific requirements, the receiver device 10 may capture some files using either of the first and the second FDT channels 1415 and 1420.

The web content server 5 may further include a file delivery framework which may monitor a first FDT FLUTE channel 1415 or monitor another second FDT FLUTE channel 1420. This monitoring particularly in a computing device may drive battery consumptions. Therefore, the receiver device 10 may monitor the first FDT FLUTE channels 1415 and for last minute updates monitor the second FDT FLUTE channel 1420 to conserve battery consumption of the receiver device 10.

In another embodiment, a receiver device 10 may monitor the second FDT FLUTE channel 1420 to conserve battery power of the computing device. However, in the event that the receiver device 10 did not receive certain files, the receiver device 10 may quickly access the first FDT FLUTE channel 1415 to provide the missing information or FDT files. For example, in another embodiment, a session description syntax sample may include specific FDT latency parameters listed for specific FDT channels. For example, the FDT FLUTE channels 1415 and 1420 may include a specific latency attribute attributed to the specific channel 1415, 1420. For example, the latency period attribute may be listed as a period in a number of seconds. For example, an SDP sample for a media portion may list the latency as "a=fdt-latency30". This textual information may indicate thirty second latency for the particular FDT channel or any arbitrary value. Various attributes are possible within the attributes and within the scope of the present disclosure.

Figure 15:
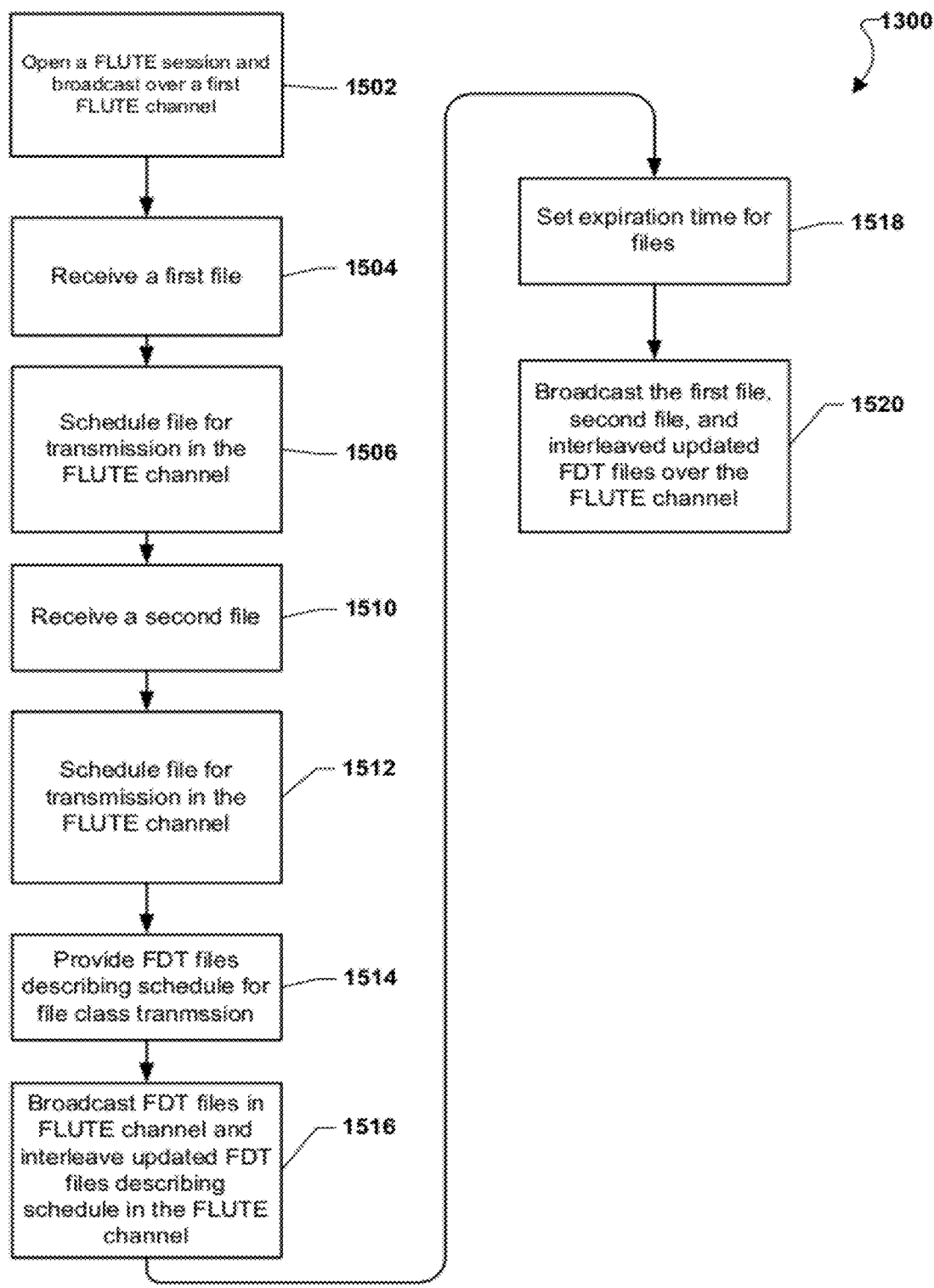
FIG. 15 is a high level process flow diagram of an embodiment method for sending content via a broadcast network using a common transport protocol for broadcasting at least two different classes of files and FDT files.

FIG. 15 illustrates an embodiment method 1500 for using a single FLUTE session to carry multiple receiver user services. At block 1502, the web content server 5 opens a FLUTE session and broadcasts over a first FLUTE channel using a single common transport service channel. For example, the FLUTE channel may broadcast at a first data rate and refresh at a first time period.

At block 1504 the web content server 5 may receive a first file. At block 1506 the web content server may schedule the first file for transmission in the FLUTE channel. In one embodiment, the FLUTE channel may be relatively large and transmit in a unidirectional manner at a first data rate, for example, 256 k bits/second. In another embodiment, the FLUTE channel may be relatively smaller and may transmit in a unidirectional manner at a second data rate, for example, 64 k bits/second.

At block 1510 a second file may be received by the web content server 5. At block 1512 the second file may be scheduled for transmission in the FLUTE channel. At block 1514, the FDT files may be provided. The FDT files may describe schedules for file class transmission. At block 1516 the FDT files may be broadcast and the updated FDT files may be interleaved describing schedule information in the FLUTE channel. FDT files may be interleaved between the first file and the second files. The expiration time for the FDT files may also be configured at block 1518. In the various embodiments, interleaved may be interpreted as periodically broadcasting the FDT instance between the first file and the second file, broadcasting the FDT instance between the first file, broadcasting the FDT instance between the second file, or broadcasting a first FDT instance between a second FDT instance. At block 1520 the first file, second file, and interleaved updated FDT files may be broadcast over the FLUTE channel.

Previously, FLUTE was utilized to place files in one channel for transport and transmit the same files again in a second channel. The embodiments of the present disclosure preferably uses separate file and FDT transport in FLUTE channels. In another embodiment, the FLUTE channels may be multiple channels and FDT files may be separated in separate channels based on a classification parameter of the FDT files.

Figure 16:
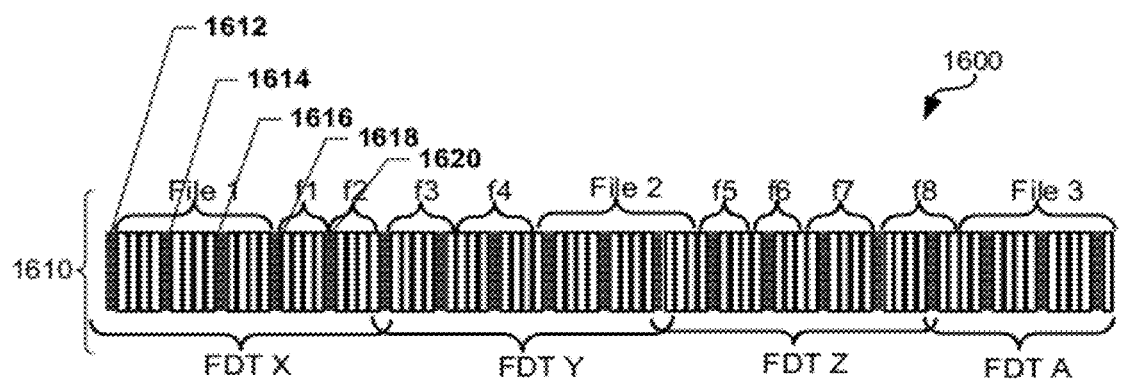
FIG. 16 is an illustration of the embodiment of FIG. 15 showing the common transport protocol.

FIG. 16 illustrates a broadcast configuration 1600 having a first FLUTE channel 1610 which may function as a common transport service for delivering files. FLUTE channel 1610 may be configured in one embodiment to transport data using multimedia broadcast and multicast services and may allow for an efficient transmission of signals in an efficient manner. FLUTE channel 1610 may allow receiver device 10 to capture data associated with the common transport service and to provide service discovery for common transport of files within the same FLUTE channel 1610.

Files File 1, f1, f2, f3, f4, File 2, f5, f6, f7, f8, and File 3 may be broadcast as packets using the FLUTE channel 1610.

Additionally, packets for a set of FDT files FDT X, FDT Y, FDT Z, and FDT A may be interleaved between the packets of files corresponding to File 1, f1, f2, f3, f4, File 2, f5, f6, f7, f8, and File 3 and broadcast using the same FLUTE channel 1610. As an example, FDT X may be broken into five packets, 1612, 1614, 1616, 1618, and 1620 which may be interleaved with the packets of files corresponding to File 1. In this manner the broadcast on the FLUTE channel 1610 may be interleaving the first file delivery table within the plurality of packets for each file. FDT Y, FDT Z, and FDT A may be interleaved with the packets of files f1, f2, f3, f4, File 2, f5, f6, f7, f8, and File 3 in a similar manner. In an embodiment, the packets for a set of FDT files may be transmitted in carousel. In an embodiment, packets for a set of FDT files may be broadcast interleaved within the packets of files at intermittent predetermined points within the broadcast transmission of the packets of files. A receiver device 10 may monitor and note a time period contained within at least one FDT that a certain file, for example, the packets corresponding to File 2 may be broadcast. The receiver device 10 may stop monitoring the FLUTE channel 1605 for a second time period to converse battery power, to conserve processing, or to perform other tasks. At the expiration of the second time period, the receiver device 10 may re-monitor the FLUTE channel 1605 during the noted time period to receive the packets corresponding to File 2 shown. In an embodiment, broadcast configuration 1600 may reduce network signaling overhead. In an embodiment, broadcast configuration 1600 may provide an active session for at least as long as the resources are available. In an embodiment, broadcast configuration 1600 may provide a configuration where the common transport service on the FLUTE channel 1605 may provide a single session to provide resources and provide file transport.

In another embodiment, a second FLUTE channel may be provided and packets for a set of files may be delivered in the second FLUTE channel while transmitting different packets for a set of files in the first FLUTE channel. In yet another embodiment, three FLUTE channels may be provided and packets for files may be delivered in the third FLUTE channel for improved transport and to enable file stream separation of traffic.

Figure 17:
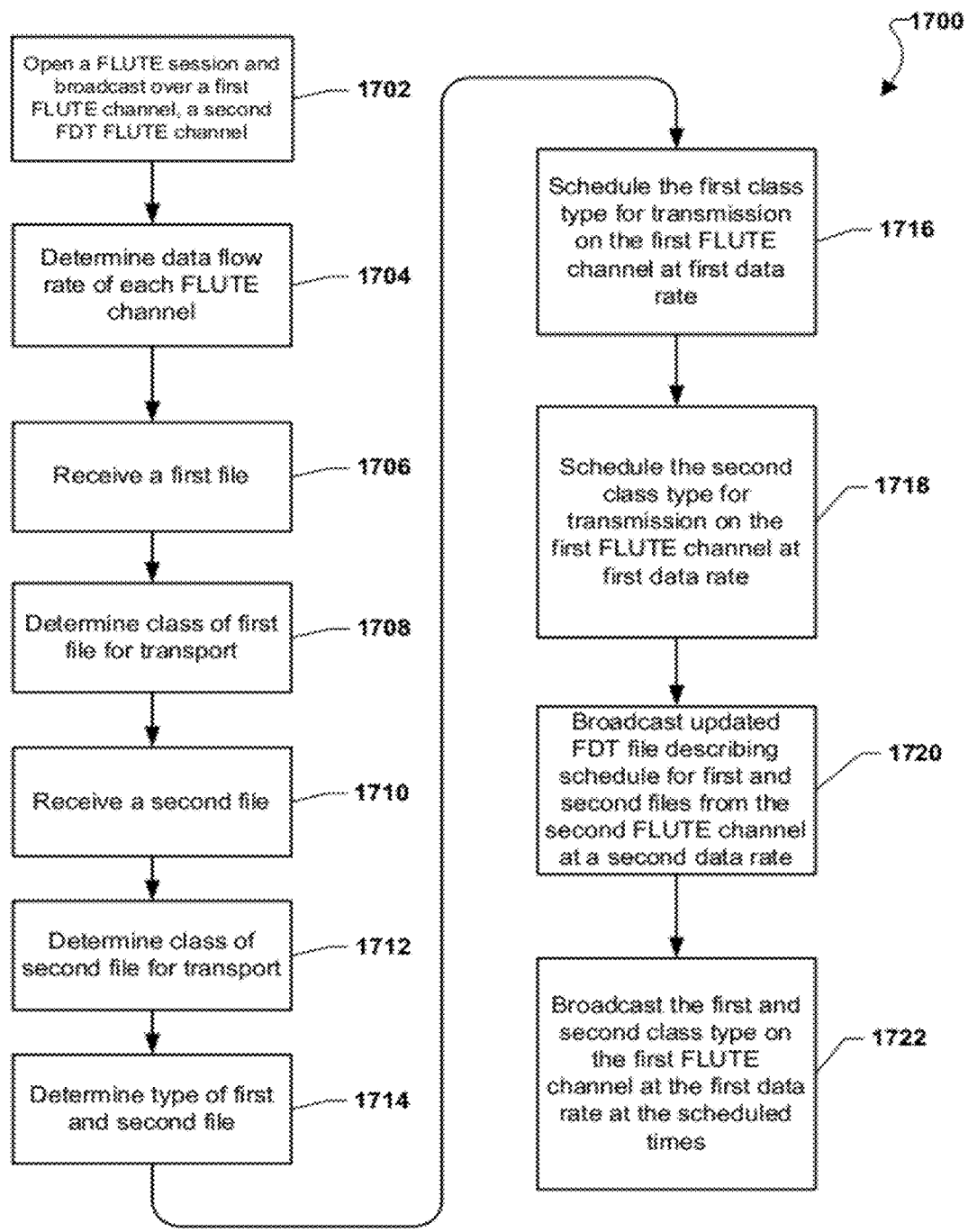
FIG. 17 is a high level process flow diagram of an embodiment method for broadcasting content via a broadcast network using a first FLUTE channel for broadcasting at least two classes of files and a second FLUTE channel for broadcasting a file delivery table.

FIG. 17 illustrates an embodiment method 1700 for utilizing a single FLUTE session to carry multiple receiver user services. The web content server 5 may be applicable to the broadcast of a FLUTE protocol for unidirectional delivery of files. At block 1702, the web content server 5 may open a FLUTE session and broadcast over a first FLUTE channel and a second FDT FLUTE channel. For example, the first channel may broadcast at a first data rate and that refreshes at a first time period while the second FLUTE channel may broadcast at a second data rate and that refresh at a second different time period.

At block 1704 the web content server 5 may determine the data rate of each FLUTE channel for the first FLUTE channel and the second FDT FLUTE channel. For example, the first FLUTE channel may have a first data rate, for example, 246 kbps while the second FDT FLUTE channel may have a second data rate, for example, 10 kbps. The web content server 5 may receive a first file at block 1706 and at block 1708 may determine a class of the first file for transport. At block 1710 the web content server 5 may receive a second class of file. At block 1712 the web content server 5 may determine the class of the second file for transport.

At block 1714 the web content server 5 may determine the type of the first and the second files to enable the web content server 5 to transmit the desired files in the first FLUTE channel according to the data rate, file expiration, and latency. At block 1716 the web content server 5 may schedule the first class type for transmission on the first FLUTE channel. At block 1718 the second file class type may be scheduled for transmission on the first FLUTE channel. For example, the first file class type may be sent in a number of packets several packets corresponding to a number of files of the second class type can be sent in the first FLUTE channel. In an embodiment, the web content server 5 may broadcast files associated with the first file class type. In this aspect, the first FLUTE channel may be dedicated and includes predetermined files while the second FLUTE channel may also be dedicated and broadcasts packets for a set of FDT files.

At block 1720, a number of FDT files may be provided. Updated FDT files describing schedules for the first and the second file classes may be broadcast. The web content server 5 may broadcast FDT files from the second FLUTE channel in a dedicated manner. The expiration time for the FDT files may be also configured at block 1720 and supplied as a semantic extension within the FDT instance. At block 1722 the first file class and the second file class may be broadcast on the first FLUTE channel at their scheduled times.

Figure 18:
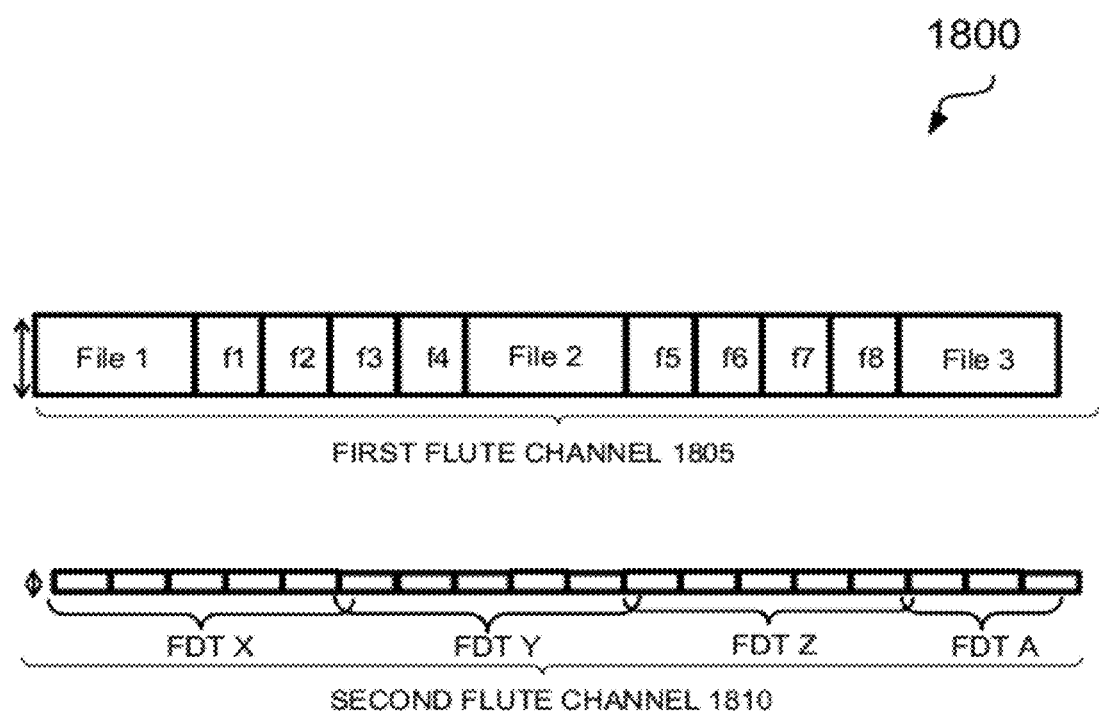
FIG. 18 is an illustration of the embodiment of FIG. 17 showing content broadcast using a first FLUTE channel for broadcasting at least two classes of files and a second FLUTE channel for broadcasting a file delivery table.

FIG. 18 illustrates a FLUTE session 1800 comprising a first FLUTE channel 180 and a second FLUTE channel 1810. In FLUTE session 1800 the first FLUTE channel 1805 may contain a separation of packets for a set of files File 1, f1, f2, f3, f4, File 2, f5, f6, f7, f8, and File 3 while the second FLUTE channel 1810 may contain FDT files FDT X, FDT Y, FDT Z, and FDT A.

In an embodiment, a first FLUTE channel 1805 may be opened and broadcast data at a first data rate. For example, the first data rate may be 246 kbps. In the same FLUTE session 1800, a second FLUTE channel 1810 may be opened and broadcast data at a second different data rate. For example, the second data rate for the second FLUTE channel may be 10 kbps. Packets for a set of files File 1, f1, f2, f3, f4, File 2, f5, f6, f7, f8, and File 3 represent packets from two different classes of files that are transmitted in the first FLUTE channel 1805 at the first data rate. As an example, files File 1, File 2, and File 3 may be of a first class of files and files f1, f2, f3, f4, f5, f6, f7, and f8 may be of a second class of files.

In the second FLUTE channel 1810, packets for a set of FDT files FDT X, FDT Y, FDT Z, and FDT A may be broadcast. Thus, different data rates for packets File 1, f1, f2, f3, f4, File 2, f5, f6, f7, f8, and File 3 and different data rates for packets for FDT files FDT X, FDT Y, FDT Z, and FDT A may be formed and allocated. The packets for FDT files FDT X, FDT Y, FDT Z, and FDT A may have a dedicated FLUTE channel 1810 that enables file stream separation. The receiver device 10 may thus locate a predetermined FDT instance by a dedicated FDT channel 1810. For example, the receiver device 10 may perform a separate search for a single FDT file FDT X.

Additionally, the packets for FDT files FDT X, FDT Y, FDT Z, and FDT A may be transmitted in a predetermined transmit mode having a specific latency or expiration parameter that may be advantageous. Additionally, the packets for files scheduled for transmission in the first FLUTE channel 1805 may be broadcast with an actual time that the file 1815*a* is available. For example, the FLUTE session 1800 may include that the transmission time of the files File 1, f1, f2, f3, f4, File 2, f5, f6, f7, f8, and File 3. In an embodiment, the FDT files FDT X, FDT Y, FDT Z, and FDT A may include transmission time information for the files File 1, f1, f2, f3, f4, File 2, f5, f6, f7, f8, and File 3. In an alternative embodiment, an FDT instance may also reflect a particular file size.

Additionally, the receiver device 10 may schedule a fixed time to receive an FDT file, such as FDT Y, without having to monitor in a continuous manner the entire broadcast FDT channel to conserve resources. Further, the receiver device 10 may adjust a file transmission time to receive a current FDT file, such as FDT Y (and sleep for a remainder) without having to monitor in a continuous manner to the FDT channel 1810 to conserve resources. Broadcasting webpage content elements in preannounced broadcast windows may enable receiver device 10 to conserve battery power, since receiver device 10 only needs to activate its receiver circuitry when a required webpage content element is to be broadcast. Thus, the various embodiments may enable a broadcast network to broadcast webpage content elements for a large number of websites without reducing the effective battery life of receiver devices 10 since receiver devices 10 only receive the broadcast content for which the user has expressed an interest, such as by accessing an attribute in the instance that relates to a broadcast interval of files.

In one embodiment, packets of files may be amended to utilize the first and the second FLUTE channels 1805 and 1810. For example, file packets may inherit certain attributes while at the same time introducing other file attributes in order to broadcast on the first FLUTE channel 1805 and the second FLUTE channel 1810. For example, the packets of the respective classes of files, such as File 1 and FDT X, may include a descriptor channel token. This token may be a semantic extension so media may be identified by a "mid" value located within the file. For example, an SDP sample may include in a media part a semantic text value of 1 or 2 that identifies the first FLUTE channel 1805 or the second FLUTE channel 1810. In another embodiment, the FDT file may have XML to indicate a specific channel.

For example, the packets of the respective classes of files, such as File 1 and FDT X, may include a file channel semantic extension. This semantic expression may be so media may be identified by a "mid" value and identified by a file channel line that may be added for file transport. For example, an SDP sample may include in a media part a mid value of 1 or 2. This "mid value" may identify the first FLUTE channel 1805 or the second FLUTE channel 1810 and identifies by a notation "group:FC" the channels used for file transport and identifies by a notation "group:DC" the channels used for file descriptor (i.e., FDT) transport. For example, the SDP sample may include a semantic token extension. The extension may include a=group:DC1 to signal channel 1 for FDT transport, and a=group:FC2 to signal channel 2 for file transport (broadcasting) using the respective predetermined FLUTE channels. For example, the packets of the respective classes of files File 1 and FDT X may also include a temporary mobile group identity ("TMGI") per channel, to signal per-channel transport in an MBMS implementation over LTE networks. This may separate reception of each channel 1805 and 1810 and provide a transport configuration. In an embodiment, the FLUTE session 1800 may provide dynamic scheduling of files, such as File 1 and FDT X, relative to available resources for the receiver device 10.

Figure 19:
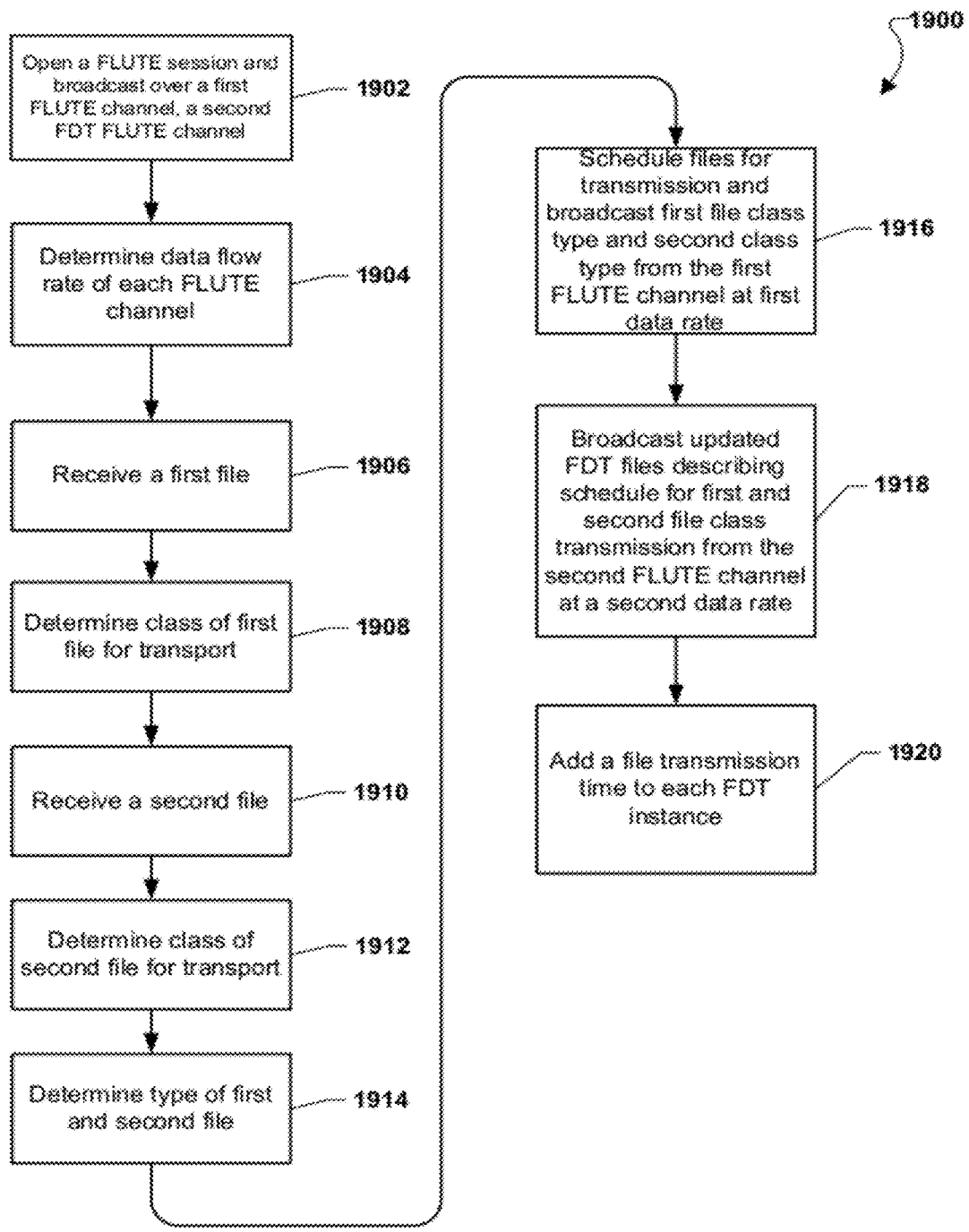
FIG. 19 is a high level process flow diagram of an embodiment method for broadcasting content via a broadcast network using a first FLUTE channel for broadcasting at least two classes of files and a second FLUTE channel for broadcasting a file delivery table that includes a file transmission time.

FIG. 19 illustrates an embodiment method 1900 for accessing a single FLUTE session to carry multiple receiver user services which may be applicable to a FLUTE protocol for unidirectional delivery of files. At block 1902 the web content server 5 may open a FLUTE session and may broadcast over a first FLUTE channel and may broadcast over a second FLUTE channel. For example, the first channel may broadcast at a first data rate and may refresh at a first time period while the second FLUTE channel may broadcast at a second data rate and may refresh at a second different time period.

At block 1904 the web content server 5 may determine broadcast parameters for each FLUTE channel. For example, the first FLUTE channel may have a first data rate, for example, 256 kbps while the second FLUTE channel may have a second data rate, for example, 10 kbps. The web content server 5 may receive a first file at block 1906 and at block 1908 the web content server 5 may determine a class of the first file for transport.

At block 1910 the web content server may receive a second file. At block 1912 the web content server 5 may determine the class of second file for transport. At block 1914 the web content server 5 may determine a type of file of the first and the second file. The class of files may be used to transmit some files in the first FLUTE channel according to the data rate, file expiration, and latency. At block 1916 the web content server 5 may schedule files for transmission and the first and second file class type may be broadcast from the first FLUTE channel.

At block 1918, a number of FDT files may be provided and the FDT files may be broadcast from the second FLUTE channel in a dedicated manner and updated FDT files that may describe the schedule for the first and second class files transmission may be broadcast from a dedicated FLUTE channel. At block 1920, each of the FDT files may comprise a transmission start time and a transmission stop time. In another embodiment, the each of the FDT files may also further include a latest start time. In this manner, the receiver device 10 may receive a transmission start time for a first FDT file that is not of interest and stop monitoring. The receiver device 10, once again, may commence receiving data at the conclusion of the broadcast transmission of the first FDT file to search for a second FDT file that is of interest. The FDT files may describe schedules for first and second file class transmission and thus the receiver device 10 may listen for additional classes of files only at specific times to conserve resources, such as receiver device 10 battery life.

Figure 20:
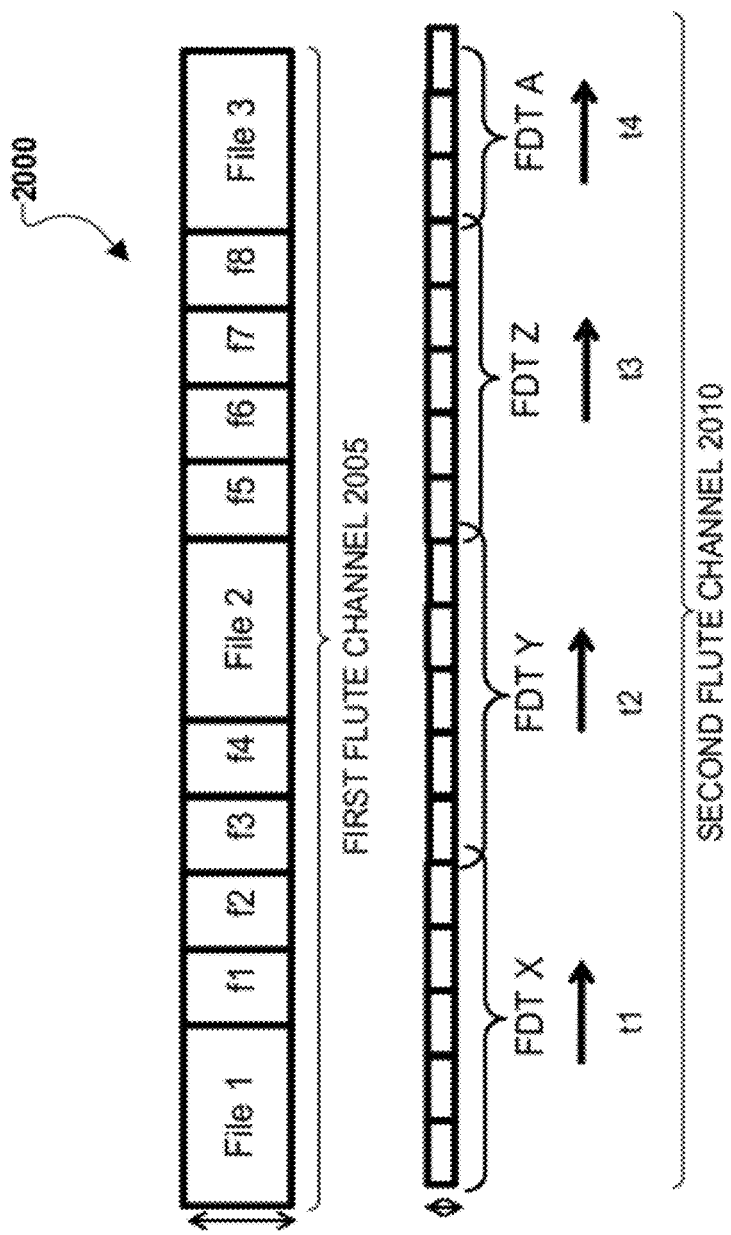
FIG. 20 is an illustration of the embodiment of FIG. 19 showing broadcasting content using a first FLUTE channel for broadcasting at least two classes of files and a second FLUTE channel for broadcasting a file delivery table that includes a file transmission time.

FIG. 20 illustrates a FLUTE session 2000 comprising a first FLUTE channel 2005 containing separated data files File 1, f1, 12, f3, f4, File 2, f5, f6, f7, f8, and File 3 and a second FLUTE channel 2010 containing FDT files FDT X, FDT Y, FDT Z, and FDT A. A first FLUTE channel 2005 may be opened and may broadcast data at a first data rate. For example, the first data rate may be 256 kbps. In the same FLUTE session 2000, a second FLUTE channel 2010 may be opened and may broadcast data at a second different data rate. For example, the second data rate for the second FLUTE channel 2010 may be 10 kbps. Files File 1, f1, 12, f3, f4, File 2, f5, f6, f7, f8, and File 3 represent packets from two different classes of files and may be transmitted in the first FLUTE channel 2005 and at the first data rate.

In the second FLUTE channel 2010, a number of FDT X, FDT Y, FDT Z, and FDT A are broadcast. Thus, different data rates for files File 1, f1, 12, f3, f4, File 2, f5, f6, f7, 18, and File 3 and FDT files FDT X, FDT Y, FDT Z, and FDT A may be formed and allocated. The FDT files FDT X, FDT Y, FDT Z, and FDT A may have a dedicated FLUTE channel 2010 that enables file stream separation. The receiver device 10 may thus locate a predetermined FDT instance by a dedicated FDT channel 2010. For example, the receiver device 10 may perform a separate search for an FDT file FDT X using broadcast channel 2010.

Additionally, the FDT files FDT X, FDT Y, FDT Z, and FDT A may be broadcast with an FDT instance or textual semantic information that indicates for each file in the FDT; a first file broadcast start time and broadcast stop time, a second file broadcast start time and broadcast stop time. The start and stop time for each file broadcast described in an FDT files FDT X, FDT Y, FDT Z, and FDT A transmitted in the second FLUTE channel 2010 may be advantageous and may allow the receiver device 10 to calculate when a desired first or second file will be broadcast, such as files f6 and f7 described in an FDT file, such as FDT Y and the receiver device 10 may terminate receiving the broadcast and resume at the later time period to conserve resources.

For example, each FDT file FDT X, FDT Y, FDT Z, and FDT A may be constantly being transmitted in a carrousel fashion. Each FDT file FDT X, FDT Y, FDT Z, and FDT A may describe a number of files transmitted in that file channel and that may match the time period over which the FDT is broadcast.

Figure 21A:
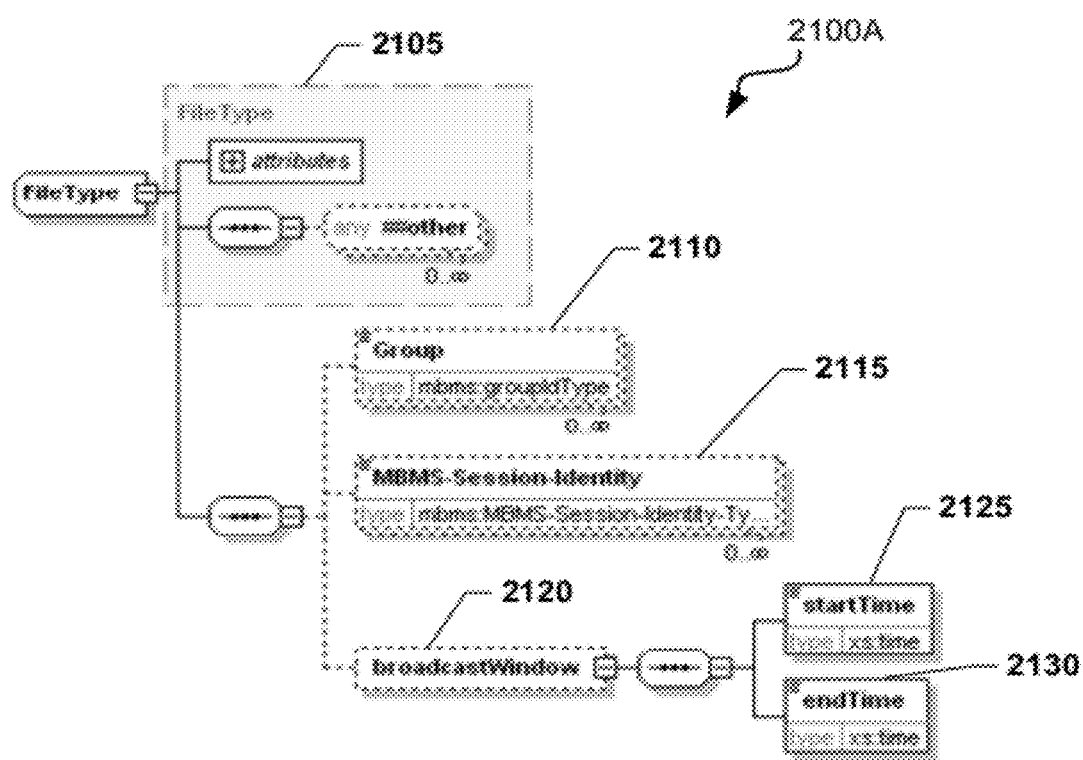
FIG. 21A is an illustration of an embodiment showing a sample file delivery table having a broadcast start time attribute and a broadcast end time attribute.
Figure 21B:
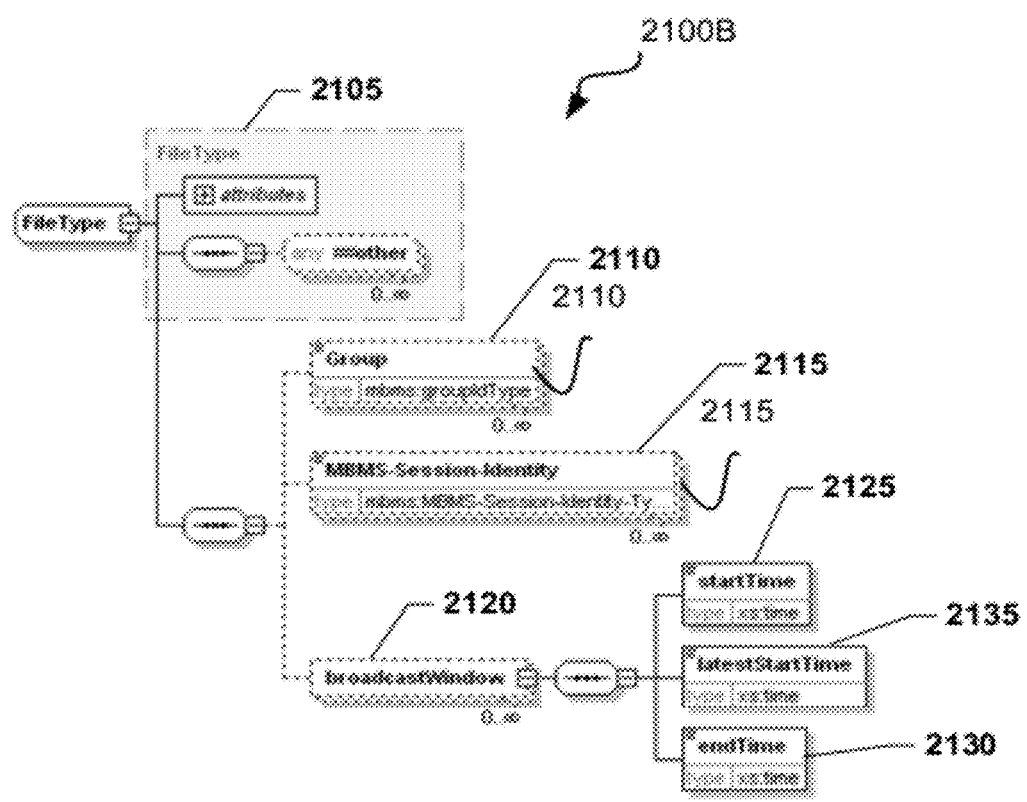
FIG. 21B is an illustration of an embodiment showing a sample file delivery table having a broadcast start time attribute, a broadcast end time attribute and a latest start time attribute.

In an embodiment, each FDT file FDT X, FDT Y, FDT Z, and FDT A may describe a set of files as illustrated in FIG. 21A and FIG. 21B. FIG. 21A shows attributes including a broadcast start time 2125 and a broadcast stop time 2130 under a file entry of FileType format 2105. FIG. 21B shows a different embodiment where attributes may also include a broadcast start time 2125, a broadcast end time 2130 and a latest broadcast start time 2135 as attributes. For example, the receiver device 10 may be provided data (attribute as previously described) that the first FDT file FDT X will be broadcast and will describe a predetermined file of the first FLUTE channel having a first duration t1, a second FDT file FDT Y will be broadcast that will describe another file of the first FLUTE channel having a second duration t2, third FDT file FDT Z will be broadcast that will describe another file of the first FLUTE channel having a third duration t3, and a fourth FDT file FDT A will be broadcast that will describe another file of the first FLUTE channel having a fourth duration t4. Each of the FDT files FDT X, FDT Y, FDT Z, and FDT A may be broadcast a start time for an individual file and an end time for the file. The start time and end time data about the files File 1, File 2, and File 3 and f1, f2, f3, f4, f5, f6, f7, f8 in the first FLUTE channel 2005 may also be communicated. In this manner, a receiver device 10 may be able to receive only a portion of the data in the broadcast channel 2005 and 2010 and determine a file of interest and may not search or receive data for a predetermined time period. At the conclusion of the time period, the receiver device 10 may switch on to monitor for the file of interest again to productively receive the broadcast file of interest. The receiver device 10 thus using the predetermined start time and predetermined stop time may schedule a fixed time to receive an FDT file, such as FDT Y, without having to monitor in a continuous manner to the FDT channel 2010 in an attempt to conserve battery and processing resources.

FIG. 21A illustrates a first representation of a FLUTE based FDT instance description for one file generally shown as reference number 2100A. The file description in the FDT instance 2100A may include a number of attributes 2105 for the file. The attributes 2105 may include a group attribute 2110, a multimedia broadcast and multicast service session identity attribute 2115, and a broadcast window attribute 2120 to describe when the file may be broadcast. The broadcast window attribute 2120 may have a broadcast window start time attribute 2125 and a broadcast window end time attribute 2130. Other FLUTE FDT instances may be possible and within the scope of the present disclosure, or some file instances may be substituted for different instances. The receiver device 10 thus using the predetermined start time attribute and predetermined stop time attribute may schedule a fixed time to receive another file without having to monitor in a continuous manner the FLUTE channel(s) in an attempt to conserve battery and processing resources.

For example with the broadcast window attributes, the receiver device 10 may be more efficient and conserve mobile resources. For example, battery life efficiency may be expressed as the time to receive a particular file divided by the entire FDT file period. Referring to FIG. 20, for example, file f4 divided by the entire FDT interest period may be represented as about ¼ or twenty five percent of monitoring the entire FDT period for FDT X. For example, file f8 divided by the entire FDT interest period may be represented as about ¼ or twenty five percent of monitoring the entire FDT period for FDT Z.

For example, without this broadcast window attribute 2120 and the broadcast window start time attribute 2125 and the broadcast window end time attribute 2130, the receiver device 10 would need to monitor multiple files over the duration of the broadcast. For example, files f3, f4, and File 2 would be monitored during the FDT period FDT Y to obtain a similar file. This efficiency (without listening to the specific broadcast start time and end time) may be expressed as F3+F4+File 2 divided by the FDT period of FDT Y; namely the device has to receive files for the whole FDT Y period. Using the broadcast start and end time attributes 2152 and 2130 fewer resources may be used as compared to a situation where about ½ or fifty percent of the period may be used and less efficiency may be achieved.

FIG. 21B illustrates another representation of a FLUTE based FDT instance description for one file generally shown as reference number 2100B. The file description in the FDT instance 2100B may include a number of attributes 2105 for the file. The attributes 2105 may include a group attribute 2110, a multimedia broadcast and multicast service session identity attribute 2115 and a broadcast window attribute 2120 to describe when the file will be broadcast. The broadcast window attribute 2120 may have a broadcast window start time attribute 2125 and a broadcast window end time attribute 2130 and a broadcast latest start time attribute 2135. For example, the attributes above may give a processor an indication of when a file of interest may be broadcast and the processor may conserve power until such time as a file of interest may be broadcast. For example, the attributes may also be updated with fresh information to indicate a revised start time as shown and described.

Figure 22:
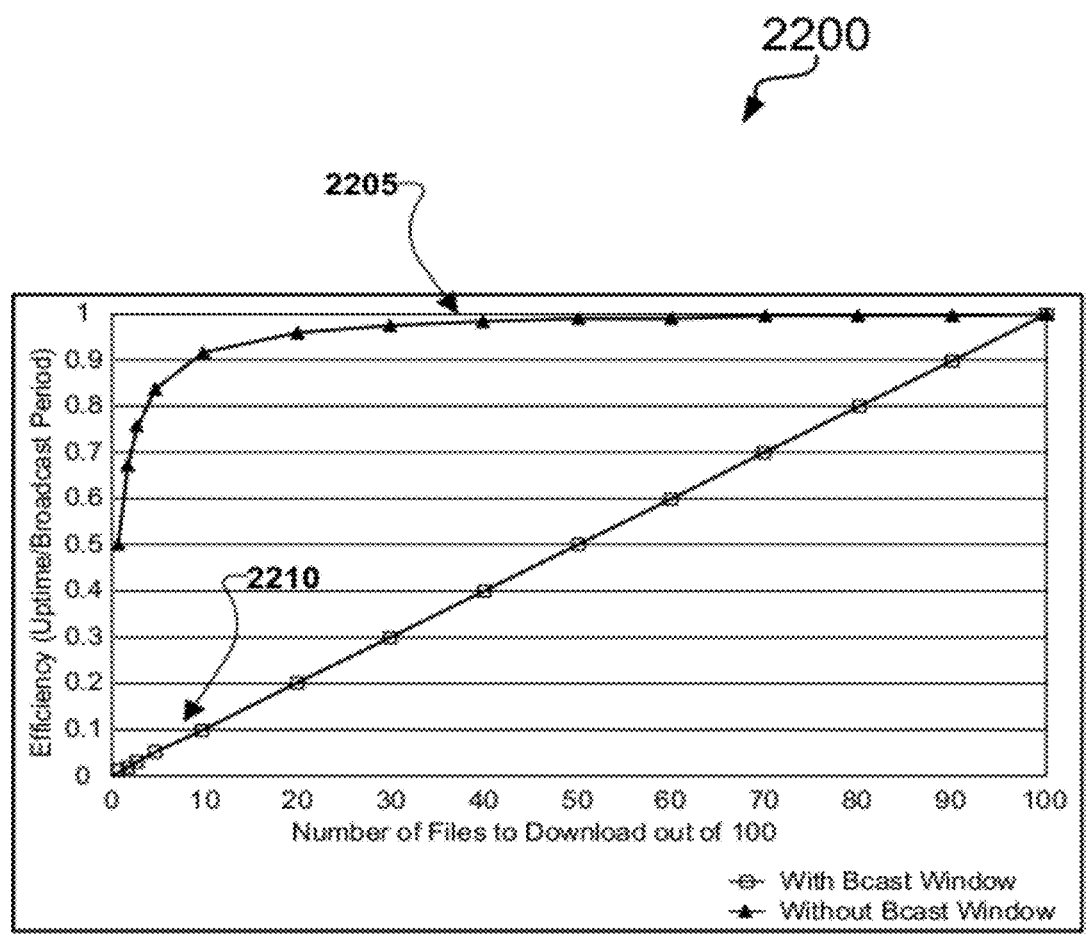
FIG. 22 is a plot illustrating an efficiency of a sample using a broadcast window and another sample without a broadcast window.

FIG. 22 illustrates a chart 2200 of number of files to be downloaded per 100 increments and efficiency as measured in uptime for a broadcast period. A first plot 2205 illustrates a first efficiency and a second plot 2210 illustrates a second efficiency over a number of files to download. With the broadcast attributes discussed above, the second plot 2210 is shown to be linear in efficiency. The first plot 2205 is shown without any broadcast window and generally includes a 0.5 to 0.9 increase in efficiency from zero to 100 file units. Plot 2205 (as the number of files increase) remains unchanged and has a constant slope of efficiency.

In some embodiments, the computing device may be configured to both receive transmissions from a broadcast network and communicate via a unicast network (e.g., a 3G data network). The broadcast web environment enabled by the various embodiments may complement a unicast data network by providing a faster and more bandwidth-efficient web browsing experience for commonly accessed websites.

Figure 23:
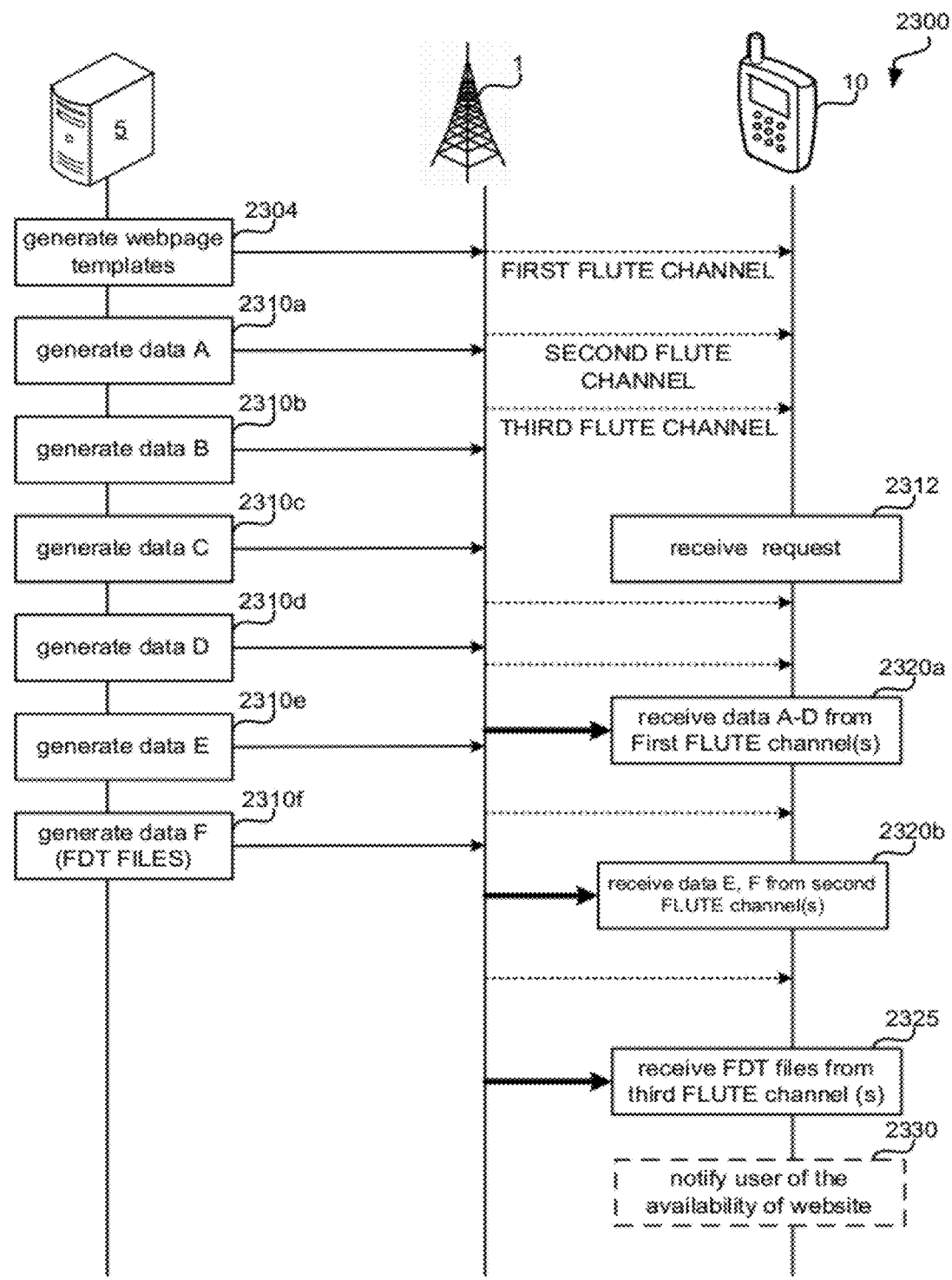
FIG. 23 is an illustration of an embodiment showing a server, a broadcast transmission network and a computing device broadcasting data using a first FLUTE channel, a second FLUTE channel and a third FLUTE channel.

FIG. 23 illustrates an embodiment method 2300 for transmitting data to a receiver device 10 using FLUTE channels. At block 2304 a broadcast network having a web content server 5 may generate a number of templates. At block 2310*a* the web content server 5 may generate data A. At block 2310*b* the web content server 5 may generate data B. At block 2310*c* the web content server 5 may generate data C. At block 2310*d* the web content server 5 may generate data D. At block 2310*e* the web content server 5 may generate data E. At block 2310*f* the web content server 5 may generate data F, which in an embodiment may be FDT files associated with data elements A-E. The data A-F may be communicated to a broadcast network 1, and then to receiver device 10. The broadcast network 1 may use a FLUTE protocol and open a number of FLUTE channels. At block 2312 the receiver device 10 may receive a request from a user for data. In response, at block 2320*a* the receiver device 10 may receive data A through D from a first FLUTE channel and at block 2320*b* the receiver device 10 may receive data packets E and F from the second FLUTE channel 2320*b*. At block 2325 the receiver device 10 may receive the FDT files from a third FLUTE. Once completed, at block 2330 the receiver device 10 may notify the user of the availability of the website and/or render the data. As discussed, this may occur in an asynchronous fashion.

An example of an SDP description for a FLUTE session used in MBMS where only one channel is used may be as follows:

```
v=0
o=user123 2890844526 2890842807 IN IP6 2201:056D::112E:144A:1E24
s=File delivery session example 1
i=More information
t=2873397496 2873404696
a=mbms-mode:broadcast 1234 1
a=FEC-declaration:0 encoding-id=1
a=source-filter: incl IN IP6 * 2001:210:1:2:240:96FF:FE25:8EC9
a=flute-tsi:3
m=application 12345 FLUTE/UDP 0
c=IN IP6 FF1E:03AD::7F2E:172A:1E24/1
b=64
a=lang:EN
a=FEC:0
```

An example of an SDP description for a multi-channel FLUTE session used in MBMS is as follows:

```
v=0
o=user123 2890844526 2890842807 IN IP6 2201:056D::112E:144A:1E24
s=File delivery session example 1
i=More information
t=2873397496 2873404696
a=mbms-mode:broadcast 1234 1
a=source-filter: incl IN IP6 * 2001:210:1:2:240:96FF:FE25:8EC9
a=flute-tsi:3
a=flute-ch:2
a=FEC-declaration:0 encoding-id=0
a=FEC-declaration:1 encoding-id=129; instance-id=0
m=application 12345 FLUTE/UDP *
c=IN IP6 FF33::8000:1
a=FEC:0
a=mid:1
m=application 12346 FLUTE/UDP *
c=IN IP6 FF33::8000:2
a=FEC:1
a=mid:2
```

Note that the SDP above indicates the number of channels (a = flute-ch:2) and identifies each of the channels (a = mid:1 and a = mid:2).

A sample SDP description for a multi-channel FLUTE session for separate FDT and file transport channels is:

```
v=0
o=user123 2890844526 2890842807 IN IP6 2201:056D::112E:144A:1E24
s=File delivery session example 1
i=More information
t=2873397496 2873404696
a=source-filter: incl IN IP6 * 2001:210:1:2:240:96FF:FE25:8EC9
a=flute-tsi:3
a=flute-ch:2
a=group:DC 1
a=group:FC 2
a=FEC-declaration:0 encoding-id=0
a=FEC-declaration:1 encoding-id=129; instance-id=0
m=application 12345 FLUTE/UDP *
c=IN IP6 FF33::8000:1
a=FEC:0
b=AS:10
a=mid:1
a=mbms-mode:broadcast 1234 1
m=application 12347 FLUTE/UDP *
c=IN IP6 FF33::8000:2
a=FEC:1
b=AS:256
a=mid:2
a=mbms-mode:broadcast 1235 1
```

A sample SDP description for a multi-channel FLUTE session for separate FDT and file transport channels is:

```
v=0
o=user123 2890844526 2890842807 IN IP6 2201:056D::112E:144A:1E24
s=File delivery session example 1
i=More information
t=2873397496 2873404696
a=source-filter: incl IN IP6 * 2001:210:1:2:240:96FF:FE25:8EC9
a=flute-tsi:3
a=flute-ch:2
a=group:DC 1 2
a=group:FC 3 4
a=FEC-declaration:0 encoding-id=0
a=FEC-declaration:1 encoding-id=129; instance-id=0
m=application 12345 FLUTE/UDP *
c=IN IP6 FF33::8000:1
a=fdt-latency:30
a=FEC:0
b=AS:10
a=mid:1
a=mbms-mode:broadcast 1234 1
m=application 12347 FLUTE/UDP *
c=IN IP6 FF33::8000:2
a=fdt-latency:900
a=FEC:1
b=AS:256
a=mid:2
a=mbms-mode:broadcast 1235 1
m=application 12347 FLUTE/UDP *
c=IN IP6 FF33::8000:3
a=FEC:1
b=AS:64
a=mid:3
m=application 12348 FLUTE/UDP *
c=IN IP6 FF33::8000:4
a=FEC:1
b=AS:256
a=mid:4
```

Figure 24:
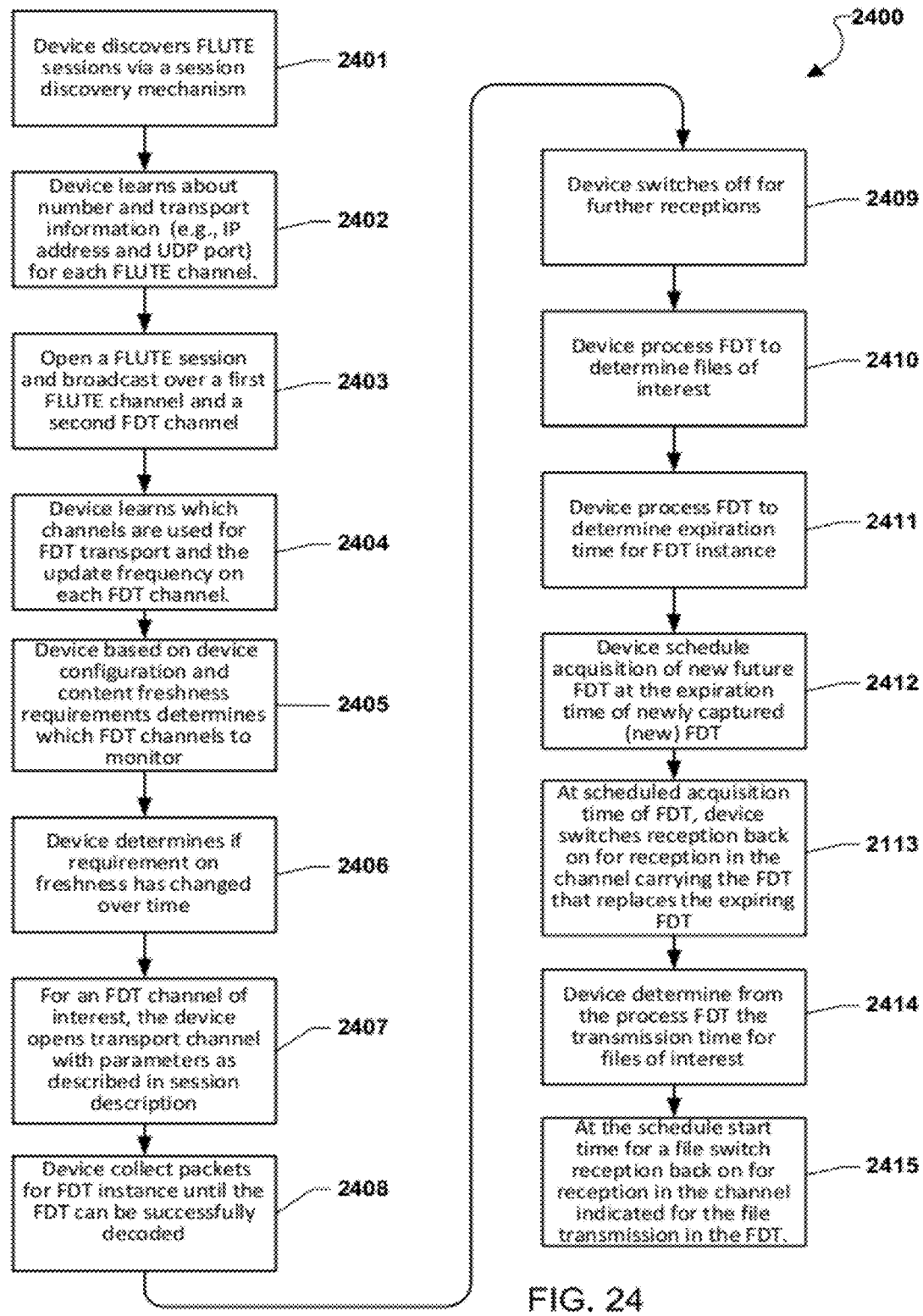
FIG. 24 is a high level process flow diagram of an embodiment method describing the infrastructure/server side behaviors of receiving files, scheduling the files, and then transmitting the files over specific FLUTE channels.

FIG. 24 illustrates another embodiment method 2400 for receiving files, scheduling files, and transmitting the files over specific FLUTE channels. At block 2401, the receiver device 10 may discover a FLUTE session via a predetermined session discovery mechanism. At block 2402, the device may learn about a number and transport information, for example an IP address and a UDP port information for each channel. At block 2403, the device may open a FLUTE session and broadcast over a first and second FLUTE channel and at block 2404; the device may learn which channels are used for FDT transport and an update frequency on each FDT channel.

At block 2405, the device may (based in part on a device configuration and based on content freshness requirements) determine which FDT channels to monitor. At block 2406, the device may determine if a requirement on freshness of content has changed over time. At block 2407, for an FDT channel of interest, the device may open a transport channel with parameters as described in a session description. At block 2408, the device may collect packets for an FDT instance until the FDT can be successfully decoded. At block 2409, the device may turn-off further receptions.

At block 2410, the device may process FDT to determine files of interest and at block 2411 the device may process FDT to determine expiration time for an FDT instance. In an embodiment, files of interest may be necessary files that may be required to reassemble the content at the receiver device 10. In an embodiment, the files of interest may be selected from the plurality of files that may be transmitted during the FLUTE session. In an embodiment, the receiver device may receive the necessary file on the channel the necessary file is transmitted on at the time the necessary file is transmitted and may assemble the necessary files together to reconstitute the original and/or desired content. At block 2412, the device may schedule an acquisition of a new future FDT at the expiration time of a newly captured (new) FDT. At block 2413, the device at a scheduled acquisition time of future FDT, may switch reception back on (if not already on) for reception in the channel carrying the FDT that replaces the expiring FDT. At block 2414, the device having the processor may determine from the process the FDT the transmission time for files of interest. At block 2415, at the schedule start time for a file, the device switches reception back on (if not already on) for reception in the channel indicated for the file transmission in the FDT. At block 2415, the processor may pass to block 2405 to determine which FDT channels to monitor.

Figure 25:
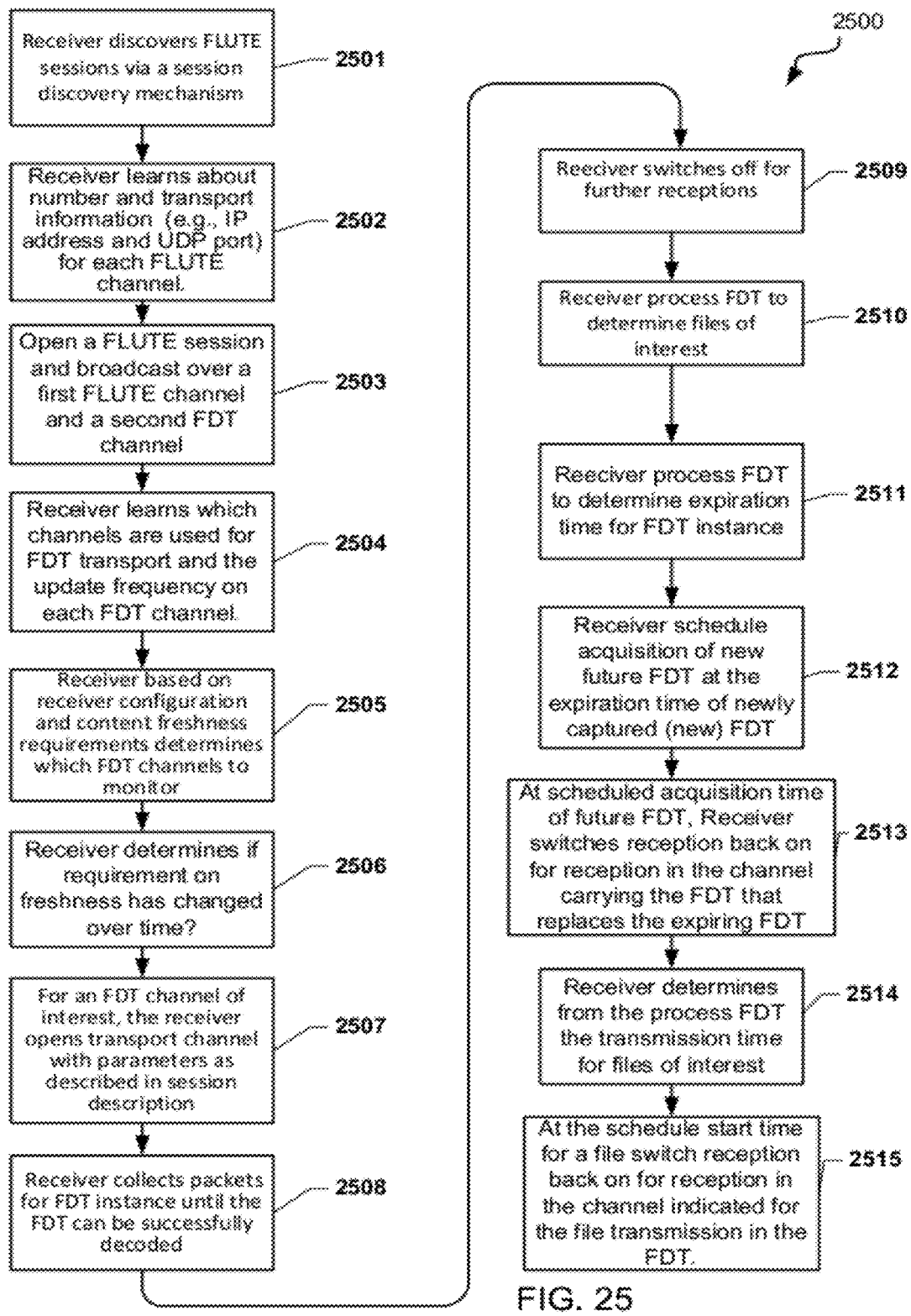
FIG. 25 is a high level process flow diagram of an embodiment method describing the mobile receiver side behaviors of receiving files, scheduling the files, and then transmitting the files over specific FLUTE channels.

FIG. 25 illustrates an embodiment method 2500 for receiving files, scheduling files, and transmitting the files over specific FLUTE channels. At block 2501, the receiver device 10 may discover a FLUTE session via a predetermined session discovery mechanism. At block 2502 the receiver device 10 may receive data and transport information, for example an IP address and a UDP port information for each channel. At block 2503 the receiver device 10 may receive data regarding a FLUTE session and may receive broadcasts over a first and second FLUTE channel. At block 2504 the receiver device 10 may learn which channels are used for FDT transport and an update frequency on each FDT channel.

At block 2505, the receiver device 10 may (based in part on a configuration and based on content freshness requirements) determine which FDT channels to monitor. At block 2506 the receiver device 10 may determine if a requirement on freshness of content has changed over time. At block 2507, for an FDT channel of interest, the receiver device 10 may open a transport channel with parameters as described in a session description. At block 2508 the receiver device 10 may collect packets for an FDT instance until the FDT can be successfully decoded. At block 2509 the receiver device 10 may conserve power and may turn-off further receptions.

At block 2510, the receiver device 10 may process an FDT to determine files of interest. At block 2511 the receiver device 10 may process FDT to determine expiration time for an FDT instance. At block 2512 the receiver device 10 may schedule an acquisition of new future FDT at the expiration time of a newly captured (new) FDT. At block 2513 the receiver device 10 at a scheduled acquisition time of a future FDT, may switch reception back on (if not already on) for reception in the channel carrying the FDT that replaces the expiring FDT. At block 2514 the receiver device 10 and processor may determine from the processing of the FDT the transmission time for files of interest. At block 2515 at the scheduled start time for a file, the receiver device 10 may switch reception back on (if not already on) for reception in the channel indicated for the file transmission in the FDT.

Figure 26:
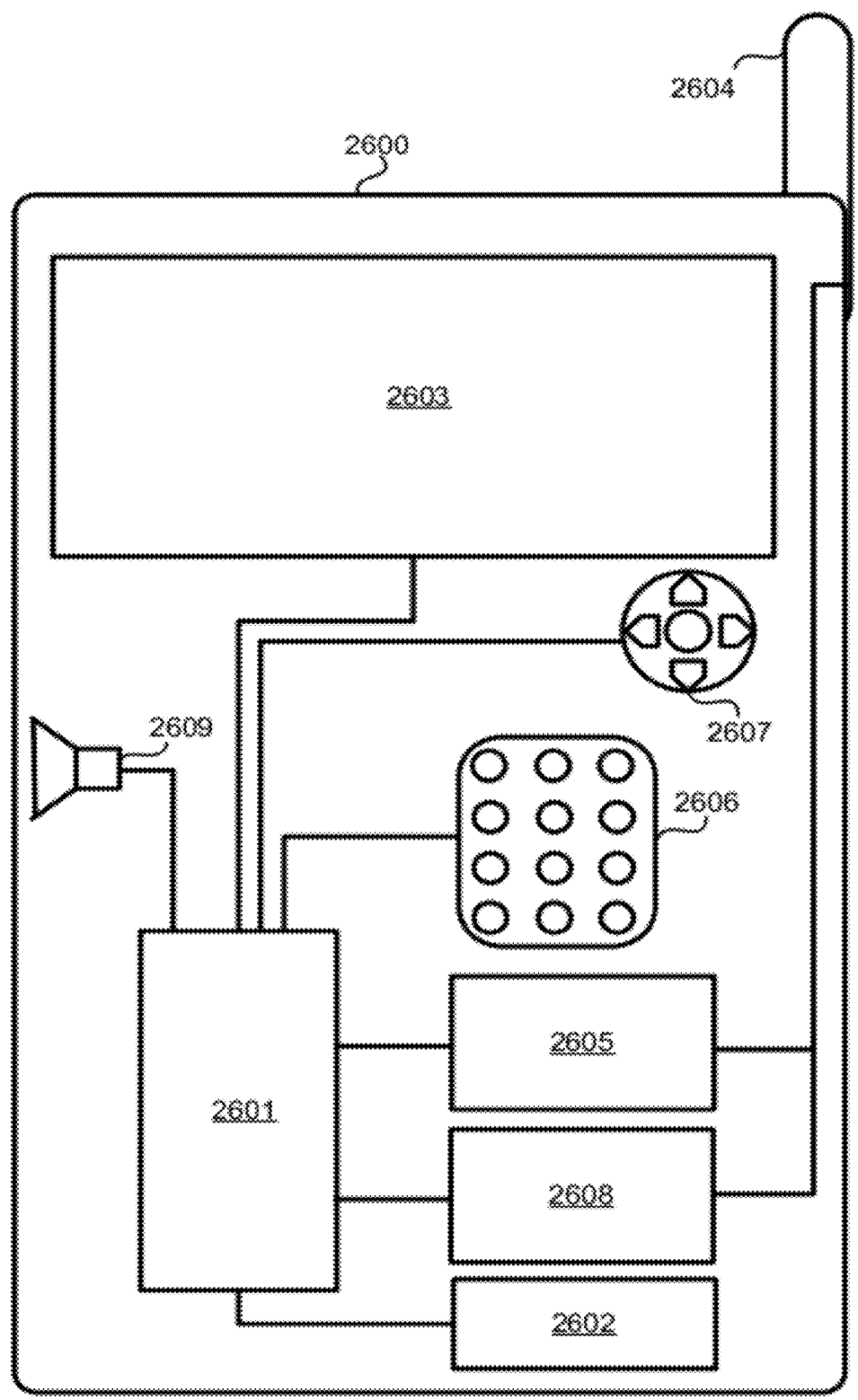
FIG. 26 is a component block diagram of a computing device suitable for use in an embodiment.

FIG. 26 is a system block diagram of a receiver device, such as a wireless device, suitable for use with any of the embodiments. A typical receiver device 2600 may include a processor 2601 coupled to internal memory 2602, a display 2603, and to a speaker 2609. Additionally, the receiver device 2600 may include an antenna 2604 for sending and receiving electromagnetic radiation that may be connected to a wireless data link and/or cellular telephone transceiver 2605 coupled to the processor 2601 and a broadcast network receiver 2608 coupled to the processor 2601. Receiver devices 2600 may also include menu selection buttons 2606 or rocker switches 2607 for receiving user inputs.

The various embodiment methods for receiving and processing interactivity event signaling messages may be performed by the multimedia broadcast receiver 2608 and portions of the processor 2601 and memory 2602. Alternatively, dedicated modules within or coupled to the multimedia broadcast receiver 2608 may perform the embodiment methods.

Figure 27:
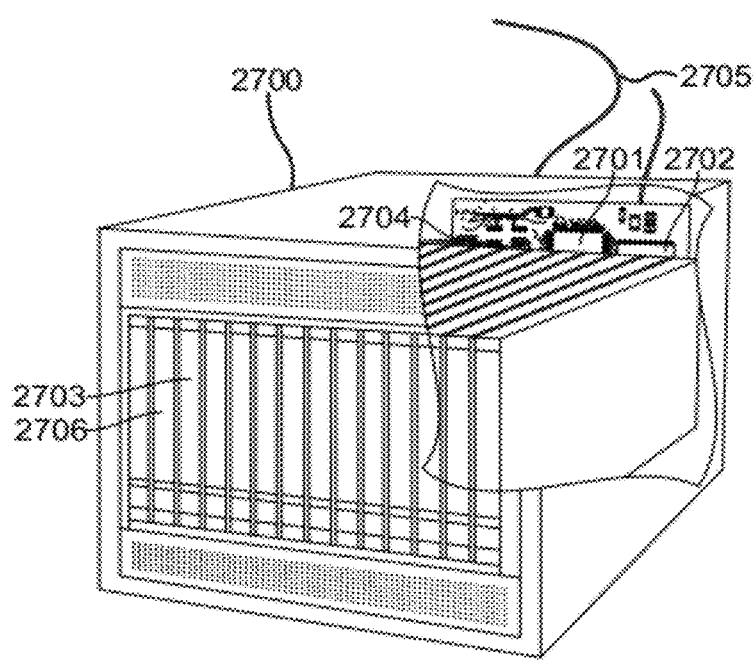
FIG. 27 is a component block diagram of a server device suitable for use in an embodiment.

The various embodiments on the broadcast side described above may be implemented on any of a variety of commercially available server devices, such as the server 2700 illustrated in FIG. 27. Such a server 2700 typically includes a processor 2701 coupled to volatile memory 2702 and a large capacity nonvolatile memory, such as a disk drive 2703. The server 2700 may also include a floppy disc drive, compact disc (CD) or DVD disc drive 2706 coupled to the processor 2701, which can be a multi-core processor. The server 2700 may also include network access ports 2704 coupled to the processor 2701 for establishing data connections with a network 2705, such as a local area network coupled to other broadcast system computers and servers. In an embodiment, the network access port 2704 may provide a broadcast network interface for exchanging data and commands with the broadcast network.

The processors 2601, 2701 may be any programmable microprocessor, microcomputer or multiple processor chip or chips that can be configured by software instructions (applications) to perform a variety of functions, including the functions of the various embodiments described below. In some mobile receiver devices, multiple processors 2701 may be provided, such as one processor dedicated to wireless communication functions and one processor dedicated to running other applications. Typically, software applications may be stored in the internal memory 2602, 2702, and 2703 before they are accessed and loaded into the processor 2601, 2701. The processor 2601, 2701 may include internal memory sufficient to store the application software instructions.

As discussed above, the various embodiments may be used for delivering a variety of rich media content, and not just Internet web content. Accordingly, the scope of the claims should not be limited to Internet web content delivery and reception unless specifically recited.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable storage medium. The steps of a method or algorithm disclosed herein may be embodied in a processor-executable software module executed which may reside on a tangible or non-transitory computer-readable storage medium. Non-transitory computer-readable storage media may be any available storage media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above also can be included within the scope of non-transitory computer-readable media. Additionally, the operations of a method or algorithm may reside as one or any combination or set of codes and/or instructions on a non-transitory machine readable medium and/or non-transitory computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for broadcasting content in a File Delivery over Unidirectional Transport (FLUTE) Protocol session within a broadcast network, comprising:
   receiving content comprising a plurality of content files, the plurality of content files comprising files of a first size and second size that is different from the first size;
   assembling the plurality of content files into a FLUTE session having a first file delivery table (FDT) channel, a second FDT channel, a third channel and a fourth channel, wherein the first FDT channel, the second FDT channel, the third channel and the fourth channel are described by the same session identifier and different channel identifiers in a session description of the FLUTE session;
   scheduling broadcast times and channels for the plurality of content files included in the FLUTE session;
   generating a first FDT and a second FDT, each of the first FDT and the second FDT identifying the scheduled broadcast times and channels for the plurality of content files in the FLUTE session;
   broadcasting the first FDT over the first FDT channel and the second FDT over the second FDT channel during the FLUTE session, wherein the first FDT broadcast over the first FDT channel is updated more frequently than the second FDT broadcast over the second FDT channel; and
   broadcasting the plurality of content files at the scheduled broadcast times and on the channels identified in the first FDT during the FLUTE session such that the files of the first size are broadcast on the third channel at a first data rate and the files of the second size are broadcast on the fourth channel at a second data rate that is different from the first data rate.

2. The method of claim 1, wherein each of the first FDT and the second FDT identifies a start time and an end time at which the plurality of content files will be broadcast in the FLUTE session.

3. The method of claim 1, further comprising:
   receiving the first FDT over the first FDT channel or the second FDT over the second FDT channel during the FLUTE session;
   selecting from the first FDT or the second FDT a content file for reception from among the plurality of content files;

receiving the selected content file at the time on the channel identified for the selected content file in the first FDT or the second FDT during the FLUTE session; and storing the selected content file in memory.

4. The method of claim 3, further comprising:

switching off receiver circuitry after receiving the first FDT or the second FDT;

determining a time to switch on the receiver circuitry to receive the selected content file at the time on the channel identified for the selected content file in the first FDT or the second FDT during the FLUTE session;

switching on the receiver circuitry at the determined time to receive the selected content file; and rendering the content from the selected content file stored in the memory.

5. A server for use within a broadcast network, comprising:

a broadcast network interface for interfacing with the broadcast network;

a memory; and a server processor coupled to the broadcast network interface and the memory, wherein the server is configured with processor-executable instructions to perform operations comprising:

receiving content comprising a plurality of content files, the plurality of content files comprising files of a first size and second size that is different from the first size;

assembling the plurality of content files into a File Delivery over Unidirectional Transport (FLUTE) Protocol session having a first file delivery table (FDT) channel, a second FDT channel, a third channel and a fourth channel, wherein the first FDT channel, the second FDT channel, the third channel and the fourth channel are described by the same session identifier and different channel identifiers in a session description of the FLUTE session;

scheduling broadcast times and channels for the plurality of content files included in the FLUTE session;

generating a first FDT and a second FDT, each of the first FDT and the second FDT identifying the scheduled broadcast times and channels for the plurality of content files in the FLUTE session;

causing the broadcast network to broadcast the first FDT over the first FDT channel and the second FDT over the second FDT channel during the FLUTE session, wherein the first FDT broadcast over the first FDT channel is updated more frequently than the second FDT broadcast over the second FDT channel; and causing the broadcast network to broadcast the plurality of content files at the scheduled broadcast times and on the channels identified in the first FDT during the FLUTE session such that the files of the first size are broadcast on the third channel at a first data rate and the files of the second size are broadcast on the fourth channel at a second data rate that is different from the first data rate.

6. The server of claim 5, wherein each of the first FDT and the second FDT identifies a start time and an end time at which the plurality of content files will be broadcast in the FLUTE session.

7. A server for use in a broadcast network, comprising:

means for receiving content comprising a plurality of content files for broadcast, the plurality of content files comprising files of a first size and second size that is different from the first size;

means for assembling the plurality of content files into a File Delivery over Unidirectional Transport (FLUTE) Protocol session having a first file delivery table (FDT) channel, a second FDT channel, a third channel and a fourth channel, wherein the first FDT channel, the second FDT channel, the third channel and the fourth channel are described by the same session identifier and different channel identifiers in a session description of the FLUTE session;

means for scheduling broadcast times and channels for the plurality of content files included in the FLUTE session;

means for generating a first FDT and a second FDT, each of the first FDT and the second FDT identifying the scheduled broadcast times and channels for the plurality of content files in the FLUTE session;

means for causing the broadcast network to broadcast the first FDT over the first FDT channel and the second FDT over the second FDT channel during the FLUTE session, wherein the first FDT broadcast over the first FDT channel is updated more frequently than the second FDT broadcast over the second FDT channel; and means for causing the broadcast network to broadcast the plurality of content files at the scheduled broadcast times and on the channels identified in the first file delivery table during the FLUTE session such that the files of the first size are broadcast on the third channel at a first data rate and the files of the second size are broadcast on the fourth channel at a second data rate that is different from the first data rate.

8. The server of claim 7, wherein each of the first FDT and the second FDT identifies a start time and an end time at which the plurality of content files will be broadcast in the FLUTE session.

9. A non-transitory processor-readable medium having stored thereon server-executable instructions configured to cause a server within a broadcast network to perform operations comprising:

receiving content comprising a plurality of content files, the plurality of content files comprising files of a first size and second size that is different from the first size;

assembling the plurality of content files into a File Delivery over Unidirectional Transport (FLUTE) Protocol session having a first file delivery table (FDT) channel, a second FDT channel, a third channel and a fourth channel, wherein the first FDT channel, the second FDT channel, the third channel and the fourth channel are described by the same session identifier and different channel identifiers in a session description of the FLUTE session;

scheduling broadcast times and channels for the plurality of content files included in the FLUTE session;

generating a first FDT and a second FDT, each of the first FDT and the second FDT identifying the scheduled broadcast times and channels for the plurality of content files in the FLUTE session;

causing a broadcast network to broadcast the first FDT over the first FDT channel and the second FDT over the second FDT channel during the FLUTE session, wherein the first FDT broadcast over the first FDT channel is updated more frequently than the second FDT broadcast over the second FDT channel; and causing the broadcast network to broadcast the plurality of content files at the scheduled broadcast times and on the channels identified in the first file delivery table during the FLUTE session such that the files of the first size are broadcast on the third channel at a first data rate and the files of the second size are broadcast on the fourth channel at a second data rate that is different from the first data rate.

10. The non-transitory processor-readable medium of claim 9, wherein each of the first file delivery table and the second file delivery table identifies a start time and an end time at which the plurality of content files will be broadcast in the FLUTE session.

11. A method for receiving content in a File Delivery over Unidirectional Transport (FLUTE) Protocol session, comprising:
receiving an indication of a FLUTE session in a broadcast network, the FLUTE session having a first file delivery table (FDT) channel, a second FDT channel, a third channel and a fourth channel, wherein the first FDT channel, the second FDT channel, the third channel and the fourth channel are described by the same session identifier and different channel identifiers in a session description of the FLUTE session and wherein files of a first size are broadcast on the third channel at a first data rate and files of a second size are broadcast on the fourth channel at a second data rate that is different from the first data rate;
receiving at least one of the first file delivery table over the first FDT channel and the second FDT over the second FDT channel during the FLUTE session, each of the first FDT and the second FDT identifying a time and a channel on which each file of a plurality of files will be broadcast wherein the first FDT broadcast over the first FDT channel is updated more frequently than the second FDT broadcast over the second FDT channel:
selecting from the first FDT or the second FDT a file for reception from among the plurality of files;
determining from the first FDT or the second FDT the channel on which the selected file will be broadcast;
determining from the first FDT or the second FDT the time at which the selected file will be broadcast; and
receiving the selected file on the determined channel at the determined time.

12. The method of claim 11, further comprising:
switching off a broadcast network receiver after receiving the first FDT or the second FDT;
determining a start time to switch on the broadcast network receiver to receive the selected file on the determined channel at the determined time;
switching on the broadcast network receiver at the determined start time to receive the selected file; and
storing the selected file in memory.

13. A receiver device for receiving broadcast transmissions, comprising:
a broadcast network receiver;
a memory;
a processor coupled to the broadcast network receiver and the memory, wherein the processor is configured with processor-executable instructions to perform operations comprising:
receiving an indication of a File Delivery over Unidirectional Transport (FLUTE) Protocol session in a broadcast transmission, the FLUTE session having a first file delivery table (FDT) channel, a second FDT channel, a third channel and a fourth channel, wherein the first FDT channel, the second FDT channel, the third channel and the fourth channel are described by the same session identifier and different channel identifiers in a session description of the FLUTE session and wherein files of a first size are broadcast on the third channel at a first data rate and files of a second size are broadcast on the third fourth channel at a second data rate that is different from the first data rate;
receiving the first FDT over the first FDT channel or the second FDT over the second FDT channel during the FLUTE session, each of the first FDT and the second FDT identifying a time and a channel on which each file of a plurality of files will be broadcast wherein the first FDT broadcast over the first FDT channel is updated more frequently than the second FDT broadcast over the second FDT channel;
selecting from the first FDT or the second FDT a file for reception from among the plurality of files;
determining from the first FDT or the second FDT the channel on which the selected file will be broadcast;
determining from the first FDT or the second FDT the time at which the selected file will be broadcast; and
receiving the selected file on the determined channel at the determined time.

14. The receiver device of claim 13, wherein the processor is configured with processor-executable instructions to perform operations further comprising:
switching off the broadcast network receiver after receiving the first FDT or the second FDT;
determining a start time to switch on the broadcast network receiver to receive the selected file on the determined channel at the determined time;
switching on the broadcast network receiver at the determined start time to receive the selected file; and
storing the selected file in the memory.

15. A receiver device for receiving broadcast transmissions, comprising:
means for receiving an indication of a File Delivery over Unidirectional Transport (FLUTE) Protocol session in a broadcast transmissions, the FLUTE session having a first file delivery table (FDT) channel, a second FDT channel, a third channel and a fourth channel, wherein the first FDT channel, the second FDT channel, the third channel and the fourth channel are described by the same session identifier and different channel identifiers in a session description of the FLUTE session and wherein files of a first size are broadcast on the third channel at a first data rate and files of a second size are broadcast on the fourth channel at a second data rate that is different from the first data rate;
means for receiving the first FDT over the first FDT channel or the second FDT over the second FDT channel during the FLUTE session, each of the first FDT and the second FDT identifying a time and a channel on which each file of a plurality of files will be broadcast wherein the first FDT broadcast over the first FDT channel is updated more frequently than the second FDT broadcast over the second FDT channel;
means for selecting from the first FDT or the second FDT a file for reception from among the plurality of files;
means for determining from the first FDT or the second FDT the channel on which the selected file will be broadcast;
means for determining from the first FDT or the second FDT the time at which the selected file will be broadcast; and
means for receiving the selected file on the determined channel at the determined time.

16. The receiver device of claim 15, further comprising:
means for saving battery power after receiving the first FDT or the second FDT;
means for determining a start time to receive the selected file on the determined channel at the determined time to receive the selected file;
means for receiving the selected file on the determined channel at the determined start time; and
means for storing the received selected file.

17. A non-transitory processor-readable medium having stored thereon processor-executable instruction configured to cause a receiver device processor to perform operations comprising:
receiving an indication of a File Delivery over Unidirectional Transport (FLUTE) Protocol session in a broadcast transmission, the FLUTE session having a first file delivery table (FDT) channel, a second FDT channel, a third channel and a fourth channel, wherein the first FDT channel, the second FDT channel, the third channel and the fourth channel are described by the same session identifier and different channel identifiers in a session description of the FLUTE session and wherein files of a first size are broadcast on the third channel at a first data rate and files of a second size are broadcast on the fourth channel at a second data rate that is different from the first data rate;
receiving the first FDT over the first FDT channel or the second FDT over the second FDT channel during the FLUTE session, each of the first FDT and the second FDT identifying a time and a channel on which each file of a plurality of files will be broadcast, wherein the first FDT over the first FDT channel is updated more frequently than the second FDT broadcast over the second FDT channel;
selecting from the first FDT or the second FDT a file for reception from among the plurality of files;
determining from the first FDT or the second FDT the channel on which the selected file will be broadcast;
determining from the first FDT or the second FDT the time at which the selected file will be broadcast; and
receiving the selected file on the determined channel at the determined time.

18. The non-transitory processor-readable medium of claim 17, wherein the stored processor-executable instructions are configured to cause the receiver device processor to perform operations further comprising:
switching off a broadcast network receiver after receiving the first FDT or the second FDT;
determining a start time to switch on the broadcast network receiver to receive the selected file on the determined channel at the determined time;
switching on the broadcast network receiver at the determined start time to receive the selected file; and
storing the selected file in memory.

19. A system for broadcasting and receiving content in a File Delivery over Unidirectional Transport (FLUTE) Protocol session, comprising:
a broadcast network comprising a transmitter and a server; and
a receiver device comprising:
a broadcast network receiver;
a memory; and
a processor coupled to the broadcast network receiver and the memory,
wherein the server is configured with processor-executable instructions to perform operations comprising:
receiving content comprising a plurality of content files, the plurality of content files comprising files of a first size and second size that is different from the first size;
assembling the plurality of content files into a FLUTE session having a first file delivery table (FDT) channel, a second FDT channel, a third channel and a fourth channel, wherein the first FDT channel, the second FDT channel, the third channel and the fourth channel are described by the same session identifier and different channel identifiers in a session description of the FLUTE session;
scheduling broadcast times and channels for the plurality of content files included in the FLUTE session;
generating a first FDT and a second FDT, each of the first FDT and the second FDT identifying the scheduled broadcast times and channels for the plurality of content files in the FLUTE session;
causing the broadcast network to broadcast the first FDT over the first FDT channel and the second FDT over the second FDT channel during the FLUTE session, wherein the first FDT broadcast over the first FDT channel is updated more frequently than the second FDT broadcast over the second FDT channel; and
causing the broadcast network to broadcast the plurality of content files at the scheduled broadcast times and on the channels identified in the first FDT during the FLUTE session such that the files of the first size are broadcast on the third channel at a first data rate and the files of the second size are broadcast on the fourth channel at a second data rate that is different from the first data rate; and
wherein the processor of the receiver device is configured with processor-executable instructions to perform operations comprising:
receiving the first FDT over the first FDT channel or the second FDT over the second FDT channel during the FLUTE session;
selecting from the first FDT or the second FDT a content file for reception from among the plurality of content files;
determining from the first FDT or the second FDT the channel on which the selected content file will be broadcast;
determining from the first FDT or the second FDT the time at which the selected content file will be broadcast; and
receiving the selected content file on the determined channel at the determined time.

20. The system of claim 19, wherein each of the first FDT and the second FDT identifies a start time and an end time at which the plurality of content files will be broadcast in the FLUTE session.

21. The system of claim 19, wherein the processor of the receiver device is configured with processor-executable instructions to perform operations further comprising:
switching off the broadcast network receiver after receiving the first FDT or the second FDT;
determining a start time to switch on the broadcast network receiver to receive the selected content file on the determined channel at the determined time;
switching on the broadcast network receiver at the determined start time to receive the selected content file; and storing the selected content file in the memory of the receiver device.

22. A system for broadcasting and receiving content in a File Delivery over Unidirectional Transport (FLUTE) Protocol session, comprising:
- means for receiving content comprising a plurality of content files for broadcast, the plurality of content files comprising files of a first size and second size that is different from the first size;
- means for assembling the plurality of content files into a FLUTE session having a first file delivery table (FDT) channel, a second FDT channel, a third channel and a fourth channel, wherein the first FDT channel, the second FDT channel, the third channel and the fourth channel are described by the same session identifier and different channel identifiers in a session description of the FLUTE session;
- means for scheduling broadcast times and channels for the plurality of content files included in the FLUTE session;
- means for generating a first FDT and a second FDT, each of the first FDT and the second FDT identifying the scheduled broadcast times and channels for the plurality of content files in the FLUTE session;
- means for broadcasting the first FDT over the first FDT channel and the second FDT over the second FDT channel during the FLUTE session, wherein the first FDT broadcast over the first FDT channel is updated more frequently than the second FDT broadcast over the second FDT channel; and
- means for broadcasting the plurality of content files at the scheduled broadcast times and on the channels identified in the first FDT during the FLUTE session such that the files of the first size are broadcast on the third channel at a first data rate and the files of the second size are broadcast on the fourth channel at a second data rate that is different from the first data rate; and
- means for receiving the first FDT over the first FDT channel or the second FDT over the second FDT channel during the FLUTE session over the first channel;
- means for selecting from the first FDT or the second FDT a content file for reception from among the plurality of files;
- means for determining from the first FDT or the second FDT the channel on which the selected content file will be broadcast;
- means for determining from the first FDT or the second FDT the time at which the selected content file will be broadcast; and
- means for receiving the selected content file on the determined channel at the determined time.

23. The system of claim 22, wherein each of the first FDT and the second FDT identifies a start time and an end time at which the plurality of content files will be broadcast in the FLUTE session.

24. The system of claim 22, further comprising:
- means for saving battery power after receiving the first FDT or the second FDT;
- means for determining a start time to receive the selected file on the determined channel at the determined time to receive the selected file;
- means for receiving the selected file on the determined channel at the determined start time; and
- means for storing the received selected file.

* * * * *